(12) United States Patent
Jang et al.

(10) Patent No.: US 12,127,194 B2
(45) Date of Patent: Oct. 22, 2024

(54) METHOD AND APPARATUS FOR REPETITIVE TRANSMISSION OF DOWNLINK CONTROL INFORMATION IN NETWORK COOPERATIVE COMMUNICATIONS

(71) Applicant: Samsung Electronics Co., Ltd., Suwon-si (KR)

(72) Inventors: Youngrok Jang, Suwon-si (KR); Euichang Jung, Suwon-si (KR); Ameha Tsegaye Abebe, Suwon-si (KR); Seongmok Lim, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 17/711,363

(22) Filed: Apr. 1, 2022

(65) Prior Publication Data

US 2022/0330299 A1    Oct. 13, 2022

(30) Foreign Application Priority Data

Apr. 1, 2021    (KR) .................. 10-2021-0042909

(51) Int. Cl.
*H04W 72/12*    (2023.01)
*H04W 72/02*    (2009.01)
*H04W 72/04*    (2023.01)
*H04W 72/044*    (2023.01)
(Continued)

(52) U.S. Cl.
CPC ....... *H04W 72/1273* (2013.01); *H04W 72/02* (2013.01); *H04W 72/044* (2013.01); *H04W 72/23* (2023.01)

(58) Field of Classification Search
CPC ... H04W 72/044; H04W 72/23; H04W 72/02; H04W 72/1273; H04L 1/08; H04L 5/0053; H04L 5/0044; H04L 5/0007; H04L 5/0035
See application file for complete search history.

(56) References Cited

U.S. PATENT DOCUMENTS

2020/0196383 A1    6/2020   Tsai et al.
2020/0351892 A1   11/2020   Yi et al.
2021/0014931 A1    1/2021   Noh et al.
(Continued)

OTHER PUBLICATIONS

International Search Report dated Jun. 24, 2022, issued in an International Application No. PCT/KR2022/004697.
(Continued)

*Primary Examiner* — Maharishi V Khirodhar
*Assistant Examiner* — Kenneth P Hunt
(74) *Attorney, Agent, or Firm* — Jefferson IP Law, LLP

(57) ABSTRACT

The present disclosure relates to a communication technique that converges a 5G communication system for supporting a higher data rate after a 4G system with IoT technology, and a system thereof. The disclosure may be applied to intelligent services (e.g., smart home, smart buildings, smart cities, smart cars or connected cars, healthcare, digital education, retail business, security and safety-related services, etc.) based on 5G communication technology and IoT-related technology. The disclosure discloses a coverage enhancement method for a PDCCH in a wireless communication system.

20 Claims, 28 Drawing Sheets

(51) Int. Cl.
*H04W 72/1273* (2023.01)
*H04W 72/23* (2023.01)

(56) References Cited

U.S. PATENT DOCUMENTS

2023/0076897 A1* 3/2023 Svedman .............. H04W 72/23
2024/0129933 A1* 4/2024 Matsumura ......... H04W 72/232

OTHER PUBLICATIONS

Mediatek Inc., 'Enhancements on Multi-TRP for PDCCH, PUCCH and PUSCH', R1-2100582, 3GPP TSG RAN WG1 #104-e, e-Meeting, sections 2-3, Jan. 19, 2021.
Qualcomm Incorporated, 'Enhanced TCI States Activation/ Deactivation PDSCH MAC CE for Multi-TRP', R2-1913407, 3GPP TSG-RAN WG2 Meeting #107bis, Chongquing, section 2, Oct. 4, 2019.

* cited by examiner

FIG. 21

| | | | |
|---|---|---|---|
| R | Serving Cell ID | BWP ID | Oct 1 |
| $C_0$ | TCI state ID $_{0,1}$ | | Oct 2 |
| R | TCI state ID $_{0,2}$ | | Oct 3 (Optional) |

...

| | | |
|---|---|---|
| $C_N$ | TCI state ID $_{N,1}$ | Oct M-1 |
| R | TCI state ID $_{N,2}$ | Oct M (Optional) |

21-05
21-10
21-15

METHOD AND APPARATUS FOR REPETITIVE TRANSMISSION OF DOWNLINK CONTROL INFORMATION IN NETWORK COOPERATIVE COMMUNICATIONS

CROSS-REFERENCE TO RELATED APPLICATION(S)

This application is based on and claims priority under 35 U.S.C. § 119(a) of a Korean patent application number 10-2021-0042909, filed on Apr. 1, 2021, in the Korean Intellectual Property Office, the disclosure of which is incorporated by reference herein in its entirety.

BACKGROUND

1. Field

The disclosure relates to operations of a user equipment and a base station in a wireless communication system. More particularly, the disclosure relates to a method and an apparatus for repetitive transmission of downlink control information in network cooperative communications, and an apparatus capable of performing the same.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "Beyond 4G Network" communication system or a "Post long term evolution (LTE)" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

With the advance of wireless communication systems as described above, various services can be provided, and accordingly there is a need for schemes to effectively provide these services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method capable of effectively providing services in a mobile communication system.

Additional aspects will be set forth in part in the description which follows and, in part, will be apparent from the description, or may be learned by practice of the presented embodiments.

In accordance with an aspect of the disclosure, a terminal in a communication system is provided. The terminal includes a transceiver, and a controller configured to receive, from a base station, information activating a first set of transmission configuration indication (TCI) states corresponding to a first control resource set (CORESET) pool index and a second set of TCI states corresponding to a second CORESET pool index, receive, from the base station, first downlink control information (DCI) including a TCI field indicating a codepoint and second DCI including the TCI field indicating the codepoint, identify whether a first TCI state corresponding to the codepoint among the first set of TCI states and a second TCI state corresponding to the codepoint among the second set of TCI states are the same, and receive, from the base station, at least one physical downlink shared channel (PDSCH) based on the first DCI, the second DCI and the identification.

In accordance with another aspect of the disclosure, a base station in a communication system in provided. The base station includes a transceiver, and a controller configured to transmit, to a terminal, information activating a first set of transmission configuration indication (TCI) states corresponding to a first CORESET pool index and a second set of TCI states corresponding to a second CORESET pool index, transmit, to the terminal, first downlink control information (DCI) including a TCI field indicating a codepoint and second DCI including the TCI field indicating the codepoint, and transmit, to the terminal, at least one physical downlink shared channel (PDSCH) according to the first DCI, the second DCI and whether a first TCI state corresponding to the codepoint among the first set of TCI states and a second TCI state corresponding to the codepoint among the second set of TCI states are the same.

In accordance with another aspect of the disclosure, a method performed by a terminal in a communication system is provided. The method includes receiving, from a base station, information activating a first set of transmission configuration indication (TCI) states corresponding to a first CORESET pool index and a second set of TCI states corresponding to a second CORESET pool index, receiving, from the base station, first downlink control information (DCI) including a TCI field indicating a codepoint and second DCI including the TCI field indicating the codepoint, identifying whether a first TCI state corresponding to the codepoint among the first set of TCI states and a second TCI state corresponding to the codepoint among the second set of TCI states are the same, and receiving, from the base station, at least one physical downlink shared channel (PDSCH) based on the first DCI, the second DCI and the identification.

In accordance with another aspect of the disclosure, a method performed by a base station in a communication system is provided. The method includes transmitting, to a terminal, information activating a first set of transmission configuration indication (TCI) states corresponding to a first CORESET pool index and a second set of TCI states corresponding to a second CORESET pool index, transmitting, to the terminal, first downlink control information (DCI) including a TCI field indicating a codepoint and second DCI including the TCI field indicating the codepoint, and transmitting, to the terminal, at least one physical downlink shared channel (PDSCH) according to the first DCI, the second DCI and whether a first TCI state corresponding to the codepoint among the first set of TCI states and a second TCI state corresponding to the codepoint among the second set of TCI states are the same.

The disclosed embodiments may provide an apparatus and a method for effectively providing services in a mobile communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 21 is a diagram illustrating an enhanced PDSCH TCI state activation/deactivation MAC-CE structure according to an embodiment of the disclosure;

The same reference numerals are used to represent the same elements throughout the drawings.

DETAILED DESCRIPTION

Figure 1:
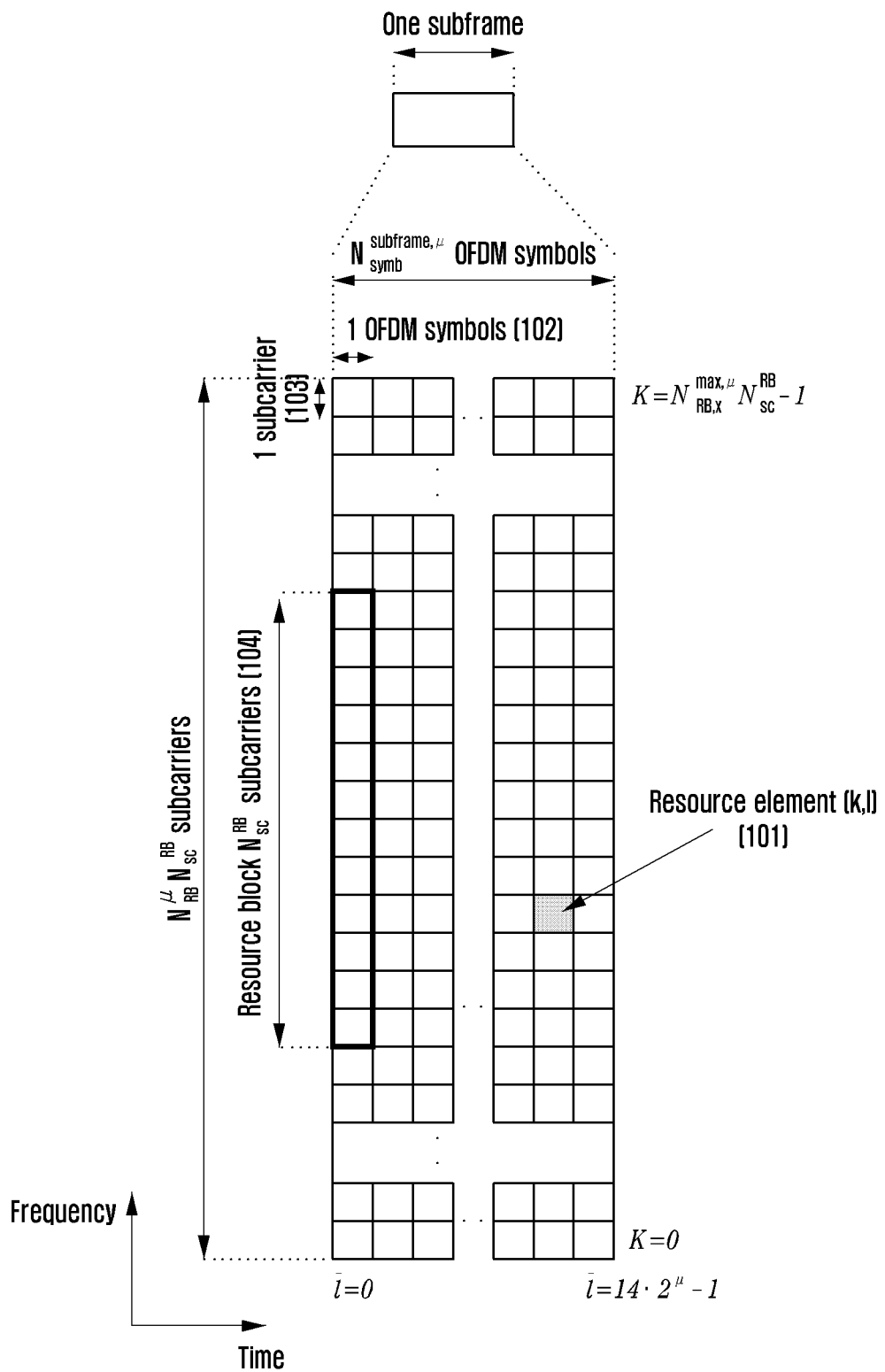
FIG. 1 is a diagram illustrating a basic structure of a time-frequency domain in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or long term evolution advanced (LTE-A) systems may be described by way of example, but the embodiments of the disclosure may also be applied to other communication systems having similar technical backgrounds or channel types. Examples of such communication systems may include 5th generation mobile communication technologies (5G, new radio (NR)) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

A wireless communication system is advancing to a broadband wireless communication system for providing high-speed and high-quality packet data services using communication standards, such as high-speed packet access (HSPA) of third generation partnership project (3GPP), LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), Institute of Electrical and Electronics Engineers (IEEE) 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) {or a mobile station (MS)} transmits data or control signals to a base station (BS) (eNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a 5G communication system, which is a communication system subsequent to LTE, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of $10^{-5}$ or less. Therefore, for the services supporting URLLC, a 5G system must provide a transmit time interval (TTI) shorter than those of other services, and also may require a design for assigning a large number of resources in a frequency band in order to secure reliability of a communication link.

Three services in 5G, that is, eMBB, URLLC, and mMTC, may be multiplexed in a single system and may be transmitted. In this case, different transmission/reception techniques and transmission/reception parameters may be used between services in order to satisfy different requirements of the services. 5G is not limited to the three services described above.

NR Time-Frequency Resources

Hereinafter, a frame structure of the 5G system will be described in more detail with reference to the drawing.

FIG. 1 is a drawing illustrating a fundamental structure of a time-frequency domain that is a radio resource domain in which data or a control channel is transmitted in the 5G system according to an embodiment of the disclosure.

The horizontal axis represents a time domain, and the vertical axis represents a frequency domain in FIG. 1. The basic unit of a resource in the time-frequency domain is a resource element (RE) 101, which may be defined as one orthogonal frequency division multiplexing (OFDM) symbol 102 in the time domain and one subcarrier 103 in the frequency domain. $N_{sc}^{RB}$ consecutive (e.g., 12) REs may constitute one resource block (RB) 104 in the frequency domain.

Figure 2:
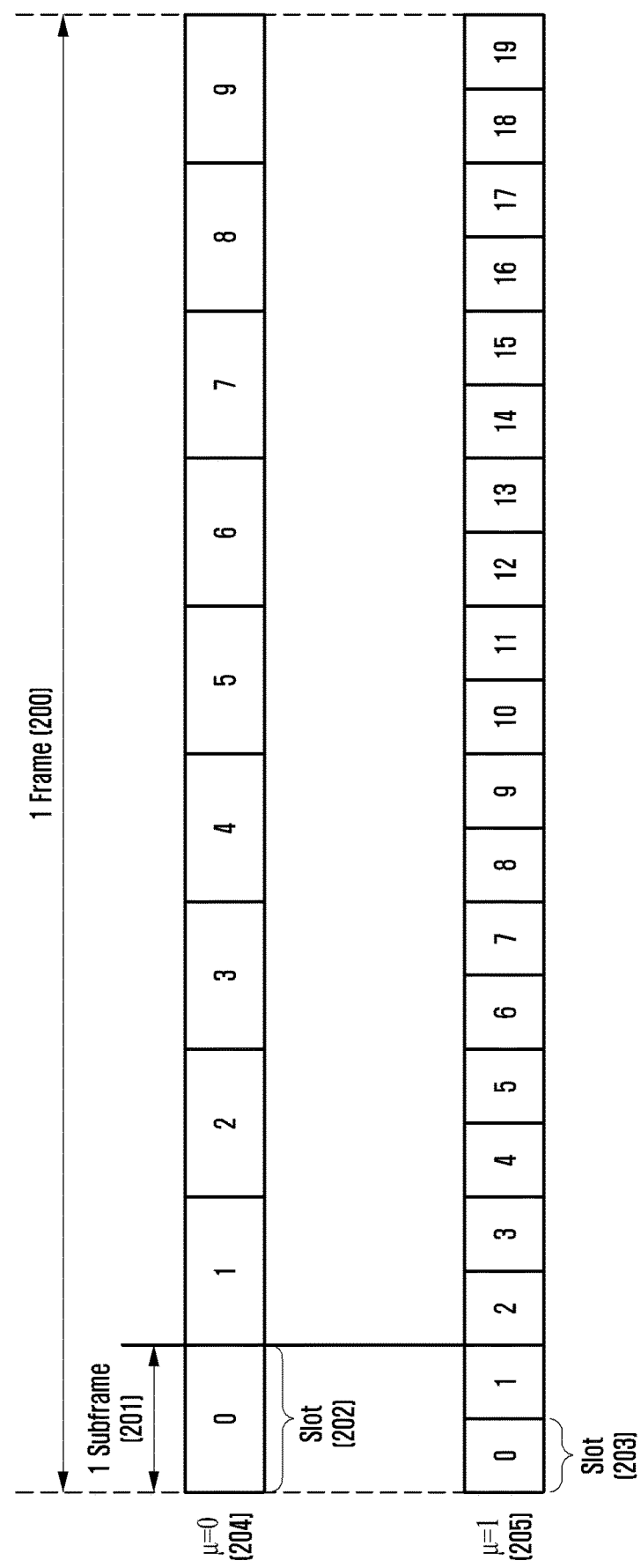
FIG. 2 is a diagram illustrating structures of a frame, a subframe, and a slot in a wireless communication system according to an embodiment of the disclosure.

FIG. 2 is a diagram illustrating structures of a frame, a subframe, and a slot in a wireless communication system according to an embodiment of the disclosure.

FIG. 2 illustrates an example of structures of a frame 200, a subframe 201, and a slot 202. One frame 200 may be defined as 10 ms. One subframe 201 may be defined as 1 ms, and thus one frame 200 may be comprised of a total of 10 subframes 201. One slot 202 or 203 may be defined as 14 OFDM symbols (that is, the number of symbols for each slot $(N_{symb}^{slot})$=14). One subframe 201 may be comprised of one or more slots 202 and 203, and the number of slots 202 and 203 per one subframe 201 may vary depending on the configuration value µ of subcarrier spacing 204 or 205. The example in FIG. 2 shows the case of µ=0 (204) and the case of µ=1 (205) as a configuration value of subcarrier spacing. In the case of µ=0 (204), one subframe 201 may be comprised of one slot 202, and in the case of µ=1 (205), one subframe 201 may be comprised of two slots 203. That is, the number of slots for each subframe $(N_{slot}^{subframe,\mu})$ may vary depending on the configuration value µ of subcarrier spacing, and the number of slots for each frame $(N_{slot}^{frame,\mu})$ may vary according thereto. $N_{slot}^{subframe,\mu}$ and $N_{slot}^{frame,\mu}$ depending on the configuration value µ of each subcarrier spacing may be defined as shown in Table 1 below.

TABLE 1

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Bandwidth (BWP)

Next, a configuration of a bandwidth part (BWP) in 5G communication system will be described in detail with reference to the drawings.

Figure 3:
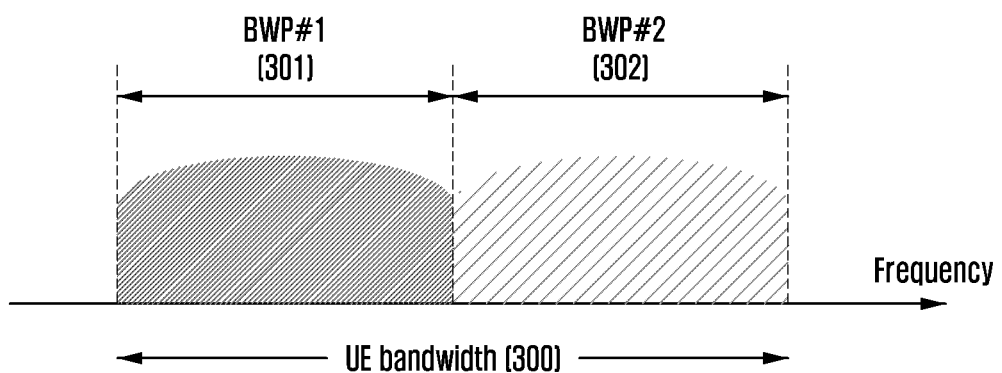
FIG. 3 is a diagram illustrating an example of a configuration of a bandwidth part in a wireless communication system according to an embodiment of the disclosure.

FIG. 3 is the drawing illustrating an example of a configuration of a bandwidth part in a wireless communication system according to an embodiment of the disclosure.

FIG. 3 shows an example in which a UE bandwidth 300 is configured to have two bandwidth parts, that is, bandwidth part #1 (BWP #1) 301 and bandwidth part #2 (BWP #2) 302. The base station may configure one or more bandwidth parts for the UE, and may configure information on each bandwidth part as shown in Table 2 below.

TABLE 2

```
BWP ::=                SEQUENCE {
   bwp-Id              BWP-Id,
   locationAndBandwidth    INTEGER (1..65536),
   subcarrierSpacing   ENUMERATED {n0, n1, n2, n3, n4, n5},
   cyclicPrefix        ENUMERATED { extended }
}
```

Not limited to the above example, various parameters related to the bandwidth part, as well as the configuration information, may be configured for the UE. The base station may transmit the above information to the UE through higher layer signaling, for example, radio resource control (RRC) signaling. At least one of one or more configured bandwidth parts may be activated. Information on whether or not to activate the configured bandwidth part may be transmitted from the base station to the UE semi-statically through RRC signaling or dynamically through downlink control information (DCI).

According to some embodiments, an initial bandwidth part (BWP) for initial access may be configured for the UE prior to a radio resource control (RRC) connection by the base station through a master information block (MIB). More specifically, the UE may receive configuration information on a control resource set (CORESET) through which a PDCCH may be transmitted and a search space in order to receive system information {that may correspond to remaining system information (RMSI) or system information block 1 (SIB1)} required for initial access through an MIB in the initial access stage. The control resource set and the search space configured using an MIB may be regarded as an identity (ID) "0", respectively. The base station may notify the UE of configuration information, such as frequency allocation information, time allocation information, numerology, and the like, for CORESET #0 through an MIB. In addition, the base station may notify the UE of configuration information on monitoring periodicity and an occasion for CORESET #0, that is, configuration information on search space #0, through an MIB. The UE may regard the frequency domain configured with CORESET #0 obtained from the MIB as an initial bandwidth part for initial access. In this case, the identity (ID) of the initial bandwidth part may be regarded as 0.

Configuration of the bandwidth part supported by 5G may be used for various purposes.

According to some embodiments, in the case where the bandwidth supported by the UE is smaller than a system bandwidth, the bandwidth supported by the UE may be supported by configuration of the bandwidth part. For example, a frequency location of a bandwidth part (configuration information 2) may be configured for the UE so that the UE may transmit and receive data at a specific frequency location within the system bandwidth.

In addition, according to some embodiments, the base station may configure a plurality of bandwidth parts for the UE for the purpose of supporting different numerologies. For example, in order to support transmission and reception of data using a subcarrier spacing of 15 kHz and a subcarrier spacing of 30 kHz for any UE, two bandwidth parts may be configured for the subcarrier spacing of 15 kHz and the subcarrier spacing of 30 kHz, respectively. Frequency division multiplexing may be performed on different bandwidth parts, and in the case of transmitting and receiving data with a specific subcarrier spacing, a bandwidth part configured with the corresponding subcarrier spacing may be activated.

In addition, according to some embodiments, the base station may configure bandwidth parts having different bandwidths for the UE for the purpose of reducing power consumption of the UE. For example, if the UE supports a very large bandwidth, for example, a 100 MHz bandwidth, and always transmits and receives data through the corresponding bandwidth, very high power consumption may be caused. In particular, it is very inefficient in terms of power consumption for the UE to monitor unnecessary downlink control channels with a large bandwidth of 100 MHz in the absence of traffic. Therefore, the base station may configure a bandwidth part having a relatively small bandwidth, for example, a 20 MHz bandwidth part, for the UE for the purpose of reducing power consumption by the UE. In the absence of traffic, the UE may perform a monitoring operation in a 20 MHz bandwidth part, and, if data is produced, the UE may transmit and receive data using a 100 MHz bandwidth part according to the instruction of the base station.

In a method of configuring the bandwidth part, the UEs that have not yet been RRC-connected may receive configuration information about an initial bandwidth part through a master information block (MIB) in the initial access stage. More specifically, the UE may receive, from the MIB of a physical broadcast channel (PBCH), a configuration of a control resource set (CORESET) for a downlink control channel through which downlink control information (DCI) for scheduling a system information block (SIB) may be transmitted. The bandwidth of the control resource set configured through the MIB may be regarded as an initial bandwidth part, and the UE may receive a physical download shared channel (PDSCH) through which an SIB is transmitted through the configured initial bandwidth part. The initial bandwidth part may be used for other system information (OSI), paging, and random access, as well as the reception of an SIB.

Change of Bandwidth Part (BWP)

In the case where one or more bandwidth parts are configured for the UE, the base station may instruct the UE to change (switch or transition) the bandwidth part using a bandwidth part indicator field in the DCI. For example, if a currently active bandwidth part of the UE is bandwidth part #1 301 in FIG. 3, the base station may notify the UE of bandwidth part #2 302 using a bandwidth part indicator in the DCI, and the UE may perform changing of a bandwidth part to bandwidth part #2 302 indicated by the bandwidth part indicator in the received DCI.

As described above, since DCI-based bandwidth part change is indicated by the DCI for scheduling a PDSCH or a PUSCH, when the UE receives a request for changing the bandwidth part, the UE must easily receive and transmit a PDSCH or PUSCH scheduled by the corresponding DCI in the changed bandwidth part. To this end, the standard stipulates the requirements for a delay time ($T_{BWP}$) required when changing the bandwidth part, and may be defined, for example, as follows.

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability.
Note 2:
If the BWP switch involves changing of SCS, the BWP switch delay is determined by the larger one between the SCS before BWP switch and the SCS after BWP switch.

The requirements for a bandwidth part change delay time supports Type 1 or Type 2 depending on the capability of a UE. The UE may report a supported bandwidth part delay time type to the base station.

In accordance with the above-described requirements for a bandwidth part change delay time, when the UE receives DCI including a bandwidth part change indicator in slot n, the UE may complete a change to a new bandwidth part indicated by the bandwidth part change indicator at the time not later than slot n+$T_{BWP}$, and perform transmission/reception of a data channel scheduled by the corresponding DCI in the new changed bandwidth part. In the case where the base station is to schedule a data channel with a new bandwidth part, the base station may determine resource allocation for the data channel in the time domain in consideration of the bandwidth part change delay time ($T_{BWP}$) of the UE. That is, when scheduling a data channel with a new bandwidth part, the base station may schedule a corresponding data channel after the bandwidth part change delay time in a method of determining time domain resource assignment for the data channel. Accordingly, the UE may not expect that the DCI indicating the bandwidth part change will indicate a slot offset value (K0 or K2) smaller than the bandwidth part change delay time ($T_{BWP}$).

If the UE receives a DCI (e.g., DCI format 1_1 or 0_1) indicating a bandwidth part change, the UE may not perform any transmission or reception during a period of time from the third symbol of the slot in which a PDCCH including the corresponding DCI is received to the starting point of the slot indicated by a slot offset value (K0 or K2) indicated by a time-domain resource assignment indicator field in the corresponding DCI. For example, if the UE receives DCI indicating a bandwidth part change in slot n, and if the slot offset value indicated by the DCI is K, the UE may not perform any transmission or reception from the third symbol of slot n to the symbol before slot n+K (i.e., the last symbol of slot n+K−1).

SS/PBCH Block

Next, a synchronization signal (SS)/PBCH block in 5G will be described.

The SS/PBCH block may indicate a physical layer channel block comprised of a primary SS (PSS), a secondary SS (SSS), and a PBCH. More specifically, the SS/PBCH block may be as follows.

PSS: This is a reference signal for downlink time/frequency synchronization, and may provide some information of a cell ID.

SSS: This is a reference for downlink time/frequency synchronization, and may provide the remaining information of the cell ID, which is not provided by the PSS. Additionally, this may serve as a reference signal for demodulation of a PBCH.

PBCH: This may provide essential system information necessary for transmission and reception of a data channel and a control channel of a UE. The essential system information may include search space-related control information indicating radio resource mapping information of a control channel, scheduling control information for a separate data channel transmitting system information, and the like.

SS/PBCH block: The SS/PBCH block may be configured as a combination of a PSS, an SSS, and a PBCH. One or more SS/PBCH blocks may be transmitted within a time period of 5 ms, and each transmitted SS/PBCH block may be distinguished by an index.

The UE may detect a PSS and an SSS in the initial access stage, and may decode a PBCH. The UE may acquire an MIB from the PBCH, and may receive a configuration of control resource set (CORESET) #0 (this may correspond to a control resource set having an index "0") through the MIB. The UE may assume that a selected SS/PBCH block and a demodulation reference signal (DMRS) transmitted in control resource set #0 have a relationship of quasi co-location (QCL), thereby monitoring control resource set #0. The UE may receive system information through downlink control information transmitted in control resource set #0. The UE may obtain configuration information related to a random access channel (RACH), which is necessary for initial access, from the received system information. The UE may transmit a physical RACH (PRACH) to the base station in consideration of the selected SS/PBCH index, and the base station receiving the PRACH may obtain information on the SS/PBCH block index selected by the UE. The base station may recognize the block selected by the UE from among the respective SS/PBCH blocks and that control resource set #0 associated with the same is monitored.

DRX

Figure 6:
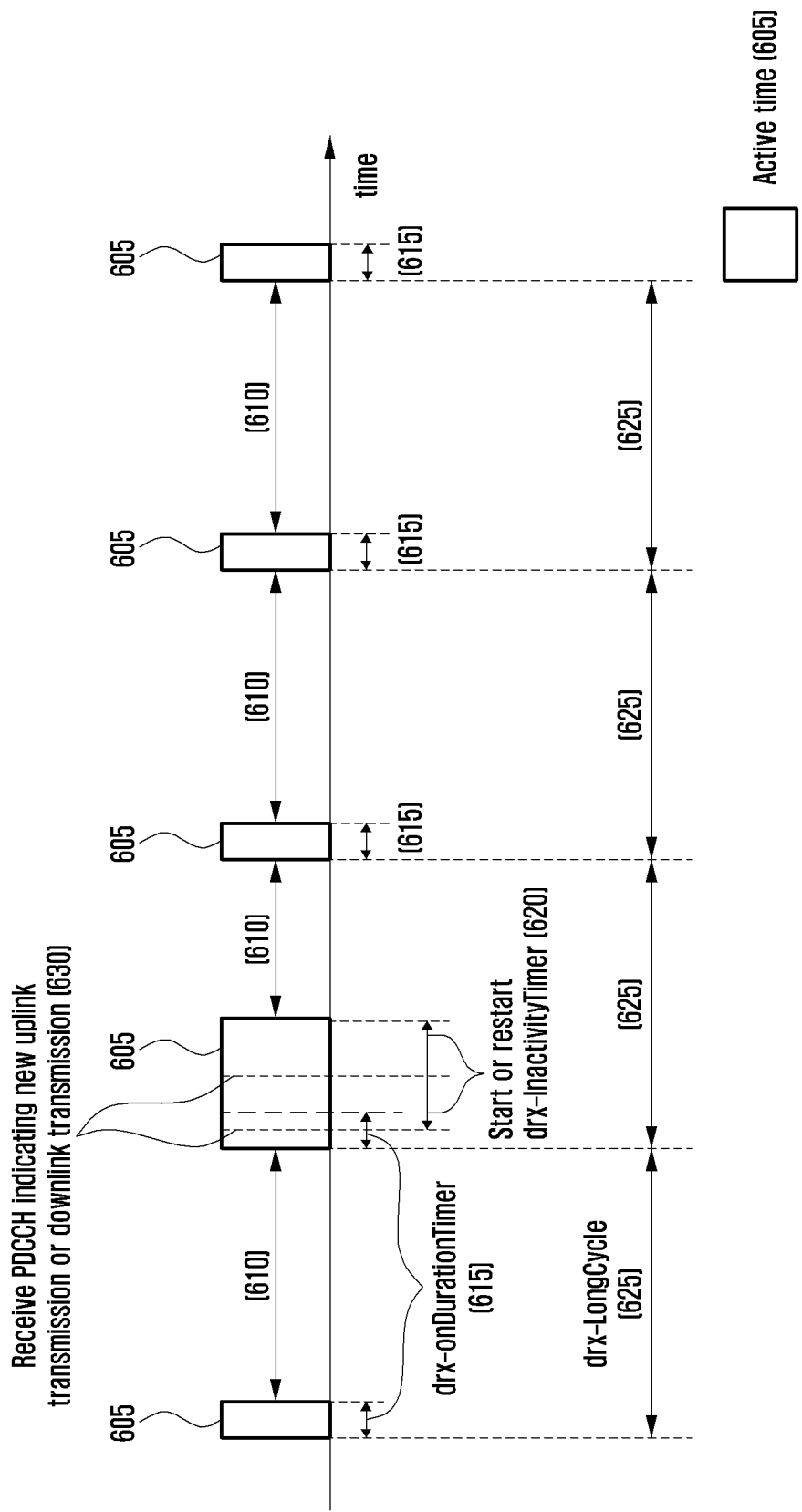
FIG. 6 is a diagram illustrating an example of a DRX operation in a wireless communication system according to an embodiment of the disclosure.

FIG. 6 is a diagram illustrating discontinuous reception (DRX) according to an embodiment of the disclosure.

Discontinuous reception (DRX) is an operation in which a UE using services discontinuously receives data in an RRC connected state in which a radio link is established between a base station and the UE. When DRX is applied, the UE may turn on a receiver at a specific time to monitor a control channel and, if there is no data received for a certain period of time, turn off the receiver to reduce power consumption of the UE. The DRX operation may be controlled by a MAC entity, based on various parameters and timers.

Referring to FIG. 6, an active time 605 is the time during which the UE wakes up every DRX cycle and monitors a PDCCH. The active time 605 may be defined as follows.

"drx-onDurationTimer", "drx-InactivityTimer", "drx-RetransmissionTimerDL", "drx-RetransmissionTimerUL", or "ra-ContentionResolutionTimer" is running;

a scheduling request is sent on a PUCCH and is pending; or a PDCCH indicating a new transmission addressed to a C-RNTI of a MAC entity has not been received after successful reception of a random access response for the random access preamble not selected by the MAC entity among the contention-based random access preamble.

"drx-onDurationTimer", "drx-InactivityTimer", "drx-RetransmissionTimerDL", "drx-RetransmissionTimerUL", "ra-ContentionResolutionTimer", and the like are timers whose values are configured by the base station and have a function of configuring the UE to monitor a PDCCH if a predetermined condition is satisfied.

The drx-onDurationTimer 615 is a parameter for configuring a minimum time during which the UE is awake in the DRX cycle. The drx-InactivityTimer 620 is a parameter for configuring the additional time during which the UE is awake when receiving a PDCCH indicating new uplink transmission or downlink transmission (630). The drx-RetransmissionTimerDL is a parameter for configuring a maximum time during which the UE is awake to receive downlink retransmission in a downlink HARQ procedure. The drx-RetransmissionTimerUL is a parameter for configuring a maximum time during which the UE is awake to receive an uplink retransmission grant in an uplink HARQ procedure. The drx-onDurationTimer, the drx-InactivityTimer, the drx-RetransmissionTimerDL, and the drx-RetransmissionTimerUL may be configured as, for example, time, the number of subframes, the number of slots, or the like. The ra-ContentionResolutionTimer is a parameter for monitoring a PDCCH in a random access procedure.

An inactive time 610 is a time configured not to monitor a PDCCH or a time configured not to receive a PDCCH during the DRX operation, and the remaining time excluding an active time 605 from the total time of the DRX operation may be the inactive time 610. If the UE does not monitor a PDCCH during the active time 605, the UE may enter a sleep or inactive state to reduce power consumption.

A DRX cycle indicates the cycle in which the UE wakes up and monitors a PDCCH. That is, the DRX cycle indicates a time interval after the monitoring a PDCCH to monitoring the next PDCCH by the UE or a period of on-duration generation. There are two types of DRX cycles, i.e., a short DRX cycle and a long DRX cycle. The short DRX cycle may be selectively applied.

The long DRX cycle 625 is the longest of the two DRX cycles configured in the UE. During the operation in the long DRX cycle, the UE restarts the drx-onDurationTimer 615 after the long DRX cycle 625 has elapsed from the start point (e.g., a start symbol) of the drx-onDurationTimer 615. During the operation in the long DRX cycle 625, the UE may start the drx-onDurationTimer 615 in a slot after "drx-SlotOffset" in a subframe satisfying Equation 1 below. Here, "drx-SlotOffset" indicates a delay before the start of the drx-onDurationTimer 615. The drx-SlotOffset may be configured as, for example, time, the number of slots, or the like.

$$[(SFN \times 10) + \text{subframe number}] \bmod (\text{drx-LongCycle}) = \text{drx-StartOffset} \quad \text{Equation 1}$$

In this case, "drx-LongCycleStartOffset" and "drx-StartOffset" may be used to define the long DRX cycle 625 and a subframe in which the long DRX cycle 625 is to start. The drx-LongCycleStartOffset may be configured as, for example, time, number of subframes, number of slots, or the like.

PDCCH: In Relation to DCI

Next, downlink control information (DCI) in a 5G system will be described in detail.

In a 5G system, scheduling information about uplink data (or a physical uplink shared channel, PUSCH) or downlink data {or a physical downlink data channel (a physical downlink shared channel, PDSCH)} may be transmitted from a base station to a UE through DCI. The UE may monitor a fallback DCI format and a non-fallback DCI format with respect to a PUSCH or PDSCH. The fallback DCI format may be configured as a fixed field that is predefined between the base station and the UE, and the non-fallback DCI format may include a configurable field.

The DCI may be transmitted through a physical downlink control channel (PDCCH) after a channel coding and modulation process. A cyclic redundancy check (CRC) may be attached to the payload of a DCI message, and the CRC may be scrambled with a radio network temporary identifier (RNTI) corresponding to the identity of the UE. Different RNTIs may be used depending on the purpose of a DCI message, for example, transmission of UE-specific data, power control command, random access response, or the like. That is, the RNTI is included in the CRC calculation process, and transmitted, instead of being explicitly transmitted. If a DCI message transmitted through a PDCCH is received, the UE may check the CRC using the allocated RNTI, and if the CRC check result is correct, the UE may recognize that the message is intended for the UE.

For example, the DCI for scheduling a PDSCH for system information (SI) may be scrambled by an SI-RNTI. The DCI for scheduling a PDSCH for a random access response (RAR) message may be scrambled by an RA-RNTI. The DCI for scheduling a PDSCH for a paging message may be scrambled by a P-RNTI. The DCI for transmitting a notification of a slot format indicator (SFI) may be scrambled by an SFI-RNTI. The DCI for transmitting a notification of transmit power control (TPC) may be scrambled by a TPC-RNTI. The DCI for scheduling a UE-specific PDSCH or PUSCH may be scrambled by a cell-RNTI (C-RNTI).

DCI format 0_0 may be used as fallback DCI for scheduling a PUSCH, and in this case, the CRC may be scrambled by a C-RNTI. DCI format 0_0 in which the CRC is scrambled by a C-RNTI may include, for example, information below.

TABLE 4

- Identifier for DCI formats - [1] bit
- Frequency domain resource assignment - [$\lceil \log_2( N_{RB}^{UL,BWP}(N_{RB}^{UL,BWP} + 1)/2) \rceil$] bits
- Time domain resource assignment - X bits
- Frequency hopping flag - 1 bit.
- Modulation and coding scheme - 5 bits
- New data indicator - 1 bit
- Redundancy version - 2 bits
- HARQ process number - 4 bits
- TPC command for scheduled PUSCH - [2] bits
- UL/SUL indicator - 0 or 1 bit DCI format 0_1 may be used as non-fallback DCI for scheduling a PUSCH, and in this case, the CRC may be scrambled by a C-RNTI. DCI format 0_1 in which the CRC is scrambled by a C-RNTI may include, for example, information below.

TABLE 5

- Carrier indicator-0 or 3 bits
- UL/SUL indicator-0 or 1 bit
- Identifier for DCI formats-[1] bits
- Bandwidth part indicator-0, 1 or 2 bits
- Frequency domain resource assignment
  - For resource allocation type 0, $\lceil N_{RB}^{UL,BWP}/P \rceil$ bits
  - For resource allocation type 1, $\lceil \log_2(N_{RB}^{UL,BWP}(N_{RB}^{UL,BWP} + 1)/2) \rceil$ bits
- Time domain resource assignment-1, 2, 3, or 4 bits
- VRB-to-PRB mapping-0 or 1 bit, only for resource allocation type 1.
  - 0 bit if only resource allocation type 0 is configured;
  - 1 bit otherwise.
- Frequency hopping flag-0 or 1 bit, only for resource allocation type 1.
  - 0 bit if only resource allocation type 0 is configured;
  - 1 bit otherwise.
- Modulation and coding scheme-5 bits
- New data indicator-1 bit
- Redundancy version-2 bits
- HARQ process number-4 bits
- 1st downlink assignment index-1 or 2 bits
  - 1 bit for semi-static HARQ-ACK codebook;
  - 2 bits for dynamic HARQ-ACK codebook with single HARQ-ACK codebook.

TABLE 5-continued

- 2nd downlink assignment index-0 or 2 bits
  - 2 bits for dynamic HARQ-ACK codebook with two HARQ-ACK sub-codebooks;
  - 0 bit otherwise.
- TPC command for scheduled PUSCH-2 bits
- SRS resource indicator $- \left\lceil \log_2\left( \sum_{k=1}^{L_{max}} \binom{N_{SRS}}{k} \right) \right\rceil \lceil \log_2(N_{SRS}) \rceil$ bits

- $\left\lceil \log_2\left( \sum_{k=1}^{L_{max}} \binom{N_{SRS}}{k} \right) \right\rceil$ bits for non-codebook based PUSCH transmission;
  - $\lceil \log_2(N_{SRS}) \rceil$ bits for codebook based PUSCH transmission.
- Precoding information and number of layers-up to 6 bits
- Antenna ports-up to 5 bits
- SRS request-2 bits
- CSI request-0, 1, 2, 3, 4, 5, or 6 bits
- CBG transmission information-0, 2, 4, 6, or 8 bits
- PTRS-DMRS association-0 or 2 bits.
- beta_offset indicator-0 or 2 bits
- DMRS sequence initialization-0 or 1 bit DCI format 1_0 may be used as fallback DCI for scheduling a PDSCH, and in this case, the CRC may be scrambled by a C-RNTI. DCI format 1_0 in which the CRC is scrambled by a C-RNTI may include, for example, information below.

TABLE 6

- Identifier for DCI formats - [1] bit
- Frequency domain resource assignment -[$\lceil \log_2( N_{RB}^{DL,BWP}(N_{RB}^{DL,BWP} + 1)/2) \rceil$] bits
- Time domain resource assignment - X bits
- VRB-to-PRB mapping - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- PUCCH resource indicator - 3 bits
- PDSCH-to-HARQ feedback timing indicator - [3] bits DCI format 1_1 may be used as non-fallback DCI for scheduling a PDSCH, and in this case, the CRC may be scrambled by a C-RNTI. DCI format 1_1 in which the CRC is scrambled by a C-RNTI may include, for example, information below.

a control resource set identity, the frequency location of the control resource set, the symbol duration of the control resource set, and the like. For example, the configuration of the control resource set may include, for example, information below.

TABLE 7

- Carrier indicator - 0 or 3 bits
- Identifier for DCI formats - [1] bits
- Bandwidth part indicator - 0, 1 or 2 bits
- Frequency domain resource assignment
  - For resource allocation type 0, $\lceil N_{RB}^{DL,BWP}/P \rceil$ bits
  - For resource allocation type 1, $\lceil \log_2( N_{RB}^{DL,BWP}(N_{RB}^{DL,BWP} + 1)/2) \rceil$ bits
- Time domain resource assignment -1, 2, 3, or 4 bits
- VRB-to-PRB mapping - 0 or 1 bit, only for resource allocation type 1.
  - 0 bit if only resource allocation type 0 is configured;
  - 1 bit otherwise.
- PRB bundling size indicator - 0 or 1 bit
- Rate matching indicator - 0, 1, or 2 bits
- ZP CSI-RS trigger - 0, 1, or 2 bits For transport block 1:
- Modulation and coding scheme - 5 bits
- New data indicator - 1 bit
- Redundancy version - 2 bits For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5 or 6 bits
- Transmission configuration indication - 0 or 3 bits
- SRS request - 2 bits
- CBG transmission information - 0, 2, 4, 6, or 8 bits
- CBG flushing out information - 0 or 1 bit
- DMRS sequence initialization - 1 bit PDCCH: CORESET, REG, CCE, and Search Space Hereinafter, a downlink control channel in a 5G communication system will be described in more detail with reference to the drawings.

Figure 4:
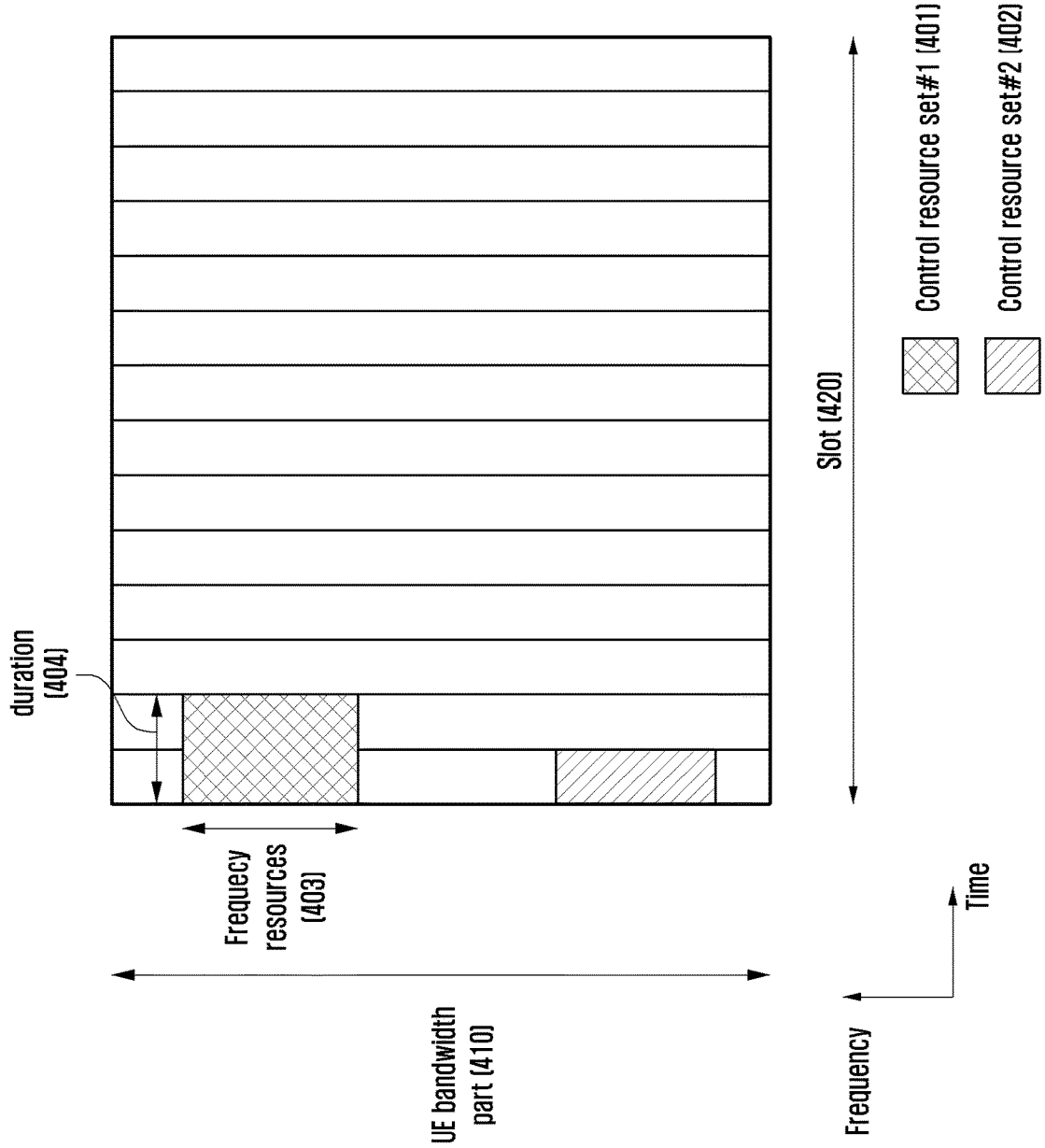
FIG. 4 is a diagram illustrating an example of a configuration of a control resource set of a downlink control channel in a wireless communication system according to an embodiment of the disclosure.

FIG. 4 is a diagram illustrating an example of a configuration of a control resource set (CORESET) in which a downlink control channel is transmitted in a 5G wireless communication system according to an embodiment of the disclosure. FIG. 4 illustrates an example in which two control resource sets (control resource set #1 401 and control resource set #2 402) are configured in a UE bandwidth part 410 in the frequency domain and in one slot 420 in the time domain. The control resource set 401 or 402 may be configured in a specific frequency resource 403 within the entire UE bandwidth part 410 in the frequency domain. The control resource set 401 or 402 may be configured using one or more OFDM symbols in the time domain, and this may be defined as control resource set duration 404.

Referring to FIG. 4, control resource set #1 401 may be configured to have a control resource set duration of two symbols, and control resource set #2 402 may be configured to have a control resource set duration of one symbol.

The above-described control resource sets in 5G may be configured through higher layer signaling {e.g., system information, a master information block (MIB), and radio resource control (RRC) signaling} transmitted from the base station to the UE. Configuring the control resource set for the UE denotes providing the UE with information such as

TABLE 8

```
ControlResourceSet ::=           SEQUENCE {
  -- Corresponds to L1 parameter 'CORESET-ID'
  controlResourceSetId           ControlResourceSetId,
  frequencyDomainResources       BIT STRING (SIZE (45)),
  duration                       INTEGER (1..maxCoReSetDuration),
  cce-REG-MappingType            CHOICE {
    interleaved                  SEQUENCE {
      reg-BundleSize             ENUMERATED {n2, n3, n6},
      precoderGranularity        ENUMERATED
        {sameAsREG-bundle, allContiguousRBs},
      interleaverSize            ENUMERATED {n2, n3, n6}
      shiftIndex
        INTEGER(0..maxNrofPhysicalResourceBlocks–1)
          OPTIONAL
    },
    nonInterleaved               NULL
  },
  tci-StatesPDCCH                SEQUENCE(SIZE
    (1..maxNrofTCI-StatesPDCCH)) OF TCI-StateId
      OPTIONAL,
  tci-PresentInDCI               ENUMERATED {enabled}
                                 OPTIONAL,  -- Need S
}
```

In Table 8, "tci-StatesPDCCH" {hereinafter simply referred to as "a transmission configuration indication (TCI) state"} configuration information may include information on one or more synchronization signal (SS)/physical broadcast channel (PBCH) block indexes or channel state information reference signal (CSI-RS) indexes having a quasi co-located (QCL) relationship with a DMRS transmitted in the corresponding control resource set.

Figure 5A:
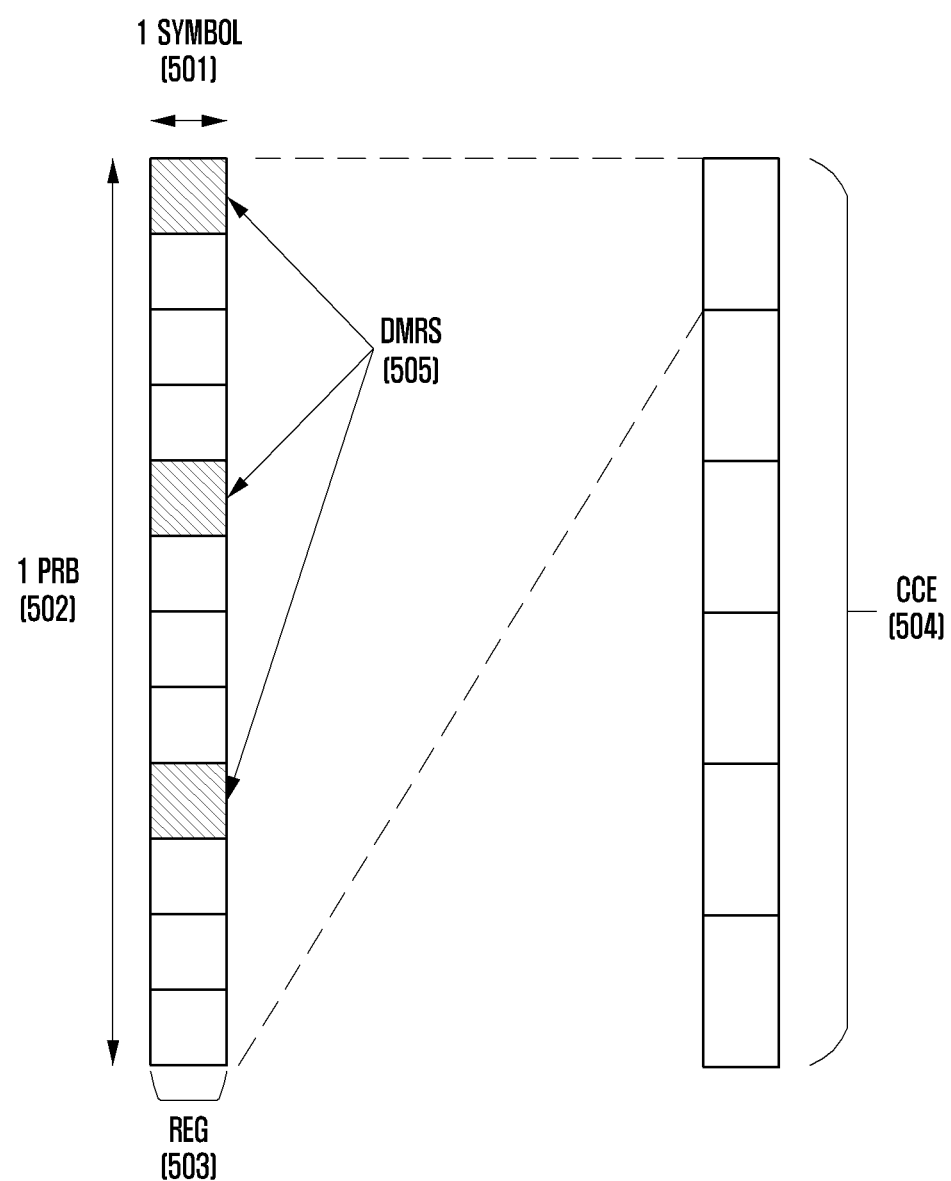
FIG. 5A is a diagram illustrating the structure of a downlink control channel in a wireless communication system according to an embodiment of the disclosure.

FIG. 5A is a diagram illustrating an example of a basic unit of time and frequency resources constituting a downlink control channel used in 5G according to an embodiment of the disclosure.

Referring to FIG. 5A, a basic unit of time and frequency resources constituting a control channel may be referred to as a resource element group (REG) 503, and the REG 503 may be defined as one OFDM symbol 501 in the time domain and one physical resource block (PRB) 502 in the frequency domain, that is, it may be defined as 12 subcarriers. The base station may configure a downlink control channel allocation unit by concatenating the REG 503.

Referring to FIG. 5A, assuming that the basic unit in which the downlink control channel is allocated in 5G is a control channel element (CCE) 504, one CCE 504 may be comprised of a plurality of REGs 503. For example, the REG 503 shown in FIG. 5A may be comprised of 12 REs, and if one CCE 504 is comprised of six REGs 503, one CCE 504 may be comprised of 72 REs. If the downlink control resource set is configured, the corresponding area may be comprised of a plurality of CCEs 504, and a specific downlink control channel may be mapped to one or more CCEs 504 according to the aggregation level (AL) in the control resource set, and may be transmitted. The CCEs 504 in the control resource set may be identified by numbers, and the numbers of the CCEs 504 may be assigned according to a logical mapping method.

The basic unit of the downlink control channel shown in FIG. 5A, that is, the REG 503, may include both the REs to which DCI is mapped and an area to which the DMRS 505, which is a reference signal for decoding the same, is mapped. Referring to FIG. 5A, three DMRSs 505 may be transmitted in one REG 503. The number of CCEs required for transmitting a PDCCH may be 1, 2, 4, 8, or 16 depending on the aggregation level (AL), and the different numbers of CCEs may be used to implement link adaptation of the downlink control channel. For example, if AL=L, one downlink control channel may be transmitted through L CCEs. The UE needs to detect a signal without being aware of information about the downlink control channel, and a search space indicating a set of CCEs is defined for blind decoding. The search space is a set of downlink control channel candidates comprised of CCEs that the UE must attempt to decode in a given aggregation level, and since there are various aggregation levels making one bundle of 1, 2, 4, 8, or 16 CCEs, the UE may have a plurality of search spaces. A search space set may be defined as a set of search spaces in all configured aggregation levels.

The search spaces may be classified into a common search space and a UE-specific search space. A specific group of UEs or all UEs may check a common search space of a PDCCH in order to receive cell-common control information such as dynamic scheduling for system information or a paging message. For example, the UE may receive PDSCH scheduling allocation information for transmission of an SIB including cell operator information and the like by checking the common search space of a PDCCH. In the case of the common search space, since a specific group of UEs or all UEs must receive a PDCCH, the common search space may be defined as a set of predetermined CCEs. The scheduling allocation information for a UE-specific PDSCH or PUSCH may be received by checking a UE-specific search space of a PDCCH. The UE-specific search space may be UE-specifically defined as a function of the UE identity and various system parameters.

In 5G, the parameters of the search space for a PDCCH may be configured for the UE by the base station using higher layer signaling (e.g., SIB, MIB, or RRC signaling). For example, the base station may configure the number of PDCCH candidates in each aggregation level L, monitoring periodicity for the search space, a monitoring occasion in units of symbols within a slot for the search space, a search space type (a common search space or a UE-specific search space), a combination of a DCI format and an RNTI to be monitored in the corresponding search space, a control resource set index for monitoring the search space, and the like for the UE. For example, the configuration may include, for example, information below.

TABLE 9

```
SearchSpace ::=                              SEQUENCE {
    -- Identity of the search space. SearchSpaceId = 0 identifies the
    SearchSpace configured via PBCH (MIB) or ServingCellConfigCommon.
    searchSpaceId                            SearchSpaceId,
    controlResourceSetId                     ControlResourceSetId,
    monitoringSlotPeriodicityAndOffset       CHOICE {
        sl1                                      NULL,
        sl2                                      INTEGER (0..1),
        sl4                                      INTEGER (0..3),
        sl5                                      INTEGER (0..4),
        sl8                                      INTEGER (0..7),
        sl10                                     INTEGER (0..9),
        sl16                                     INTEGER (0..15),
        sl20                                     INTEGER (0..19)
    }
                                             OPTIONAL,
    duration           INTEGER (2..2559)
    monitoringSymbolsWithinSlot                  BIT STRING (SIZE (14))
                                                 OPTIONAL,
    nrofCandidates                           SEQUENCE {
        aggregationLevel1                        ENUMERATED {n0, n1, n2, n3,
        n4, n5, n6, n8},
        aggregationLevel2                        ENUMERATED {n0, n1, n2, n3,
        n4, n5, n6, n8},
        aggregationLevel4                        ENUMERATED {n0, n1, n2, n3,
        n4, n5, n6, n8},
        aggregationLevel8                        ENUMERATED {n0, n1, n2, n3,
        n4, n5, n6, n8},
        aggregationLevel16                       ENUMERATED {n0, n1, n2, n3,
        n4, n5, n6, n8}
```

TABLE 9-continued

```
},
searchSpaceType                    CHOICE {
  -- Configures this search space as common search space (CSS) and DCI
  formats to monitor.
  common                           SEQUENCE {
}
  ue-Specific                      SEQUENCE {
    -- Indicates whether the UE monitors in this USS for DCI formats 0-0
    and 1-0 or for formats 0-1 and 1-1.
    formats                        ENUMERATED {formats0-0-
  And-1-0, formats0-1-And-1-1},
    ...
  }
```

The base station may configure one or more search space sets for the UE, based on configuration information. According to some embodiments, the base station may configure search space set 1 and search space set 2 for the UE, configure DCI format A scrambled by an X-RNTI in search space set 1 so as to be monitored in the common search space, and configure DCI format B scrambled by a Y-RNTI in the search space set 2 so as to be monitored in the UE-specific search space.

According to configuration information, the common search space or the UE-specific search space may include one or more search space sets. For example, search space set #1 and search space set #2 may be configured as the common search space, and search space set #3 and search space set #4 may be configured as the UE-specific search space.

In the common search space, a combination of DCI formats and RNTIs may be monitored as follows. However, the disclosure is not limited thereto.

DCI format 0_0/1_0 with CRC scrambled by C-RNTI, CS-RNTI, SP-CSI-RNTI, RA-RNTI, TC-RNTI, P-RNTI, and SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI and TPC-PUCCH-RNTI DCI format 2_3 with CRC scrambled by TPC-SRS-RNTI In the UE-specific search space, a combination of DCI formats and RNTIs may be monitored as follows. However, the disclosure is not limited thereto.

DCI format 0_0/1_0 with CRC scrambled by C-RNTI, CS-RNTI, and TC-RNTI

DCI format 1_0/1_1 with CRC scrambled by C-RNTI, CS-RNTI, and TC-RNTI

The specified RNTIs may follow the definitions and usages as follows.

Cell RNTI (C-RNTI) for scheduling of UE-specific PDSCH

Temporary cell RNTI (TC-RNTI) for scheduling of UE-specific PDSCH

Configured scheduling RNTI (CS-RNTI) for scheduling of semi-statically configured UE-specific PDSCH Random access RNTI (RA-RNTI) for scheduling of PDSCH in random access stage Paging RNTI (P-RNTI) for scheduling of PDSCH in which paging is transmitted System information RNTI (SI-RNTI) for scheduling of PDSCH in which system information is transmitted Interruption RNTI (INT-RNTI) for informing of puncturing on PDSCH Transmit power control for PUSCH RNTI (TPC-PUSCH-RNTI) for indicating power control command for PUSCH Transmit power control for PUCCH RNTI (TPC-PUCCH-RNTI) for indicating power control command for PUCCH Transmit power control for SRS RNTI (TPC-SRS-RNTI) for indicating power control command for SRS The above-described DCI formats may follow the definitions as follows.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of an aggregation level L in a control resource set p and a search space set s may be expressed as in Equation 2 below.

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right\} + i \quad \text{Equation 2}$$

L: Aggregation level $n_{CI}$: Carrier index $N_{CCE,p}$: Total number of CCEs in control resource set p $n_{s,f}^\mu$: Slot index $M_{s,max}^{(L)}$: The number of PDCCH candidates in aggregation level L $m_{s,n_{CI}} = 0, \ldots, M_{s,max}^{(L)} - 1$: PDCCH candidate index in aggregation level L $i = 0, \ldots, L-1$ $$-Y_{p,n_{s,f}^\mu} = \left( A_p \cdot Y_{p,n_{s,f}^\mu - 1} \right) \bmod D,$$

$Y_{p,-1}=n_{RNTI}\neq 0$, $A_p=39827$ for p mod 3=0, $A_p=39829$ for p mod 3=1, $A_p=39839$ for p mod 3=2, and D=65537

$n_{RNTI}$: UE identity

The value $$Y_{p,n_{s,f}^\mu}$$

may correspond to zero in the case of a common search space.

In the case of a UE-specific search space, the value $$Y_{p,n_{s,f}^\mu}$$

may correspond to a value that varies depending on the UE identity (C-RNTI or an ID set to the UE by the base station) and a time index.

In 5G, since a plurality of search space sets may be configured using different parameters (e.g., the parameters in Table 9), a set of search space sets monitored by the UE may differ at each time. For example, if search space set #1 is configured in an X-slot periodicity, if search space set #2 is configured in a Y-slot periodicity, and if X and Y are different, the UE may monitor both search space set #1 and search space set #2 in a specific slot, and may monitor one of search space set #1 and search space set #2 in a specific slot.

PDCCH: Span

The UE may perform reporting of UE capability for each subcarrier spacing in the case where there is a plurality of PDCCH monitoring occasions within a slot, and in this case, the concept of a span may be used. A span indicates consecutive symbols that the UE is able to monitor PDCCHs in a slot, and each PDCCH monitoring occasion is within one span. The span may be expressed as (X, Y), where X indicates the minimum number of symbols by which first symbols of two consecutive spans must be spaced apart from each other, and Y indicates the number of consecutive symbols capable of monitoring PDCCHs within one span. In this case, the UE may monitor PDCCHs in the period of Y symbols from the first symbol of the span in the span.

Figure 5B:
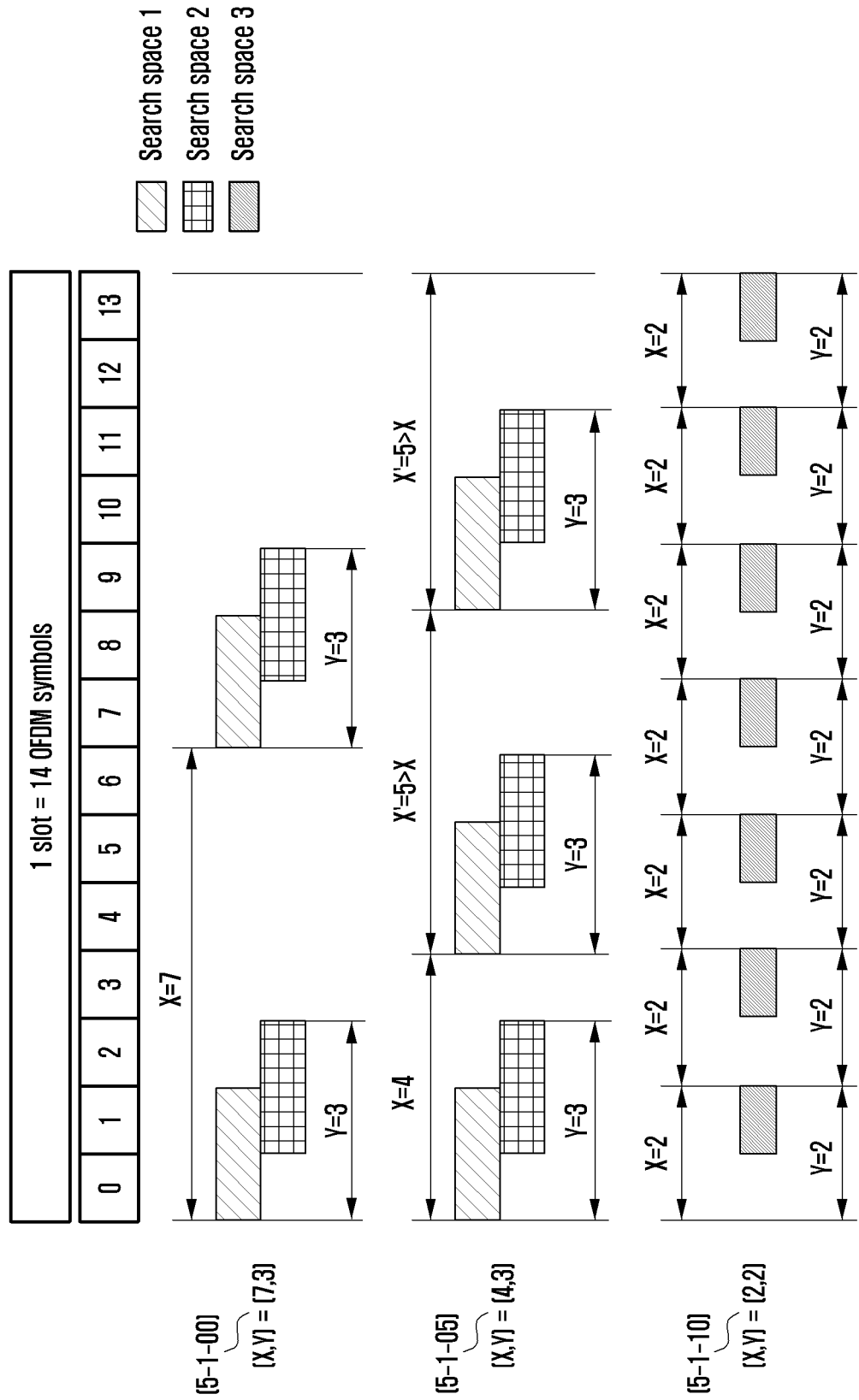
FIG. 5B is a diagram illustrating the case in which a user equipment has a plurality of PDCCH monitoring occasions within a slot in a wireless communication system through a span according to an embodiment of the disclosure.

FIG. 5B is a diagram illustrating the case in which a UE has a plurality of PDCCH monitoring occasions within a slot through a span in a wireless communication system according to an embodiment of the disclosure. span (X, Y)=(7,3), (4,3), and (2,2) may be possible, and the three cases are expressed as (5-1-00), (5-1-05), and (5-1-10), respectively, in FIG. 5B.

Referring to FIG. 5B, (5-1-00) represents the case in which two spans expressed as (7,3) exist in a slot. The spacing between first symbols of two spans is expressed as X=7, and PDCCH monitoring occasions may exist within a total of Y=3 symbols from the first symbol of each span, and search spaces 1 and 2 exist within Y=3 symbols. As another example, (5-1-05) represents the case where a total of three spans expressed as (4,3) exist in the slot and where the spacing between the second and third spans is X'=5 symbols greater than X=4.

PDCCH: UE Capability Report

The slot position in which the above-described common search space and UE-specific search space are located is indicated by the parameter "monitoringSymbolsWithinSlot" in Table 11-1, and the symbol position in the slot is indicated by a bitmap through the parameter "monitoringSymbolsWithinSlot" in Table 9. The symbol position within a slot in which the UE is able to monitor the search space may be reported to the base station through the following UE capabilities.

UE capability 1 (hereinafter referred to as "FG 3-1"). This UE capability indicates, in the case where one monitoring occasion (MO) for common search spaces or UE-specific search spaces in type 1 and type 3 exists in the slot as shown in Table 11-1 below, the capability of monitoring the corresponding MO when the corresponding MO is positioned in the first three symbols. This UE capability is a mandatory capability that all UEs supporting NR must support, and whether or not to support this capability is not explicitly reported to the base station.

TABLE 11-1

| Index | Feature group | Components | Field name in TS 38.331 [2] |
|---|---|---|---|
| 3-1 | Basic DL control channel | 1) One configured CORESET per BWP per cell in addition to CORESET0<br>CORESET resource allocation of 6RB bit-map and duration of 1-3 OFDM symbols for FR1<br>For type 1 CSS without dedicated RRC configuration and for type 0, 0A, and 2 CSSs, CORESET resource allocation of 6RB bit-map and duration 1-3 OFDM symbols for FR2<br>For type 1 CSS with dedicated RRC configuration and for type 3 CSS, EE specific SS, CORESET resource allocation of 6RB bit-map and duration 1-2 OFDM symbols for FR2<br>REG-bundle sizes of ⅔ RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled SCell per BWP<br>This search space limit is before applying all dropping rules.<br>For type 1 CSS with dedicated RRC | n/a |

TABLE 11-1-continued

| Index | Feature group | Components | Field name in TS 38.331 [2] |
|---|---|---|---|
| | | configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1- CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | |

UE capability 2 (hereinafter referred to as "FG 3-2"). This UE capability indicates, in the case where one monitoring occasion (MO) for a common search space or a UE-specific search space exists in the slot as shown in Table 11-2 below, the capability of monitoring the MO, regardless of the location of the start symbol of the corresponding MO. This UE capability is selectively supported by the UE (optional), and whether or not to support this capability is explicitly reported to the base station.

TABLE 11-2

| Index | Feature group | Components | Field name in TS 38.331 [2] |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoringSingleOccasion |

UE capability 3 (hereinafter referred to as "FG 3-5, 3-5a, or 3-5b"). This UE capability indicates, in the case where a plurality of monitoring occasions (MOs) for a common search space or a UE-specific search space exists in the slot as shown in Table 11-3 below, a pattern of the MO capable of being monitored by the UE. The above-described pattern is comprised of spacing X between start symbols of different MOs and a maximum symbol length Y for one MO. A combination of (X, Y) supported by the UE may be one or more of {(2, 2), (4, 3), (7, 3)}. This UE capability is selectively supported by the UE (optional), and whether or not to support this capability and the above-mentioned combination (X, Y) is explicitly reported to the base station.

TABLE 11-3

| Index | Feature group | Components | Field name in TS 38.331 [2] |
|---|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-MonitoringAnyOccasions {<br>3-5. withoutDCI-Gap<br>3-5a. withDCI-Gap<br>} |
| 3-5a | For type 1 CSS with dedicated RRC configuration, | For type 1 CSS with dedicated RRC configuration, type 3 CSS and UE-SS, monitoring occasion can be any OFDM symbol(s) of a slot for Case | |

TABLE 11-3-continued

| Index | Feature group | Components | Field name in TS 38.331 [2] |
|---|---|---|---|
| | type 3 CSS, and UE-SS, monitoring occasion can be any OFDM symbol(s) of a slot for Case 2 with a DCI gap | 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as<br>2 OFDM symbols for 15 kHz<br>4 OFDM symbols for 30 kHz<br>7 OFDM symbols for 60 kHz with NCP<br>11 OFDM symbols for 120 kHz<br>Up to one unicast DL DCI and up to one unicast UL DCI in a monitoring occasion except for the monitoring occasions of FG 3-1.<br>In addition, for TDD the minimum separation between the first two UL unicast DCIs within the first 3 OFDM symbols of a slot can be zero OFDM symbols. | |
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), 0 <= l <= 13 is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary.<br>For the set of monitoring occasions which are within the same span:<br>Processing one unicast DCI scheduling DL and one unicast DCI scheduling UL per scheduled CC across this set of monitoring occasions for FDD<br>Processing one unicast DCI | |

TABLE 11-3-continued

| Index | Feature group | Components | Field name in TS 38.331 [2] |
|---|---|---|---|
| | | scheduling DL and two unicast DCI scheduling UL per scheduled CC across this set of monitoring occasions for TDD Processing two unicast DCI scheduling DL and one unicast DCI scheduling UL per scheduled CC across this set of monitoring occasions for TDD The number of different start symbol indices of spans for all PDCCH monitoring occasions per slot, including PDCCH monitoring occasions of FG-3-1, is no more than floor(14/X) (X is minimum among values reported by UE). The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in SCell. | |

The UE may report whether or not to support the above-described UE capability 2 and/or UE capability 3 and related parameters to the base station. The base station may perform resource allocation in the time domain for a common search space and a UE-specific search space, based on the reported UE capability. During the resource allocation, the base station may not assign the MO at the position where the UE is unable to monitor the same.

PDCCH: BD/CCE Limit

In the case where a plurality of search space sets is configured for the UE, the following conditions may be considered in a method for determining a search space set to be monitored by the UE.

If a value "monitoringCapabilityConfig-r16", which is higher layer signaling, is configured as "r15monitoringcapability", the UE defines the maximum values of the number of PDCCH candidates capable of being monitored and the number of CCEs constituting the entire search space (here, the entire search space indicates an entire CCE set corresponding to the union area of a plurality of search space sets) for each slot, and if the value "monitoringCapabilityConfig-r16" is configured as "r16monitoringcapability", the UE defines the maximum values of the number of PDCCH candidates capable of being monitored and the number of CCEs constituting the entire search space (here, the entire search space indicates an entire CCE set corresponding to the union area of a plurality of search space sets) for each span.

Condition 1: Limit of Maximum Number of PDCCH Candidates

According to the configuration value of higher layer signaling described above, $M^\mu$, the maximum number of PDCCH candidates capable of being monitored by the UE, may be configured according to Table 12-1 below if it is defined based on a slot, and may be configured according to Table 12-2 below if it is defined based on a span, in a cell having a subcarrier spacing of $15 \cdot 2^\mu$ kHz.

TABLE 12-1

| $\mu$ | Maximum number of PDCCH candidates per slot and per serving cell ($M^\mu$) |
|---|---|
| 0 | 44 |
| 1 | 36 |
| 2 | 22 |
| 3 | 20 |

TABLE 12-2

| | Maximum number $M^\mu$ of monitored PDCCH candidates per span for combination (X, Y) and per serving cell | | |
|---|---|---|---|
| $\mu$ | (2, 2) | (4, 3) | (7, 3) |
| 0 | 14 | 28 | 44 |
| 1 | 12 | 24 | 36 |

Condition 2: Limit of Maximum Number of CCEs

According to the configuration value of higher layer signaling described above, $C^\mu$, the maximum number of CCEs constituting the entire search space (here, the entire search space indicates the entire CCE set corresponding to the union area of a plurality of search space sets), may be configured according to Table 12-3 below if it is defined based on a slot, and may be configured according to Table 12-4 below if it is defined based on a span, in a cell having a subcarrier spacing of $15 \cdot 2^\mu$ kHz.

TABLE 12-3

| $\mu$ | Maximum number of non-overlapped CCEs per slot and per serving cell ($C^\mu$) |
|---|---|
| 0 | 56 |
| 1 | 56 |
| 2 | 48 |
| 3 | 32 |

TABLE 12-4

| | Maximum number $C^H$ of non-overlapped CCEs per span for combination (X, Y) and per serving cell | | |
|---|---|---|---|
| μ | (2, 2) | (4, 3) | (7, 3) |
| 0 | 18 | 36 | 56 |
| 1 | 18 | 36 | 56 |

For convenience of explanation, a situation that satisfies both conditions 1 and 2 at a specific time is defined as "condition A". Therefore, a situation that does not satisfy condition A may indicate that the situation does not satisfy at least one of conditions 1 and 2 above.

PDCCH: Overbooking

Condition A may not be satisfied at a specific time depending on the configuration of search space sets by the base station. If condition A is not satisfied at a specific time, the UE may select and monitor only some of the search space sets configured to satisfy condition A at that time, and the base station may transmit a PDCCH to the selected search space sets.

Selection of some search spaces from among the overall configured search space sets may be performed according to the following methods.

If condition A for a PDCCH is not satisfied at a specific time (slot), the UE (or the base station) may preferentially select the search space set in which the search space type is configured as a common search space from among the search space sets existing at the corresponding time, instead of the search space set in which the search space type is configured as a UE-specific search space.

If all search space sets configured as a common search space are selected (i.e., if condition A is satisfied even after selecting all search spaces configured as a common search space), the UE (or the base station) may select the search space sets configured as a UE-specific search space. In this case, if there are a plurality of search space sets configured as a UE-specific search space, the search space set having a lower search space set index may have a higher priority. The UE or the base station may select UE-specific search space sets within a range in which condition A is satisfied in consideration of priority.

QCL and TCI States

In a wireless communication system, one or more different antenna ports (these may be replaced with one or more channels, signals, and a combination thereof, and will be collectively referred to as "different antenna ports" in the description of the disclosure below for convenience) may be associated with each other by quasi co-location (QCL) configuration as shown in Table 13 below. The TCI state is intended to announce the QCL relationship between a PDCCH (or a PDCCH DMRS) and another RS or channel, and the case where a certain reference antenna port A (reference RS #A) and another target antenna port B (target RS #B) are "QCLed" indicates that the UE is allowed to apply some or all of large-scale channel parameters estimated from the antenna port A to measurement of a channel from the antenna port B. QCL is required to associate different parameters depending on the situation, such as 1) time tracking affected by average delay and delay spread, 2) frequency tracking affected by Doppler shift and Doppler spread, 3) radio resource management (RRM) affected by average gain, 4) beam management (BM) affected by spatial parameters, and the like. Accordingly, NR supports four types of QCL relationships as shown in Table 13 below.

TABLE 13

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

Spatial RX parameters may refer to some or all of various parameters such as angle of arrival (AoA), power angular spectrum (PAS) of AoA, angle of departure (AoD), PAS of AoD, transmit/receive channel correlation, transmit/receive beamforming, spatial channel correlation, and the like.

The QCL relationship may be configured for the UE through an RRC parameter TCI-State and QCL-Info as shown in Table 14 below. Referring to Table 14, the base station may configure one or more TCI states for the UE and inform the UE of up to two QCL relationships (qcl-Type1 and qcl-Type2) about the RS referring to the ID of the TCI state, that is, the target RS. In this case, each piece of QCL information (QCL-Info) included in each TCI state includes a serving cell index and a BWP index of the reference RS indicated by the QCL information, the type and ID of the reference RS, and the QCL type shown in Table 13 above.

TABLE 14

```
TCI-State ::=          SEQUENCE {
   tci-StateId            TCI-StateId,
   qcl-Type1              QCL-Info,
   qcl-Type2              QCL-Info           OPTIONAL,  -- Need
R
   ...
}
QCL-Info ::=           SEQUENCE {
   cell                   ServCellIndex      OPTIONAL,  -- Need R
   bwp-Id                 BWP-Id             OPTIONAL, --
Cond CSI-RS-Indicated
      referenceSignal        CHOICE {
         csi-rs                 NZP-CSI-RS-ResourceId,
         ssb                    SSB-Index
      },
   qcl-Type               ENUMERATED {typeA, typeB, typeC, typeD},
   ...
}
```

Figure 7:
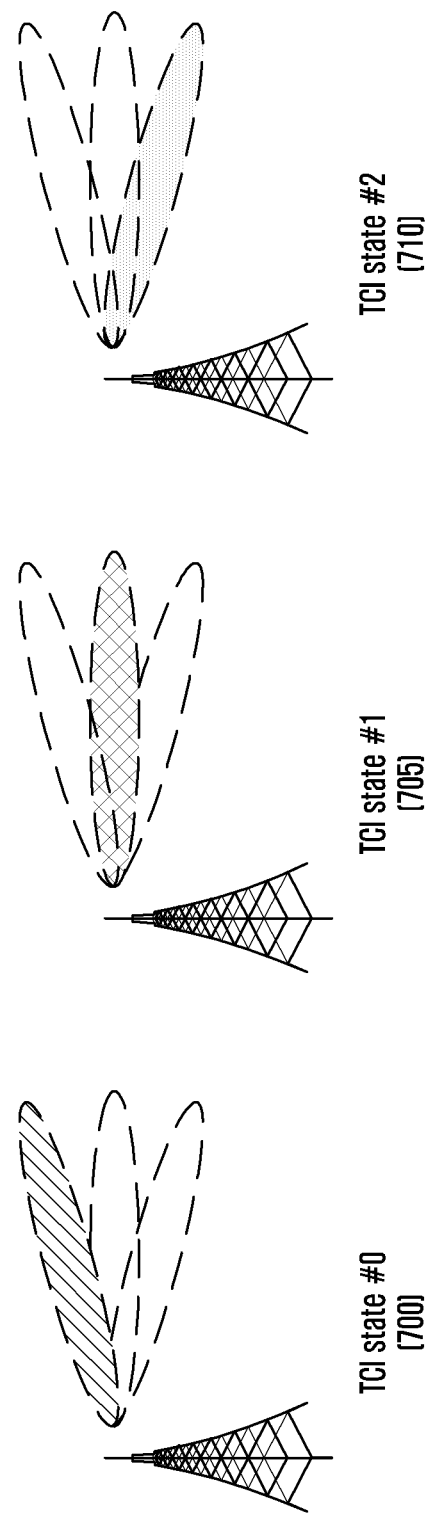
FIG. 7 is a diagram illustrating an example of base station beam allocation according to TCI state configuration in a wireless communication system according to an embodiment of the disclosure.

FIG. 7 is a diagram illustrating an example of beam allocation of a base station according to configuration of a TCI state according to an embodiment of the disclosure.

Referring to FIG. 7, the base station may transmit information about N different beams to the UE through N different TCI states. For example, in the case of N=3 as shown in FIG. 7, the base station may configure a parameter "qcl-Type2" included in three TCI states 700, 705, and 710 as being associated with CSI-RSs or SSBs corresponding to different beams and as being QCL type D, thereby informing that the antenna ports referring to the different TCI states 700, 705, and 710 are associated with different spatial Rx parameters, that is, different beams.

Tables 15-1 to 15-5 below show valid TCI state configurations according to target antenna port types.

Table 15-1 shows valid TCI state configurations when the target antenna port is a CSI-RS for tracking (TRS). The TRS indicates an NZP CSI-RS in which a repetition parameter is not configured and in which "trs-Info" is configured as "true", among the CSI-RSs. Configuration 3 in Table 15-1 may be used for aperiodic TRS.

TABLE 15-1

Valid TCI state configurations when target antenna port is CSI-RS for tracking (TRS)

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 15-2 shows valid TCI state configurations when the target antenna port is a CSI-RS for CSI. The CSI-RS for CSI indicates an NZP CSI-RS in which a parameter indicating repetition (e.g., a repetition parameter) is not configured and in which "trs-Info" is not configured as "true", among the CSI-RSs.

TABLE 15-2

Valid TCI state configurations when target antenna port is CSI-RS for CSI

| Valid TCI state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 15-3 shows valid TCI state configurations when the target antenna port is a CSI-RS for beam management (BM, the same as a CSI-RS for L1 RSRP reporting). The CSI-RS for BM indicates an NZP CSI-RS in which a repetition parameter is configured to have a value of On or Off and in which "trsInfo" is not configured as "true", among the CSI-RS.

TABLE 15-3

Valid TCI state configurations when target antenna port is CSI-RS for BM (for L1 RSRP reporting)

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 15-4 shows valid TCI state configurations when the target antenna port is a PDCCH DMRS.

TABLE 15-4

Valid TCI state configurations when target antenna port is PDCCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |

TABLE 15-4-continued

Valid TCI state configurations when target antenna port is PDCCH DMRS

| Valid TCI state Configuration | DL RS 1 | qcl-Type1 | DL RS 2 (if configured) | qcl-Type2 (if configured) |
|---|---|---|---|---|
| 3 | CSI-RS (CSI) | QCL-TypeA | CSI-RS (same as DL RS 1) | QCL-TypeD |

Table 15-5 shows valid TCI state configurations when the target antenna port is a PDSCH DMRS.

TABLE 15-5

Valid TCI state configurations when target antenna port is PDSCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

A typical QCL configuration method according to Tables 15-1 to 15-5 is configuring the target antenna port and the reference antenna port for respective steps as "SSB" "TRS" "CSI-RS for CSI, CSI-RS for BM, PDCCH DMRS, or PDSCH DMRS" and operating the same. Through this, the statistical characteristics, which are measurable from the SSB and the TRS, may be associated with the respective antenna ports, thereby assisting the UE with a reception operation.

PDCCH: In Relation to TCI States

Specifically, combinations of TCI states applicable to the PDCCH DMRS antenna port are shown in Table 16 below. The fourth row in Table 16 is a combination assumed by the UE before RRC configuration, and is unable to be configured after RRC.

TABLE 16

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
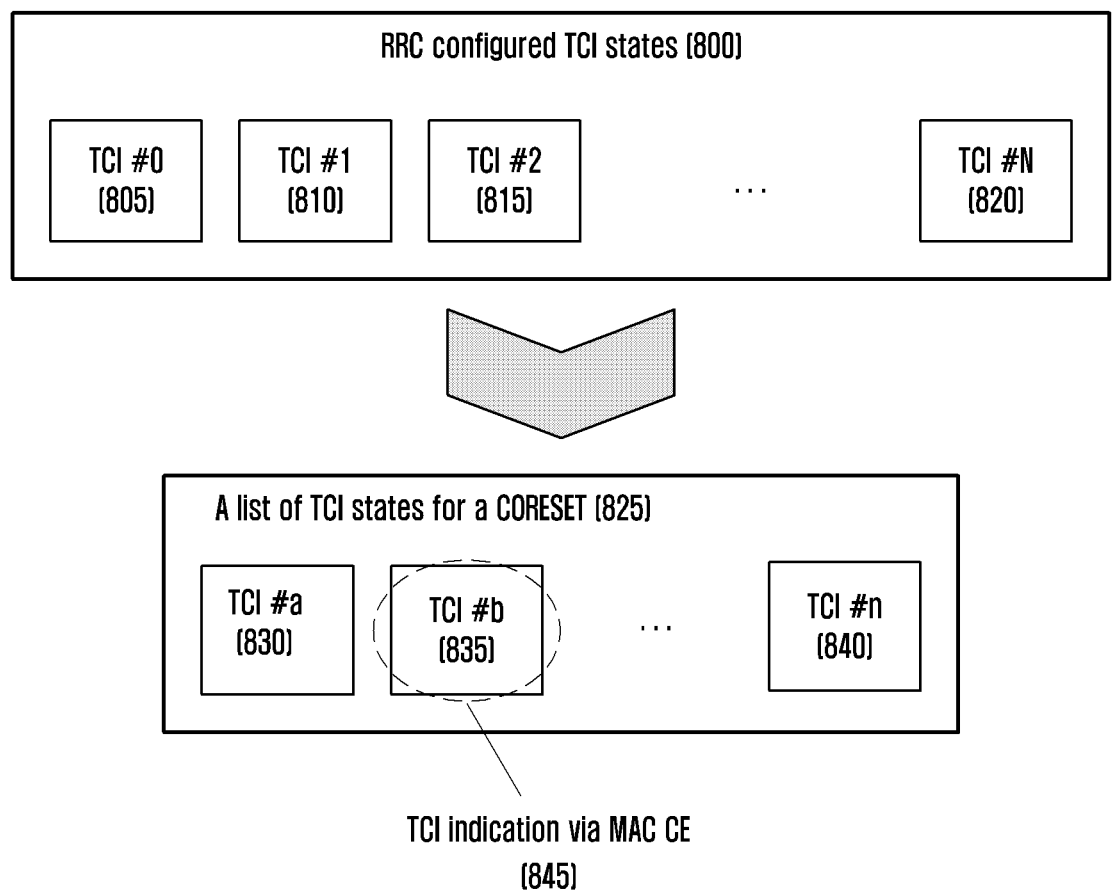
FIG. 8 is a diagram illustrating an example of a TCI state allocation method for a PDCCH in a wireless communication system according to an embodiment of the disclosure.

NR supports a hierarchical signaling method shown in FIG. 8 for dynamic allocation for a PDCCH beam.

FIG. 8 is a diagram illustrating an example of a TCI state allocation method for a PDCCH in a wireless communication system according to an embodiment of the disclosure.

Referring to FIG. 8, the base station may configure N TCI states 805, 810, 815, . . . , 820 for the UE through RRC signaling 800, and some of them may be configured as TCI states for CORESET (825). Thereafter, the base station may indicate one of the TCI states 830, 835, and 840 for CORESET to the UE through MAC CE signaling (845). Thereafter, the UE receives a PDCCH, based on beam information included in the TCI state indicated by the MAC CE signaling.

Figure 9:
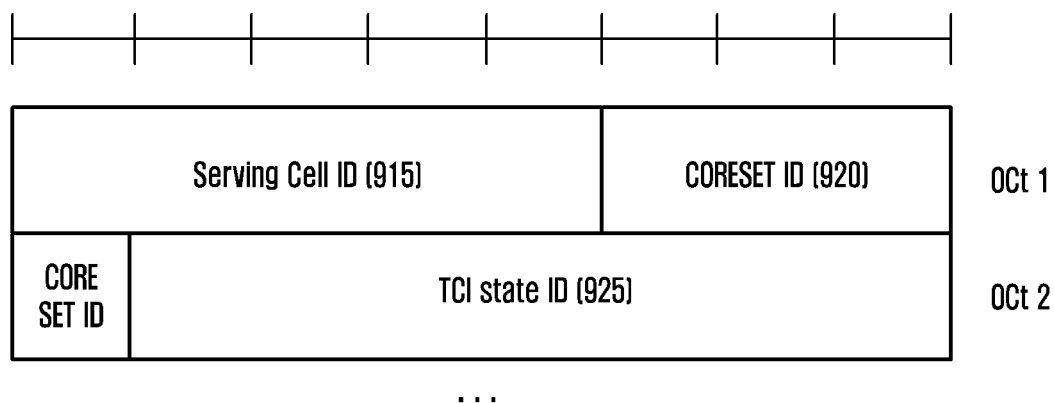
FIG. 9 is a diagram illustrating a TCI indication MAC CE signaling structure for a PDCCH DMRS in a wireless communication system according to an embodiment of the disclosure.

FIG. 9 is a diagram illustrating a TCI indication MAC CE signaling structure for the PDCCH DMRS according to an embodiment of the disclosure.

Referring to FIG. 9, TCI indication MAC CE signaling for a PDCCH DMRS is comprised of 2 bytes (16 bits) and includes a serving cell ID 915 of 5 bits, a CORESET ID 920 of 4 bits, and a TCI state ID 925 of 7 bits.

Figure 10:
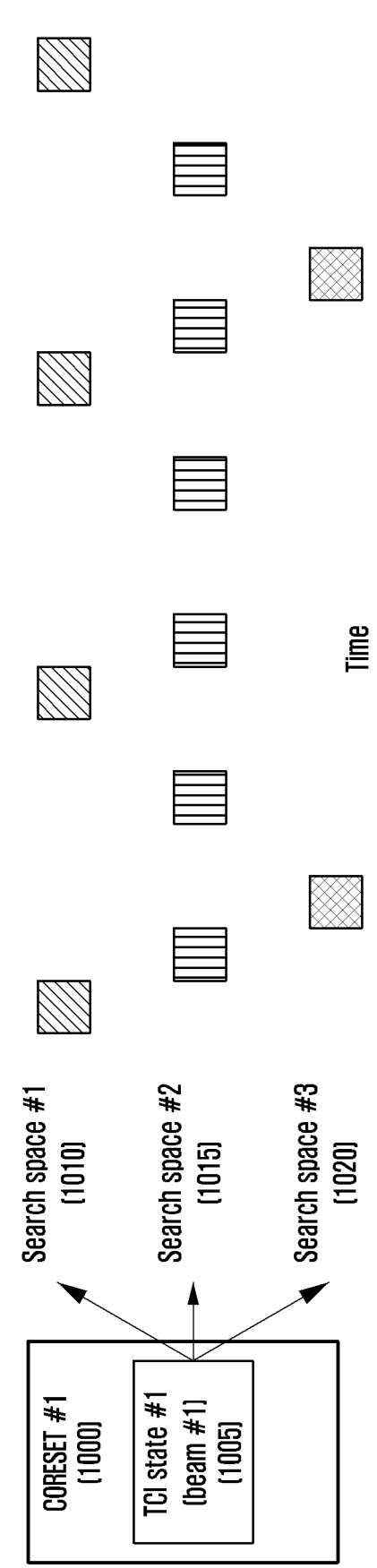
FIG. 10 is a diagram illustrating an example of a control resource set and beam configuration of search spaces in a wireless communication system according to an embodiment of the disclosure.

FIG. 10 is a diagram illustrating an example of a control resource set (CORESET) and beam configuration of search spaces according to the above description according to an embodiment of the disclosure.

Referring to FIG. 10, the base station may indicate one TCI state among the TCI state list included in the configuration of CORESET 1000 through MAC CE signaling (1005). After that, the UE considers that the same QCL information (beam #1, 1005) is applied to one or more search spaces 1010, 1015, and 1020 connected to the CORESET until another TCI state is indicated to the corresponding CORESET through another MAC CE signaling. The above-described PDCCH beam allocation method has a difficulty in indicating a beam change faster than the MAC CE signaling delay and has a disadvantage of collectively applying the same beam to all CORESETs, irrespective of search space characteristics, so it is difficult to perform a flexible operation of PDCCH beams. Hereinafter, embodiments of the disclosure provide a more flexible PDCCH beam configuration and operation method. Hereinafter, although several distinct examples will be provided to describe an embodiment of the disclosure for convenience of description, these are not mutually exclusive and may be applied by appropriately combining with each other according to circumstances.

The base station may configure one or more TCI states for the UE with respect to a specific control resource set, and may activate one of the configured TCI states through a MAC CE activation command. For example, in the case where {TCI state #0, TCI state #1, TCI state #2} are configured, as TCI states, for control resource set #1, the base station may transmit, to the UE, a command for activation assuming that TCI state #0 is the TCI state for control resource set #1 through a MAC CE. Based on the activation command for the TCI state received through the MAC CE, the UE may correctly receive a DMRS of the corresponding control resource set, based on QCL information in the activated TCI state.

For the control resource set having an index "0" (control resource set #0), if the UE fails to receive a MAC CE activation command for the TCI state of control resource set #0, the UE may assume that the DMRS transmitted in control resource set #0 is QCLed with the SS/PBCH block that is identified in the initial access procedure or in the non-contention-based random access procedure that is not triggered by a PDCCH command.

For the control resource set having an index other than 0 (control resource set #X), if the UE fails to receive a configuration of the TCI state for control resource set #X, or if the UE receives a configuration of one or more TCI states but fails to receive a MAC CE activation command for activating one of them, the UE may assume that the DMRS transmitted in control resource set #X is QCLed with the SS/PBCH block that is identified in the initial access process.

PDCCH: In Relation to QCL Prioritization Rule

Hereinafter, a QCL prioritization operation for a PDCCH will be described in detail.

In the case where the UE operates as carrier aggregation in a single cell or band and where a plurality of control resource sets existing in an activated bandwidth part in a single or multiple cells has the same or different QCL-TypeD characteristics in a specific PDCCH monitoring period and overlaps in time, the UE may select a specific control resource set according to the QCL prioritization operation, and monitor control resource sets having the same QCL-TypeD characteristic as the corresponding control resource set. That is, in the case where a plurality of control resource sets overlaps in time, only one QCL-TypeD characteristic may be received. In this case, the criteria for determining the QCL priority may be as follows.

Criterion 1. The control resource set connected to a common search space having the lowest index in a cell corresponding to the lowest index, among the cells including common search spaces Criterion 2. The control resource set connected to a UE-specific search space having the lowest index in a cell corresponding to the lowest index, among the cells including UE-specific search spaces As described above, if each of the above criteria is not met, the following criteria may be applied. For example, if control resource sets overlap in time in a specific PDCCH monitoring occasion, and if all control resource sets are connected to a UE-specific search space, instead of a common search space, that is, if criterion 1 is not met, the UE may omit application of criterion 1 and apply criterion 2.

In the case of selecting control resource sets according to the above-mentioned criteria, the UE may further consider the following two items in relation to QCL information configured in the control resource set. First, if control resource set 1 has CSI-RS 1 as a reference signal having a QCL-TypeD relationship, if a reference signal with which CSI-RS 1 has a QCL-TypeD relationship is SSB 1, and if a reference signal with which control resource set 2 has a QCL-TypeD relationship is SSB 1, the UE may consider that the two control resource sets 1 and 2 have different QCL-TypeD characteristics. Second, if control resource set 1 has CSI-RS 1 configured in cell 1 as a reference signal having a QCL-TypeD relationship, if a reference signal with which CSI-RS 1 has a QCL-TypeD relationship is SSB 1, if control resource set 2 has CSI-RS 2 configured in cell 2 as a reference signal having a QCL-TypeD relationship, and if a reference signal with which CSI-RS 2 has a QCL-TypeD relationship is SSB 1, the UE may consider that the two control resource sets have the same QCL-TypeD characteristic.

Figure 12:
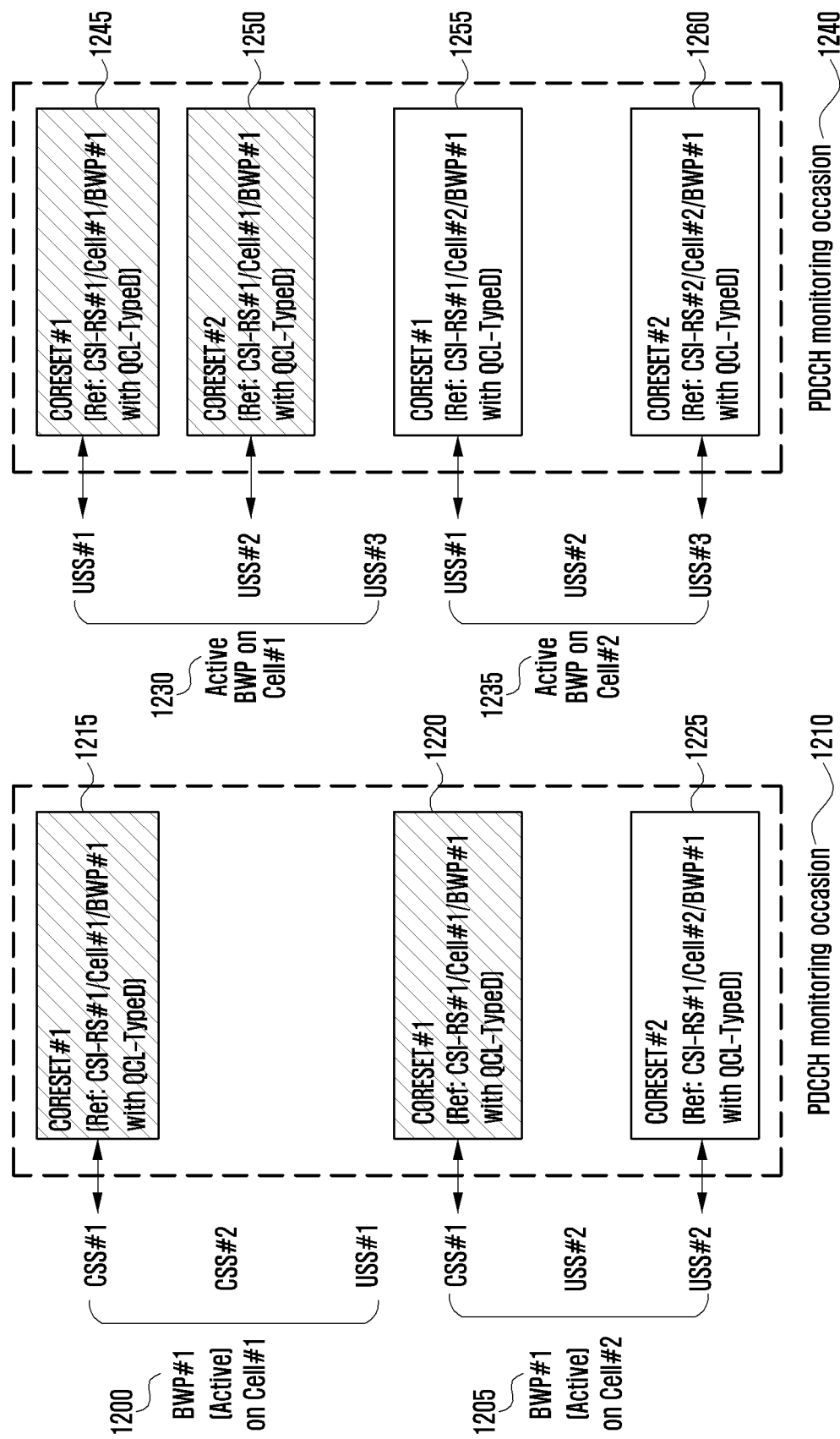
FIG. 12 is a diagram illustrating a method for a user equipment to select a receivable control resource set in consideration of priority when receiving a downlink control channel in a wireless communication system according to an embodiment of the disclosure.

FIG. 12 is a diagram illustrating a method for a UE to select a receivable control resource set in consideration of priority when receiving a downlink control channel in a wireless communication system according to an embodiment of the disclosure.

Referring to FIG. 12, the UE may be configured to receive a plurality of control resource sets overlapping in time in a specific PDCCH monitoring occasion 1210, and the plurality of control resource sets may be connected to common search spaces or UE-specific search spaces in a plurality of cells. In the corresponding PDCCH monitoring occasion, a first control resource set 1215 connected to a first common search space may exist within a first bandwidth part 1200 of a first cell, and a first control resource set 1220 connected to a first common search space and a second control resource set 1225 connected to a second UE-specific search space may exist in a first bandwidth part 1205 of a second cell. The control resource sets 1215 and 1220 may have a QCL-TypeD relationship with a first CSI-RS resource configured in the first bandwidth part of the first cell, and the control resource set 1225 may have a QCL-TypeD relationship with a first CSI-RS resource configured in the first bandwidth part of the second cell. Therefore, if criterion 1 is applied to the corresponding PDCCH monitoring occasion 1210, all other control resource sets having the same QCL-TypeD reference signal as the first control resource set 1215 may be received. Accordingly, the UE may receive the control resource sets 1215 and 1220 in the corresponding PDCCH monitoring occasion 1210. As another example, the UE may be configured to receive a plurality of control resource sets overlapping in time in a specific PDCCH monitoring occasion 1240, and the plurality of control resource sets may be connected to common search spaces or UE-specific search spaces in a plurality of cells. In the corresponding PDCCH monitoring occasion, a first control resource set 1245 connected to a first UE-specific search space and a second control resource set 1250 connected to a second UE-specific search space may exist within a first bandwidth part 1230 of a first cell, and a first control resource set 1255 connected to a first UE-specific search space and a second control resource set 1260 connected to a third UE-specific search space may exist in a first bandwidth part 1235 of a second cell. The control resource sets 1245 and 1250 may have a QCL-TypeD relationship with a first CSI-RS resource configured in the first bandwidth part of the first cell, the control resource set 1255 may have a QCL-TypeD relationship with a first CSI-RS resource configured in the first bandwidth part of the second cell, and the control resource set 1260 may have a QCL-TypeD relationship with a second CSI-RS resource configured in the first bandwidth part of the second cell. However, if criterion 1 is applied to the corresponding PDCCH monitoring occasion 1240, there is no common search space, so the next criterion 2 may be applied. If criterion 2 is applied to the corresponding PDCCH monitoring occasion 1240, all other control resource sets having the same QCL-TypeD reference signal as the control resource set 1245 may be received. Accordingly, the UE may receive the control resource sets 1245 and 1250 in the corresponding PDCCH monitoring occasion 1240.

Rate Matching/Puncturing Related

Hereinafter, a rate matching operation and a puncturing operation will be described in detail.

In the case where time-and-frequency resources A to transmit arbitrary symbol sequences A overlaps arbitrary time-and-frequency resources B, a rate matching or puncturing operation may be considered as a transmission/reception operation of a channel A in consideration of a resource C of the area where the resources A and the resources B overlap. A detailed operation may be as follows.

Rate Matching Operation

The base station may map the channel A only to the remaining resource areas, excluding the resource C corresponding to the area overlapping the resources B, among all the resources A for transmitting the symbol sequences A to the UE, and transmit the same. For example, in the case where the symbol sequences A is comprised of {symbol #1, symbol #2, symbol #3, symbol #4}, where the resources A are {resource #1, resource #2, resource #3, resource #4}, and where the resources B are {resource #3, resource #5}, the base station may sequentially map the symbol sequences A to the remaining resources {resource #1, resource #2, resource #4}, excluding {resource #3} corresponding to the resource C, among the resources A, and transmit the same. As a result, the base station may map the symbol sequences {symbol #1, symbol #2, symbol #3} to {resource #1, resource #2, resource #4}, respectively, and transmit the same.

The UE may determine the resources A and the resources B from scheduling information for the symbol sequences A from the base station and determine the resource C, which is an area where the resources A and the resources B overlap, according thereto. The UE may receive the symbol sequences A, assuming that the symbol sequences A are mapped and transmitted in the remaining areas, excluding the resource C, among all the resources A. For example, in the case where the symbol sequences A are comprised of {symbol #1, symbol #2, symbol #3, symbol #4}, where the resources A are {resource #1, resource #2, resource #3, resource #4}, where the resources B are {resource #3, resource #5}, the UE may receive the symbol sequences A, assuming that the symbol sequences A are sequentially mapped to the remaining resources {resource #1, resource #2, resource #4}, excluding {resource #3} corresponding to the resource C, among the resources A. As a result, the UE may perform a series of subsequent reception operations, assuming that the symbol sequences {symbol #1, symbol #2, symbol #3} are mapped to the resources {resource #1, resource #2, resource #4} and transmitted.

Puncturing Operation

If there is a resource C corresponding to the area overlapping the resources B, among all the resources A for transmitting the symbol sequences A to the UE, the base station may map the symbol sequences A to all the resources A and transmit only the remaining resource areas, excluding the resource C from among the resources A, instead of transmitting the resource area corresponding to the resource C. For example, in the case where the symbol sequences A are comprised of {symbol #1, symbol #2, symbol #3, symbol 4}, where the resources A are {resource #1, resource #2, resource #3, resource #4}, and where the resources B are {resource #3, resource #5}, the base station may map the symbol sequences A {symbol #1, symbol #2, symbol #3, symbol #4} to the resources A {resource #1, resource #2, resource #3, resource #4}, respectively, and transmit only the symbol sequence {symbol #1, symbol #2, symbol #4} corresponding to {resource #1, resource #2, resource #4}, which are the remaining resources excluding {resource #3} corresponding to resource C from among the resources A, instead of transmitting {symbol #3} mapped to {resource #3} corresponding to the resource C. As a result, the base station may map the symbol sequences {symbol #1, symbol #2, symbol #4} to {resource #1, resource #2, resource #4}, respectively, and transmit the same.

The UE may determine the resources A and the resources B from scheduling information for the symbol sequences A from the base station and determine the resource C, which is an area where the resources A and the resources B overlap, according thereto. The UE may receive the symbol sequence A, assuming that the symbol sequences A are mapped to all the resources A but transmitted only in the remaining areas, excluding the resource C from among the resource areas A. For example, in the case where the symbol sequences A are comprised of {symbol #1, symbol #2, symbol #3, symbol #4}, where the resources A are {resource #1, resource #2, resource #3, resource #4}, where the resources B are {resource #3, resource #5}, the UE may receive the symbol sequences A, assuming that the symbol sequences A {symbol #1, symbol #2, symbol #3, symbol #4} are mapped to the resources A {resource #1, resource #2, resource #3, resource #4}, respectively, but {symbol #3} mapped to {resource #3} corresponding to resource C is not transmitted, and assuming that the symbol sequences {symbol #1, symbol #2, symbol #4} corresponding to the remaining resources {resource #1, resource #2, resource #4}, excluding {resource #3} corresponding to the resource C from among the resources A, are mapped and transmitted. As a result, the UE may perform a series of subsequent reception operations, assuming that the symbol sequences {symbol #1, symbol #2, symbol #4} are mapped to the resources {resource #1, resource #2, resource #4}, respectively, and transmitted.

Hereinafter, a method of configuring a rate matching resource for the purpose of rate matching in a 5G communication system will be described. Rate matching indicates that the magnitude of a signal is adjusted in consideration of the number of resources capable of transmitting the signal. For example, rate matching of a data channel may indicate that the amount of data is adjusted by not mapping and transmitting a data channel for a specific time-and-frequency resource area.

Figure 11:
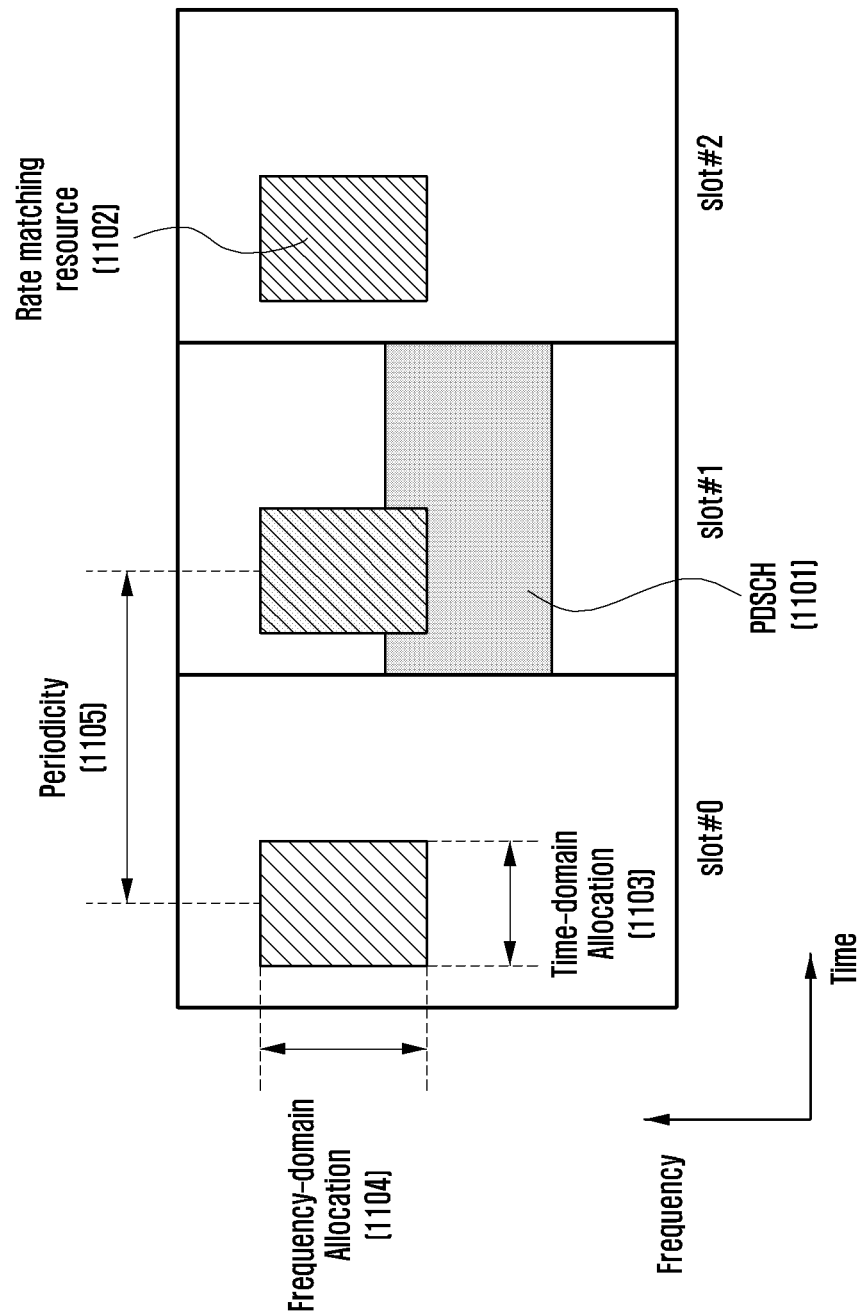
FIG. 11 is a diagram illustrating a method for a base station and a user equipment to transmit/receive data in consideration of a downlink data channel and a rate matching resource in a wireless communication system according to an embodiment of the disclosure.

FIG. 11 is a diagram illustrating a method for a base station and a user equipment to transmit/receive data in consideration of a downlink data channel and a rate matching resource according to an embodiment of the disclosure.

Referring to FIG. 11, it shows a downlink data channel (PDSCH) 1101 and rate matching resources 1102. The base station may configure one or more rate matching resources 1102 for the UE through higher layer signaling (e.g., RRC signaling). Configuration information of the rate matching resource 1102 may include time domain resource allocation information 1103, frequency domain resource allocation information 1104, and periodicity information 1105. In the following description, the bitmap corresponding to the frequency domain resource allocation information 1104 will be referred to as a "first bitmap", the bitmap corresponding to the time domain resource allocation information 1103 will be referred to as a "second bitmap", and the bitmap corresponding to the periodicity information 1105 will be referred to as a "third bitmap". If all or some of the time and frequency resources of the scheduled data channel 1101 overlap the configured rate matching resources 602, the base station may rate-match the data channel 1101 in the rate matching resource 1102 part and transmit the same, and the UE may perform reception and decoding, assuming that the data channel 1101 is rate-matched in the rate matching resource 1102 part.

The base station may dynamically notify the UE through DCI of whether or not to rate-match the data channel in the configured rate matching resource part by additional configuration (this corresponds to a "rate matching indicator" in the DCI format described above). Specifically, the base station may select some of the configured rate matching resources to group them into a rate matching resource group, and transmit a notification of whether or not to rate-match the data channel for each rate matching resource group to the UE through DCI in a bitmap manner. For example, in the case where four rate matching resources, RMR #1, RMR #2, RMR #3, and RMR #4, are configured, the base station may configure RMG #1={RMR #1, RMR #2} and RMG #2={RMR #3, RMR #4} as rate matching groups and may transmit a notification of whether or not to rate-match the data channel in RMG #1 and RMG #2, respectively, to the UE through a bitmap using 2 bits in the DCI field. For example, the case that requires rate-matching may be indicated as "1", and the case that does not require rate-matching may be indicated as "0".

5G supports the granularity of an "RB symbol level" and an "RE level" as a method of configuring the above-described rate matching resources for the UE. More specifically, the following configuration method may be provided.

RB Symbol Level

The UE may receive a configuration of up to four RateMatchPatterns for each bandwidth part through higher layer signaling, and one RateMatchPattern may include the following.

As a reserved resource within the bandwidth part, a resource in which a time and frequency resource area of the corresponding reserved resource is configured by a combination of a bitmap of an RB level and a bitmap of a symbol level in the frequency domain may be included.

The reserved resource may have a span corresponding to one or two slots.

A time domain pattern (periodicityAndPattern) in which time and frequency domains comprised of a pair of RB level and symbol level bitmaps are repeated may be further configured.

A time and frequency domain resource area configured as a control resource set in the bandwidth part and a resource area corresponding to a time domain pattern configured as the corresponding resource areas repeated by a search space may be included.

RE Level

The UE may receive configurations below through higher layer signaling.

As configuration information (lte-CRS-ToMatchAround) for an RE corresponding to an LTE CRS (cell-specific reference signal or common reference signal) pattern, the number of LTE CRS ports (nrofCRS-Ports), an LTE-CRS-vshift(s) value (v-shift), center subcarrier location information (carrierFreqDL) of an LTE carrier from a reference frequency point (e.g., reference point A), information on the bandwidth size of an LTE carrier (carrierBandwidthDL), subframe configuration information (mbsfn-SubframConfigList) corresponding to a multicast-broadcast single-frequency network (MBSFN), and the like may be included.

The UE may determine the location of the CRS in the NR slot corresponding to an LTE subframe, based on the above-described information.

Configuration information on a resource set corresponding to one or more ZP (Zero Power) CSI-RS within the bandwidth part may be included.

LTE CRS Rate Match Related

Next, the rate matching process for the above-described LTE CRS will be described in detail. For the coexistence of LTE (Long-Term Evolution) and NR (New RAT), NR provides an NR UE with a function of configuring a CRS (cell-specific reference signal) pattern of LTE. More specifically, the CRS pattern may be provided by RRC signaling including at least one parameter in "ServingCellConfig" IE (information element) or "ServingCellConfigCommon" IE. Examples of the parameter may include "lte-CRS-ToMatchAround", "lte-CRS-PatternList1-r16", "lte-CRS-PatternList2-r16", "crs-RateMatch-PerCORESETPoolIndex-r16", and the like.

Rel-15 NR provides a function in which one CRS pattern may be configured in each serving cell through the parameter "lte-CRS-ToMatchAround". In Rel-16 NR, the function has been extended to enable configuring of a plurality of CRS patterns for each serving cell. More specifically, one CRS pattern per one LTE carrier may be configured in a single-TRP (transmission and reception point)-configured UE, and two CRS patterns per one LTE carrier may be configured in a multi-TRP-configured UE. For example, it is possible to configure up to three CRS patterns per serving cell in the single-TRP-configured UE through the parameter "lte-CRS-PatternList1-r16". As another example, a CRS may be configured for each TRP in the multi-TRP-configured UE. That is, a CRS pattern for TRP1 may be configured through a parameter "lte-CRS-PatternList1-r16", and a CRS pattern for TRP2 may be configured through a parameter "lte-CRS-PatternList2-r16". In the case where two TRPs are configured as described above, whether or not to apply both the CRS patterns of TRP1 and TRP2 to a specific PDSCH (physical downlink shared channel) or whether or not to apply only the CRS pattern for one TRP thereto is determined through a parameter "crs-RateMatch-PerCORESETPoolIndex-r16", and if the parameter "crs-RateMatch-PerCORESETPoolIndex-r16" is configured to be enabled, the CRS pattern for only one TRP is applied, otherwise, the CRS patterns for both TRPs are applied.

Table 17 shows a "ServingCellConfig" IE including the CRS pattern, and Table 18 shows a "RateMatchPatternLTE-CRS" IE including at least one parameter for the CRS pattern.

TABLE 17

```
ServingCellConfig ::=                                   SEQUENCE {
    tdd-UL-DL-ConfigurationDedicated                        TDD-UL-DL-ConfigDedicated
OPTIONAL,   -- Cond TDD
    initialDownlinkBWP                                      BWP-DownlinkDedicated
OPTIONAL,   -- Need M
    downlinkBWP-ToReleaseList                               SEQUENCE (SIZE (1..maxNrofBWPs)) OF
BWP-Id                                              OPTIONAL,   -- Need N
    downlinkBWP-ToAddModList                                SEQUENCE (SIZE (1..maxNrofBWPs))
OF BWP-Downlink                                         OPTIONAL,   -- Need N
    firstActiveDownlinkBWP-Id                               BWP-Id
OPTIONAL,   -- Cond SyncAndCellAdd
    bwp-InactivityTimer                                     ENUMERATED {ms2, ms3, ms4, ms5, ms6,
ms8, ms10, ms20, ms30,
                                                            ms40,ms50, ms60, ms80,ms100, ms200,ms300,
ms500,
                                                            ms750, ms1280, ms1920, ms2560, spare10, spare9,
spare8,
                                                            spare7, spare6, spare5, spare4, spare3, spare2,
spare1 }   OPTIONAL,   --Need R
    defaultDownlinkBWP-Id                                   BWP-Id
OPTIONAL,   -- Need S
    uplinkConfig                                            UplinkConfig
OPTIONAL,   -- Need M
    supplementaryUplink                                     UplinkConfig
OPTIONAL,   -- Need M
    pdcch-ServingCellConfig                                 SetupRelease { PDCCH-ServingCellConfig }
OPTIONAL,   -- Need M
    pdsch-ServingCellConfig                                 SetupRelease { PDSCH-ServingCellConfig }
OPTIONAL,   -- Need M
    csi-MeasConfig                                          SetupRelease { CSI-MeasConfig }
OPTIONAL,   -- Need M
    sCellDeactivationTimer                                  ENUMERATED {ms20, ms40, ms80, ms160,
ms200, ms240,
                                                            ms320, ms400, ms480, ms520, ms640, ms720,
                                                            ms840, ms1280, spare2,spare1}   OPTIONAL,
-- Cond ServingCellWithoutPUCCH
    crossCarrierSchedulingConfig                            CrossCarrierSchedulingConfig
OPTIONAL,   -- Need M
    tag-Id                                              TAG-Id,
    dummy                                               ENUMERATED {enabled}
OPTIONAL,   -- Need R
    pathlossReferenceLinking                                ENUMERATED {spCell, sCell}
OPTIONAL,   -- Cond SCellOnly
    servingCellMO                                           MeasObjectId
OPTIONAL,   -- Cond MeasObject
    ...,
    [[
    lte-CRS-ToMatchAround                                   SetupRelease { RateMatchPatternLTE-CRS }
OPTIONAL,   -- Need M
    rateMatchPatternToAddModList                            SEQUENCE (SIZE
(1..maxNrofRateMatchPatterns)) OF RateMatchPattern     OPTIONAL,   -- Need
N
    rateMatchPatternToReleaseList                           SEQUENCE (SIZE
(1..maxNrofRateMatchPatterns)) OF RateMatchPatternId   OPTIONAL,   -- Need
N
    downlmkChannelBW-PerSCS-List                            SEQUENCE (SIZE (1..maxSCSs)) OF
SCS-SpecificCarrier                                     OPTIONAL   -- Need S
    ]],
    [[
    supplementaryUplinkRelease                              ENUMERATED {true}
OPTIONAL,   -- Need N
    tdd-UL-DL-ConfigurationDedicated-IAB-MT-r16                 TDD-UL-DL-
ConfigDedicated-IAB-MT-r16                              OPTIONAL,   -- Cond TDD_IAB
    dormantBWP-Config-r16                                   SetupRelease { DormantBWP-Config-r16 }
OPTIONAL,   -- Need M
    ca-SlotOffset-r16                                       CHOICE {
        refSCS15kHz                                             INTEGER (-2..2),
        refSCS30KHz                                             INTEGER (-5..5),
```

TABLE 17-continued

```
    refSCS60KHz                          INTEGER (-10..10),
    refSCS120KHz                         INTEGER (-20..20)
  }                                                    OPTIONAL,
-- Cond AsyncCA
  channelAccessConfig-r16              SetupRelease { ChannelAccessConfig-r16 }
OPTIONAL,  -- Need M
    intraCellGuardBandsDL-List-r16        SEQUENCE (SIZE (1..maxSCSs)) OF
IntraCellGuardBandsPerSCS-r16                OPTIONAL,  -- Need S
    intraCellGuardBandsUL-List-r16        SEQUENCE (SIZE (1..maxSCSs)) OF
IntraCellGuardBandsPerSCS-r16                OPTIONAL,  -- Need S
    csi-RS-ValidationWith-DCI-r16        ENUMERATED {enabled}
OPTIONAL,  -- Need R
    lte-CRS-PatternList1-r16             SetupRelease { LTE-CRS-PatternList-r16 }
OPTIONAL,  -- Need M
    lte-CRS-PatternList2-r16             SetupRelease { LTE-CRS-PatternList-r16 }
OPTIONAL,  -- Need M
    crs-RateMatch-PerCORESETPoolIndex-r16   ENUMERATED {enabled}
OPTIONAL,  -- Need R
    enableTwoDefaultTCI-States-r16       ENUMERATED {enabled}
OPTIONAL,  -- Need R
    enableDefaultTCI-StatePerCoresetPoolIndex-r16 ENUMERATED {enabled}
OPTIONAL,  -- Need R
    enableBeamSwitchTiming-r16           ENUMERATED {true}
OPTIONAL,  -- Need R
    cbg-TxDiffTBsProcessingType1-r16     ENUMERATED {enabled}
OPTIONAL,  -- Need R
    cbg-TxDiffTBsProcessingType2-r16     ENUMERATED {enabled}
OPTIONAL   -- Need R
  ]]
}
```

TABLE 18

```
    - RateMatchPatternLTE-CRS
The IE RateMatchPatternLTE-CRS is used to configure a pattern to rate match around
LTE CRS. See TS 38.214 [19], clause 5.1.4.2.
                                RateMatchPatternLTE-CRS information element
-- ASN1START
-- TAG-RATEMATCHPATTERNLTE-CRS-START
RateMatchPatternLTE-CRS ::=          SEQUENCE {
    carrierFreqDL                    INTEGER (0..16383),
    carrierBandwidthDL               ENUMERATED {n6, n15, n25, n50, n75, n100,
spare2, spare1},
    mbsfn-SubframeConfigList         EUTRA-MBSFN-SubframeConfigList
OPTIONAL,  -- Need M
    nrofCRS-Ports                    ENUMERATED {n1, n2, n4},
    v-Shift                          ENUMERATED {n0, n1, n2, n3, n4, n5}
}
LTE-CRS-PatternList-r16 ::=          SEQUENCE (SIZE (1..maxLTE-CRS-Patterns-
r16)) OF RateMatchPatternLTE-CRS
-- TAG-RATEMATCHPATTERNLTE-CRS-STOP
-- ASN1STOP
```

RateMatchPatternLTE-CRS field descriptions carrierBandwidthDL
BW of the LTE carrier in number of PRBs (see TS 38.214 [19], clause 5.1.4.2).
carrierFreqDL
Center of the LTE carrier (see TS 38.214 [19], clause 5.1.4.2).
mbsfn-SubframeConfigList
LTE MBSFN subframe configuration (see TS 38.214 [19], clause 5.1.4.2).
nrofCRS-Ports
Number of LTE CRS antenna port to rate-match around (see TS 38.214 [19], clause 5.1.4.2).
v-Shift
Shifting value v-shift in LTE to rate match around LTE CRS (see TS 38.214 [19], clause 5.1.4.2).

PDSCH: In Relation to Frequency Resource Allocation

Figure 13:
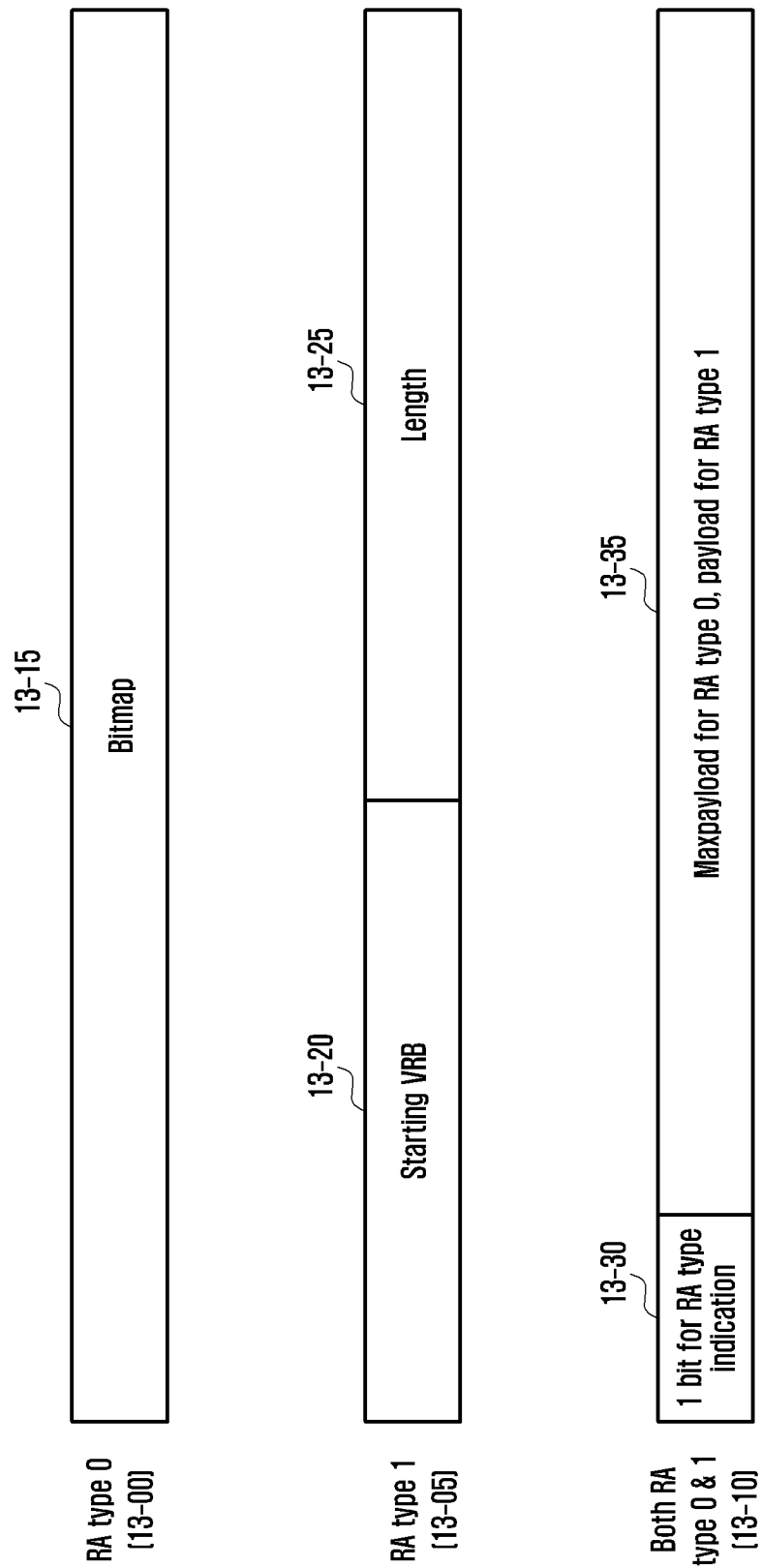
FIG. 13 is a diagram illustrating an example of allocating resources on a frequency domain of a PDSCH in a wireless communication system according to an embodiment of the disclosure.

FIG. 13 is a diagram illustrating an example of allocating resources on a frequency domain of a PDSCH (physical downlink shared channel) in a wireless communication system according to an embodiment of the disclosure.

FIG. 13 is a diagram showing three frequency domain resource assignment methods of type 0 (13-00), type 1 (13-05), and dynamic switch (13-10) that may be configured through a higher layer in an NR wireless communication system.

Referring to FIG. 13, if the UE is configured to use only resource type 0 through higher layer signaling (13-00), some downlink control information (DCI) for allocating a PDSCH to the UE includes a bitmap of NRBG bits. The conditions for this will be described later. In this case, NRBG indicates the number of RBGs (resource block groups) determined as shown in Table 19 below according to a BWP size allocated by a BWP indicator and a higher layer parameter "rbg-Size", and data is transmitted in the RBG indicated as "1" by a bitmap.

TABLE 19

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the UE is configured to use only resource type 1 through higher layer signaling (13-05), some DCI for allocating a PDSCH to the UE includes frequency domain resource assignment information of $\lceil \log_2 (N_{RB}^{DL,BWP} (N_{RB}^{DL,BWP}+1)/2 \rceil$ bits. The conditions for this will be described later. The base station may configure a starting VRB 13-20 according thereto and the length 13-25 of a frequency domain resource assignment subsequent thereto.

If the UE is configured to use both resource type 0 and resource type 1 through higher layer signaling (13-10), some DCI for allocating a PDSCH to the UE includes frequency domain resource assignment information of bits corresponding to a larger value 13-35 of a payload 13-15 for configuring resource type 0 and payloads 13-20 and 13-25 for configuring resource type 1. The conditions for this will be described later. In this case, one bit (13-30) may be added to the foremost part (MSB) of the frequency domain resource assignment information in DCI, and if the bit has a value "0", it may indicate that resource type 0 is used, and if the bit has a value "1", it may indicate that resource type 1 is used.

PDSCH/PUSCH: In Relation to Time Resource Allocation

A time domain resource assignment method for a data channel in a next-generation mobile communication system (5G or NR system) will be described below.

The base station may configure a table for time domain resource assignment information on a downlink data channel (physical downlink shared channel, PDSCH) and an uplink data channel (physical uplink shared channel, PUSCH) for the UE using higher layer signaling (e.g., RRC signaling). A table configured as up to maxNrofDL-Allocations=16 entries may be configured for a PDSCH, and a table configured as up to maxNrofUL-Allocations=16 entries may be configured for a PUSCH. In an embodiment, the time domain resource assignment information may include PDCCH-to-PDSCH slot timing (corresponding to the time interval in slot units between the time at which a PDCCH is received and the time at which a PDSCH scheduled by the received PDCCH is transmitted, and denoted by K0), PDCCH-to-PUSCH slot timing (corresponding to the time interval in slot units between the time at which a PDCCH is received and the time at which a PUSCH scheduled by the received PDCCH is transmitted, and denoted by K2), information about the position and length of a start symbol in which the PDSCH or PUSCH is scheduled in the slot, a mapping type of a PDSCH or PUSCH, and the like. For example, information shown in Table 20 or Table 21 below may be transmitted from the base station to the UE.

TABLE 20

PDSCH-TimeDomainResourceAllocationList information element

```
PDSCH-TimeDomainResourceAllocationList    ::=    SEQUENCE   (SIZE(1..maxNrofDL-Allocations))   OF
PDSCH-TimeDomainResourceAllocation
PDSCH-TimeDomainResourceAllocation ::=   SEQUENCE {
    k0                                                         INTEGER(0..32)
OPTIONAL,  -- Need S
    mappingType                            ENUMERATED {typeA, typeB},
    startSymbolAndLength                   INTEGER (0..127)
}
```

TABLE 21

PUSCH-TimeDomainResourceAllocation information element

```
PUSCH-TimeDomainResourceAllocationList ::=  SEQUENCE    (SIZE(1..maxNrofUL-Allocations))  OF
PUSCH-TimeDomainResourceAllocation
PUSCH-TimeDomainResourceAllocation ::=              SEQUENCE {
    k2                                  INTEGER(0..32)       OPTIONAL,   -- Need S
    mappingType                         ENUMERATED {typeA, typeB},
    startSymbolAndLength                INTEGER (0..127)
}
```

The base station may notify the UE of one of the entries in the table for the time domain resource assignment information described above through L1 signaling (e.g., DCI) (for example, it may be indicated by a field "time domain resource assignment" in DCI). The UE may obtain time domain resource assignment information for the PDSCH or PUSCH, based on the DCI received from the base station.

Figure 14:
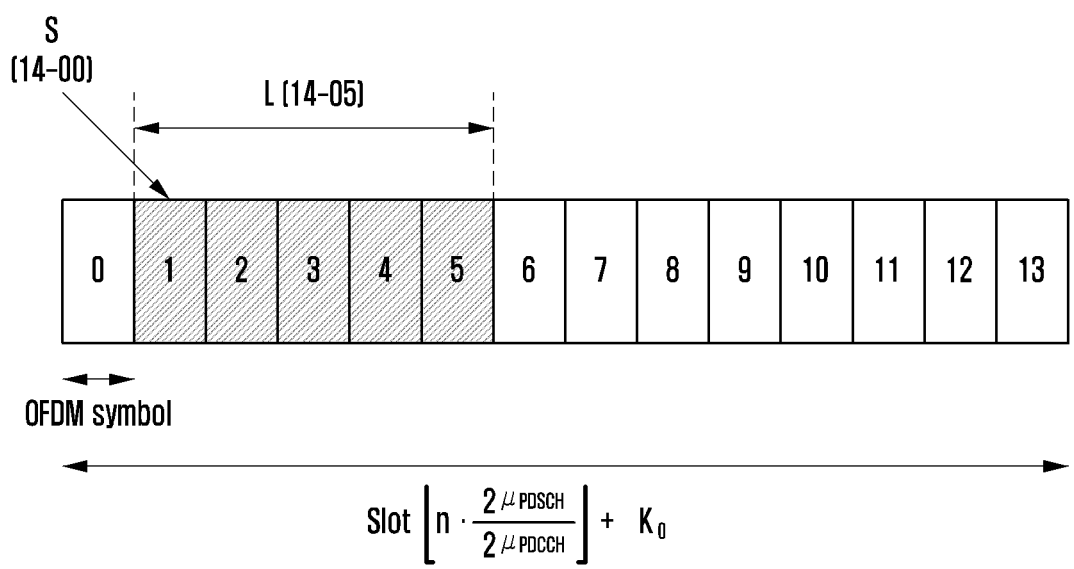
FIG. 14 is a diagram illustrating an example of time domain resource assignment of a PDSCH in a wireless communication system according to an embodiment of the disclosure.

FIG. 14 is a diagram illustrating an example of time domain resource assignment of a PDSCH in a wireless communication system according to an embodiment of the disclosure.

Referring to FIG. 14, the base station may indicate the time domain location of a PDSCH resource according to the subcarrier spacing (SCS) ($\mu_{PDSCH}$ and $\mu_{PDCCH}$) of a data channel and a control channel configured using a higher layer, a scheduling offset value (K0), a starting position 14-00 of OFDM symbols within one slot dynamically indicated through DCI, and the length 14-05 thereof.

Figure 15:
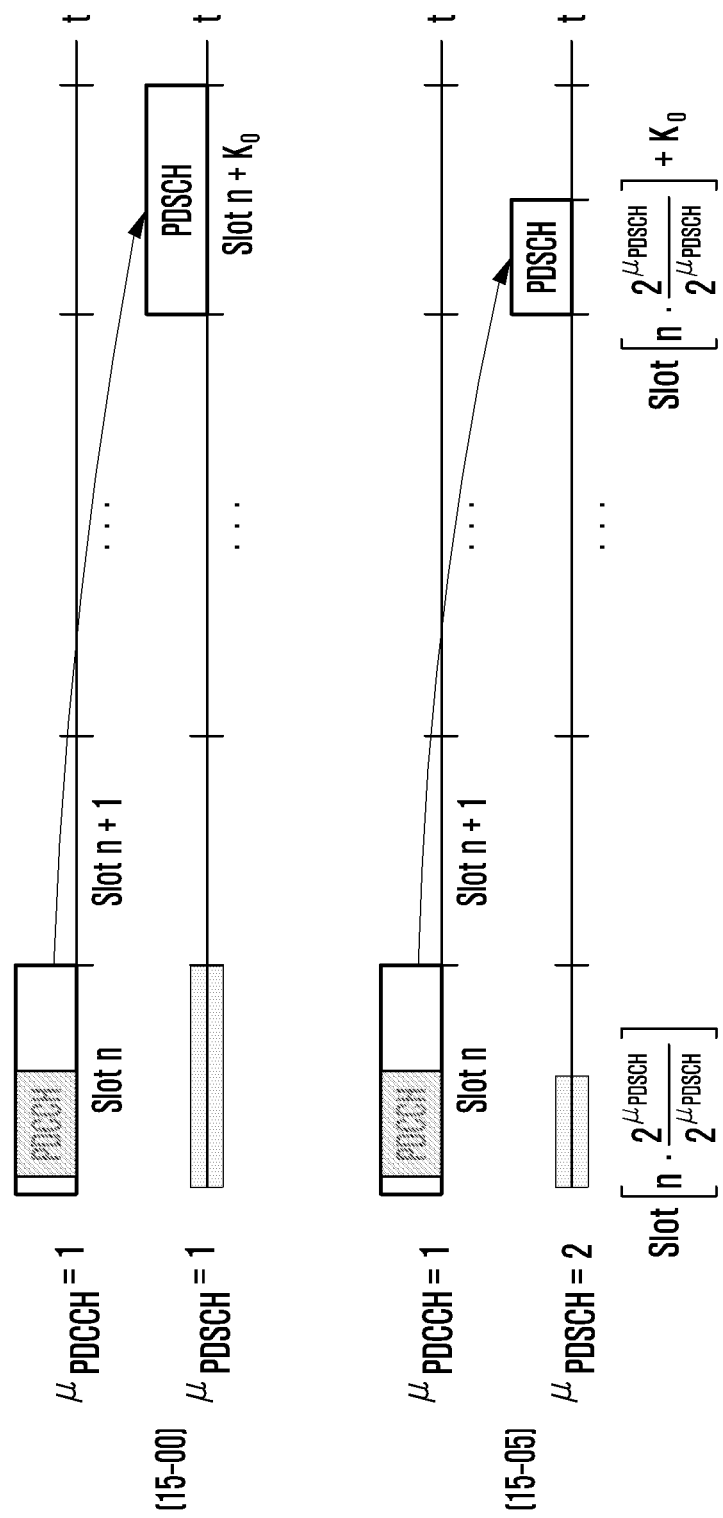
FIG. 15 is a diagram illustrating an example of time domain resource assignment depending on subcarrier spacing of a data channel and a control channel in a wireless communication system according to an embodiment of the disclosure.

FIG. 15 is a diagram illustrating an example of time domain resource assignment depending on subcarrier spacing of a data channel and a control channel in a wireless communication system according to an embodiment of the disclosure.

Referring to FIG. 15, if the subcarrier spacing of the data channel is the same as the subcarrier spacing of the control channel (15-00, $\mu_{PDSCH}=\mu_{PDCCH}$), the slot numbers for the data and the control are the same, so the base station and the UE may produce a scheduling offset according to a predetermined slot offset K0. On the other hand, if the subcarrier spacing of the data channel is different from the subcarrier spacing of the control channel (15-05, $\mu_{PDSCH}\neq\mu_{PDCCH}$), the slot numbers for the data and the control are different from each other, so the base station and the UE may produce a scheduling offset according to a predetermined slot offset K0, based on the subcarrier spacing of the PDCCH.

PDSCH: Processing Procedure Time

Next, a PDSCH processing procedure time will be described. In the case where the base station performs scheduling to transmit a PDSCH using DCI format 1_0, 1_1, or 1_2, to the UE, the UE may require a PDSCH processing procedure time to receive the PDSCH by applying a transmission method indicated through DCI (modulation/demodulation and coding indication index (MCS), demodulation reference signal-related information, time-and-frequency resource allocation information, etc.). In NR, a PDSCH processing procedure time is defined in consideration thereof. The PDSCH processing procedure time of the UE may follow Equation 3 below.

$$T_{proc,1}(N_1+d_{1,1}+d_2)(2048+144)\kappa 2^{-\mu}T_c+T_{ext} \quad \text{Equation 3}$$

Variables in Tproc,1 described by Equation 3 may have the following definitions.

N1: The number of symbols determined according to UE processing capability 1 or 2 according to the UE capability and numerology $\mu$. This may have the values shown in Table 22 in the case where UE processing capability 1 is reported according to the capability report of the UE, and may have the values shown in Table 23 in the case where UE processing capability 2 is reported and where UE processing capability 2 is configured to be available through higher layer signaling. Numerology $\mu$ may correspond to a minimum value among $\mu$PDCCH, $\mu$PDSCH, and $\mu$UL so as to maximize the Tproc,1, and $\mu$PDCCH, $\mu$PDSCH, and $\mu$UL may indicate numerology of a PDCCH scheduling a PDSCH, numerology of the scheduled PDSCH, and numerology of an uplink channel through which HARQ-ACK is to be transmitted, respectively.

TABLE 22

PDSCH processing procedure time in case of PDSCH processing capability 1

| | PDSCH decoding time $N_1$ [symbols] | |
| --- | --- | --- |
| $\mu$ | In case of dmrs-AdditionalPosition = pos0 in DMRS-DownlinkConfig, which is higher layer signaling for both PDSCH mapping types A and B | In case of dmrs-AdditionalPosition ≠ pos0 in DMRS-DownlinkConfig, which is higher layer signaling, for both PDSCH mapping types A and B, or in case where higher layer parameter is not configured |
| 0 | 8 | $N_{1,0}$ |
| 1 | 10 | 13 |
| 2 | 17 | 20 |
| 3 | 20 | 24 |

TABLE 23

PDSCH processing procedure time in case of PDSCH processing capability 2

| $\mu$ | PDSCH decoding time $N_1$ [symbols] In case of dmrs-AdditionalPosition = pos0 in DMRS-DownlinkConfig, which is higher layer signaling for both PDSCH mapping types A and B |
| --- | --- |
| 0 | 3 |
| 1 | 4.5 |
| 2 | 9 for frequency range 1 |

$\kappa$: 64

$T_{ext}$: If the UE uses a shared spectrum channel access method, the UE may calculate $T_{ext}$ and apply the same to the PDSCH processing procedure time. Otherwise, $T_{ext}$ is assumed to be 0.

If $l_1$ indicating the PDSCH DMRS position value is 12, $N_{1,0}$ in Table 22 has a value of 14, otherwise it has a value of 13.

For the PDSCH mapping type A, if the last symbol of the PDSCH is the $i^{th}$ symbol in the slot in which the PDSCH is transmitted, and if i<7, $d_{1,1}$ is 7−i, otherwise $d_{1,1}$ is 0.

$d_2$: If the PUCCH having a high priority index and the PUCCH or PUSCH having a low priority index overlap in time, $d_2$ of the PUCCH having a high priority index may be configured as a value reported by the UE. Otherwise, $d_2$ is 0.

If the PDSCH mapping type B is used for UE processing capability 1, the value $d_{1,1}$ may be determined according to L indicating the number of symbols of the scheduled PDSCH, and d indicating the number of overlapping symbols between the PDCCH scheduling the PDSCH and the scheduled PDSCH as follows.

If L≥7, $d_{1,1}$=0.
If L≥4 and if L≤6, $d_{1,1}$=7−L.
If L=3, $d_{1,1}$=min (d, 1).
if L=2, $d_{1,1}$=3+d.

If the PDSCH mapping type B is used for UE processing capability 2, the value $d_{1,1}$ may be determined according to L indicating the number of symbols of the scheduled PDSCH, and d indicating the number of overlapping symbols between the PDCCH scheduling the PDSCH and the scheduled PDSCH as follows.

If L≥7, $d_{1,1}$=0.
If L≥4 and if L≤6, $d_{1,1}$=7−L.
In the case of L=2,
if the scheduling PDCCH exists in a CORESET comprised of three symbols, and if the corresponding CORESET and the scheduled PDSCH have the same start symbol, $d_{1,1}$=3.
Otherwise, $d_{1,1}$=d.

In the case of a UE supporting capability 2 in a given serving cell, the PDSCH processing procedure time according to UE processing capability 2 may be applied when "processingType2Enabled" of the UE, which is higher layer signaling, is configured to be enable for the cell.

If the position of a first uplink transmission symbol of a PUCCH including HARQ-ACK information (this position may consider $K_1$, which is defined as a transmission time of HARQ-ACK, a PUCCH resource used for HARQ-ACK transmission, and a timing advance effect) is not earlier than a first uplink transmission symbol after a time of $T_{proc,1}$ from the last symbol of the PDSCH, the UE must transmit a valid HARQ-ACK message. That is, the UE must transmit the PUCCH including the HARQ-ACK only when the PDSCH processing procedure time is sufficient. Otherwise, the UE is unable to provide the base station with valid HARQ-ACK information corresponding to the scheduled PDSCH. The $T_{proc,1}$ may be used for both normal and extended CPs. In the case of a PDSCH comprised of two PDSCH transmission positions in one slot, $d_{1,1}$ is calculated based on the first PDSCH transmission position in the corresponding slot.

PDSCH: Reception Preparation Time for Cross-Carrier Scheduling

The following will describe a PDSCH reception preparation time, $N_{pdsch}$, of a UE in which the time interval between a PDCCH and a PDSCH is defined in the case where the cross-carrier scheduling of the numerology $\mu_{PDCCH}$ for transmitting a scheduling PDCCH is different from the cross-carrier scheduling of the numerology $\mu_{PDSCH}$ for transmitting a PDSCH scheduled through the corresponding PDCCH.

If $\mu_{PDCCH} < \mu_{PDSCH}$, the scheduled PDSCH cannot be transmitted earlier than a first symbol of a slot appearing after $N_{pdsch}$ symbols from the last symbol of the PDCCH having scheduled the PDSCH. A transmission symbol of the PDSCH may include a DM-RS.

If $\mu_{PDCCH} > \mu_{PDSCH}$, the scheduled PDSCH may be transmitted after $N_{pdsch}$ symbols from the last symbol of the PDCCH having scheduled the PDSCH. A transmission symbol of the PDSCH may include a DM-RS.

TABLE 24

$N_{pdsch}$ according to scheduled PDCCH subcarrier spacing

| $\mu_{PDCCH}$ | $N_{pdsch}$ [symbols] |
|---|---|
| 0 | 4 |
| 1 | 5 |
| 2 | 10 |
| 3 | 14 |

PDSCH: TCI State Activation MAC-CE

Next, a beam configuration method for a PDSCH will be described.

Figure 16:
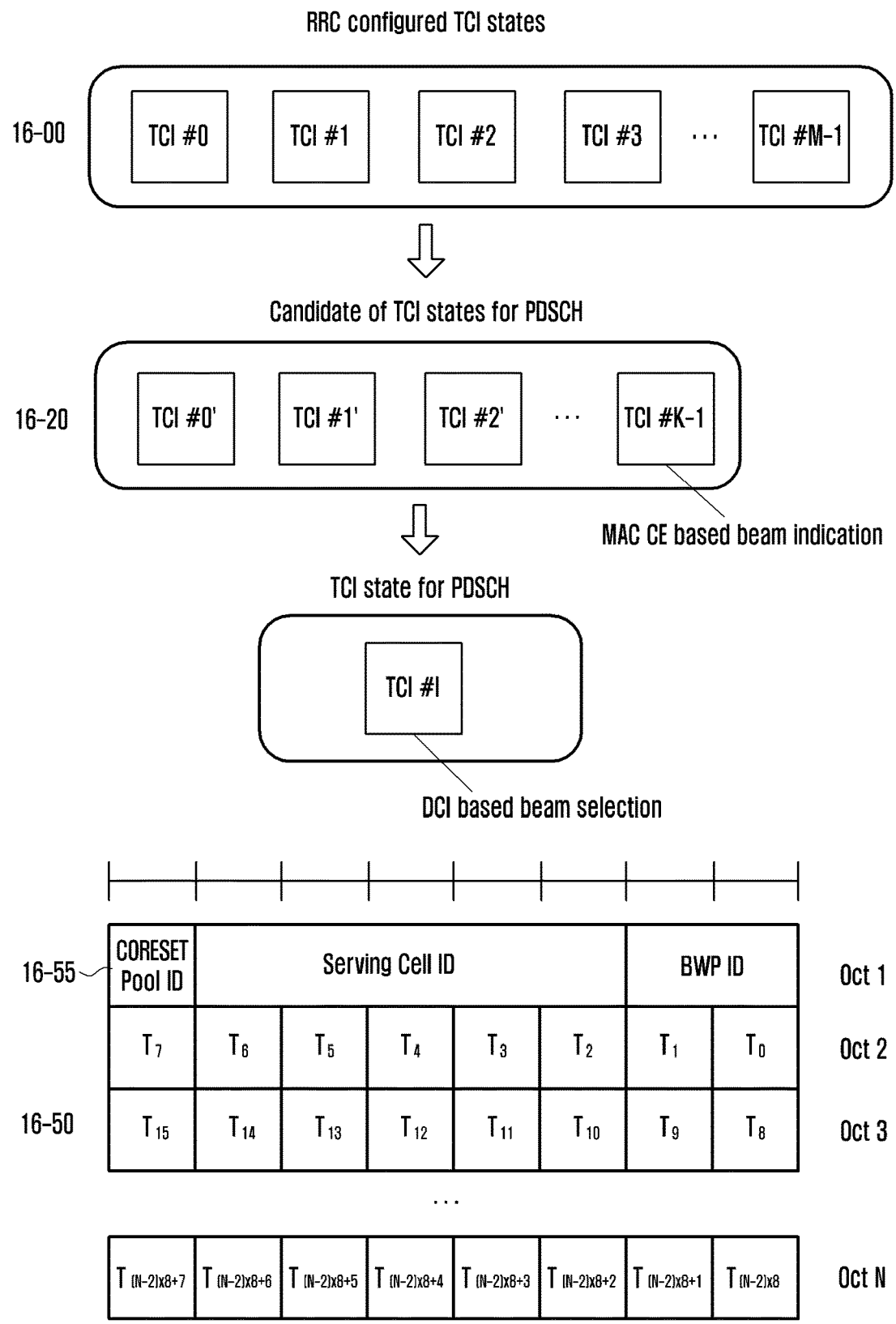
FIG. 16 illustrates a procedure for beam configuration and activation of a PDSCH according to an embodiment of the disclosure.

FIG. 16 illustrates a procedure for beam configuration and activation of a PDSCH according to an embodiment of the disclosure.

Referring to FIG. 16, a list of TCI states for a PDSCH may be indicated through a higher layer list such as RRC or the like (16-00). The list of TCI states may be indicated by, for example, "tci-StatesToAddModList" and/or "tci-States-ToReleaseList" in a PDSCH-Config IE for each BWP. Next, some of the TCI states in the list may be activated through a MAC-CE (16-20). The maximum number of activated TCI states may be determined according to the capability reported by the UE. Reference numeral 16-50 shows an example of a MAC-CE structure for PDSCH TCI state activation/deactivation.

Definitions of respective fields in the MAC-CE and available values for respective fields are as follows.

- Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;
- BWP ID: This field indicates a DL BWP for which the MAC CE applies as the codepoint of the DCI bandwidth part indicator field as specified in TS 38.212 [9]. The length of the BWP ID field is 2 bits. This field is ignored if this MAC CE applies to a set of Serving Cells;
- $T_i$: If there is a TCI state with TCI-StateId i as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI Transmission Configuration Indication field, as specified in TS 38.214 [7]. The Ti field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e. the first TCI State with $T_i$ field set to 1 shall be mapped to the codepoint value 0, second TCI State with Ti field set to 1 shall be mapped to the codepoint value 1 and so on. The maximum number of activated TCI states is 8;
- CORESET Pool ID (CORESET Pool ID identity): This field indicates that mapping between the activated TCI states and the codepoint of the DCI Transmission Configuration Indication set by field Ti is specific to the ControlResourceSetId configured with CORESET Pool ID as specified in TS 38.331 [5]. This field set to 1 indicates that this MAC CE shall be applied for the DL transmission scheduled by CORESET with the CORESET pool ID equal to 1, otherwise, this MAC CE shall be applied for the DL transmission scheduled by CORESET pool ID equal to 0. If the coresetPoolIndex is not configured for any CORESET, MAC entity shall ignore the CORESET Pool ID field in this MAC CE when receiving the MAC CE. If the Serving Cell in the MAC CE is configured in a cell list that contains more than one Serving Cell, the CORESET Pool ID field shall be ignored when receiving the MAC CE.

SRS Related

Next, an uplink channel estimation method using sounding reference signal (SRS) transmission of the UE will be described. The base station may configure at least one SRS configuration for each uplink BWP in order to transmit configuration information for transmitting an SRS to the UE, and also configure at least one SRS resource set for each SRS configuration. For example, the base station and the UE may exchange higher layer signaling information below in order to transmit information for the SRS resource set.

- srs-ResourceSetId: SRS resource set index
- srs-ResourceIdList: a set of SRS resource indexes referenced in the SRS resource set
- resourceType: This is a time domain transmission configuration of the SRS resource referenced in the SRS resource set, and may be configured as one of "periodic", "semi-persistent", and "aperiodic". If it is configured as "periodic" or "semi-persistent", associated CSI-RS information may be provided depending on the usage of the SRS resource set. If it is configured as "aperiodic", an aperiodic SRS resource trigger list and slot offset information may be provided, and associated CSI-RS information may be provided depending on the usage of the SRS resource set.
- usage: This is configuration for the usage of the SRS resource referenced in the SRS resource set, and may be configured as one of "beamManagement", "codebook", "nonCodebook", and "antennaSwitching".
- alpha, p0, pathlossReferenceRS, and srs-PowerControlAdjustmentStates: These provide parameter configurations for adjusting the transmission power of the SRS resource referenced in the SRS resource set.

The UE may understand that the SRS resources included in a set of SRS resource indexes referenced in the SRS resource set follow the information configured in the SRS resource set.

In addition, the base station and the UE may transmit and receive higher layer signaling information to transmit individual configuration information for the SRS resources. For example, the individual configuration information for the SRS resources may include time-frequency domain mapping information in the slot of the SRS resource, which may include information about intra-slot or inter-slot frequency hopping of the SRS resource. In addition, the individual configuration information of the SRS resource may include a time domain transmission configuration of the SRS resource, and may be configured as one of "periodic", "semi-persistent", and "aperiodic". This may be limited to have the same time domain transmission configuration as the SRS resource set including the SRS resource. If the time domain transmission configuration of the SRS resource is configured as "periodic" or "semi-persistent", an SRS resource transmission period and a slot offset (e.g., periodicityAndOffset) may be further included in the time domain transmission configuration.

The base station may activate, deactivate, or trigger SRS transmission to the UE through higher layer signaling including RRC signaling or MAC CE signaling, or L1 signaling (e.g., DCI). For example, the base station may activate or deactivate periodic SRS transmission to the UE through higher layer signaling. The base station may instruct to activate an SRS resource set in which "resourceType" is configured as "periodic" through higher layer signaling, and the UE may transmit an SRS resource referenced in the activated SRS resource set. The time-frequency domain resource mapping of the transmitted SRS resource in the slot follows the resource mapping information configured in the SRS resource, and the slot mapping including a transmission period and a slot offset follow "periodicityAndOffset" configured in the SRS resource. In addition, a spatial domain transmission filter applied to the SRS resource to be transmitted may refer to spatial relation info configured in the SRS resource, or may refer to associated CSI-RS information configured in the SRS resource set including the SRS resource. The UE may transmit the SRS resource within the uplink BWP activated for the periodic SRS resource activated through higher layer signaling.

For example, the base station may activate or deactivate semi-persistent SRS transmission to the UE through higher layer signaling. The base station may instruct to activate the SRS resource set through MAC CE signaling, and the UE may transmit the SRS resource referenced in the activated SRS resource set. The SRS resource set activated through MAC CE signaling may be limited to the SRS resource in which "resourceType" is configured as "semi-persistent". The time-frequency domain resource mapping of the SRS resource to be transmitted in the slot follows the resource mapping information configured in the SRS resource, and the slot mapping including a transmission period and a slot offset follows "periodicityAndOffset" configured in the SRS resource. In addition, a spatial domain transmission filter applied to the SRS resource to be transmitted may refer to spatial relation info configured in the SRS resource, or may refer to associated CSI-RS information configured in the SRS resource set including the SRS resource. If spatial relation info is configured in the SRS resource, the spatial domain transmission filter may be determined with reference to configuration information on spatial relation info transmitted through MAC CE signaling that activates semi-persistent SRS transmission, instead of following the same. The UE may transmit the SRS resource within the uplink BWP activated for the semi-persistent SRS resource activated through higher layer signaling.

For example, the base station may trigger aperiodic SRS transmission to the UE through DCI. The base station may indicate one of aperiodic SRS resource triggers (aperiodicSRS-ResourceTrigger) through an SRS request field of DCI. The UE may understand that the SRS resource set including the aperiodic SRS resource trigger indicated through DCI in the aperiodic SRS resource trigger list, among the configuration information of the SRS resource set, is triggered. The UE may transmit the SRS resource referenced in the triggered SRS resource set. The time-frequency domain resource mapping the transmitted SRS resource in the slot follows the resource mapping information configured in the SRS resource. In addition, the slot mapping of the transmitted SRS resource may be determined through a slot offset between a PDCCH including DCI and the SRS resource, which may refer to the value(s) included in the slot offset set configured for the SRS resource set. Specifically, as the slot offset between the PDCCH including DCI and the SRS resource, a value indicated in the time domain resource assignment field of DCI, among the offset value(s) included in the slot offset set configured in the SRS resource set, may be applied. In addition, a spatial domain transmission filter applied to the transmitted SRS resource may refer to spatial relation info configured in the SRS resource, or may refer to associated CSI-RS information configured in the SRS resource set including the SRS resource. The UE may transmit the SRS resource within the uplink BWP activated for the aperiodic SRS resource triggered through DCI.

In the case where the base station triggers aperiodic SRS transmission to the UE through DCI, in order for the UE to transmit the SRS by applying configuration information on the SRS resource, a minimum time interval between a PDCCH including DCI triggering the aperiodic SRS transmission and the transmitted SRS may be required. The time interval for SRS transmission of the UE may be defined as the number of symbols between the last symbol of a PDCCH including DCI triggering aperiodic SRS transmission and a first symbol to which the SRS resource transmitted first, among the SRS resource(s) to be transmitted, is mapped. The minimum time interval may be determined with reference to the PUSCH preparation procedure time required for the UE to prepare for PUSCH transmission. In addition, the minimum time interval may have different values depending on the usage of the SRS resource set including the transmitted SRS resource. For example, the minimum time interval may be determined as N2 symbols defined in consideration of the UE processing capability according to the UE capability with reference to the PUSCH preparation procedure time of the UE. In addition, in consideration of the usage of the SRS resource set including the transmitted SRS resource, if the usage of the SRS resource set is configured as "codebook" or "antennaSwitching", the minimum time interval may be configured as N2 symbols, and if the usage of the SRS resource set is configured as "nonCodebook" or "beamManagement", the minimum time interval may be configured as (N2+14) symbols. If the time interval for aperiodic SRS transmission is greater than or equal to the minimum time interval, the UE may transmit aperiodic SRSs, and if the time interval for aperiodic SRS transmission is less than the minimum time interval, the UE may ignore DCI triggering the aperiodic SRS.

TABLE 25

```
SRS-Resource ::=                           SEQUENCE {
   srs-ResourceId                             SRS-ResourceId,
   nrofSRS-Ports                              ENUMERATED {port1, ports2, ports4},
   ptrs-PortIndex                             ENUMERATED {n0, n1 }
OPTIONAL,   -- Need R
   transmissionComb                           CHOICE {
      n2                                      SEQUENCE {
         combOffset-n2                              INTEGER (0..1),
         cyclicShift-n2                             INTEGER (0..7)
      },
      n4                                      SEQUENCE {
         combOffset-n4                              INTEGER (0..3),
         cyclicShift-n4                             INTEGER (0..11)
      }
   },
   resourceMapping                            SEQUENCE {
      startPosition                              INTEGER (0..5),
      nrofSymbols                                ENUMERATED {n1, n2, n4},
      repetitionFactor                           ENUMERATED {n1, n2, n4}
   },
   freqDomainPosition                         INTEGER (0..67),
   freqDomainShift                            INTEGER (0..268),
   freqHopping                                SEQUENCE {
      c-SRS                                      INTEGER (0..63),
      b-SRS                                      INTEGER (0..3),
      b-hop                                      INTEGER (0..3)
   },
   groupOrSequenceHopping                     ENUMERATED { neither,
groupHopping, sequenceHopping },
   resourceType                               CHOICE {
      aperiodic                                  SEQUENCE {
         ...
      },
      semi-persistent                            SEQUENCE {
         periodicityAndOffset-sp                        SRS-PeriodicityAndOffset,
         ...
      },
      periodic                                   SEQUENCE {
         periodicityAndOffset-p                         SRS-PeriodicityAndOffset,
         ...
      }
   },
   sequenceId                                 INTEGER (0..1023),
   spatialRelationInfo                        SRS-SpatialRelationInfo
OPTIONAL,   -- Need R
   ...
}
```

The configuration information "spatialRelationInfo" in Table 25 is intended to apply beam information of the reference signal to the beam used in transmission of the corresponding SRS with reference to one reference signal. For example, the configuration of "spatialRelationInfo" may include information shown in Table 26 below.

TABLE 26

```
SRS-SpatialRelationInfo ::=      SEQUENCE {
    servingCellId                ServCellIndex          OPTIONAL,  -- Need S
    referenceSignal              CHOICE {
        ssb-Index                SSB-Index,
        csi-RS-Index             NZP-CSI-RS-ResourceId,
        srs                      SEQUENCE {
            resourceId           SRS-ResourceId,
            uplinkBWP            BWP-Id
        }
    }
}
```

Referring to the above spatialRelationInfo configuration, an SS/PBCH block index, a CSI-RS index, or an SRS index may be configured as an index of a reference signal to be referenced in order to use beam information of a specific reference signal. The higher layer signaling referenceSignal is configuration information indicating which reference signal beam information is to be referred to for the corresponding SRS transmission, "ssb-Index" indicates the index of the SS/PBCH block, "csi-RS-Index" indicates the index of the CSI-RS, and "srs" indicates the index of the SRS. If the higher layer signaling referenceSignal value is configured as "ssb-Index", the UE may apply the reception beam used when receiving the SS/PBCH block corresponding to the ssb-Index as a transmission beam of the corresponding SRS transmission. If the higher layer signaling referenceSignal value is configured as "csi-RS-Index", the UE may apply the reception beam used when receiving the CSI-RS corresponding to the csi-RS-Index as a transmission beam of the corresponding SRS transmission. If the higher layer signaling referenceSignal value is configured as "srs", the UE may apply the transmission beam used when transmitting the SRS corresponding to the srs as a transmission beam of the corresponding SRS transmission.

PUSCH: In Relation to Transmission Method

Next, a scheduling method of PUSCH transmission will be described.

PUSCH transmission may be dynamically scheduled by a UL grant in DCI, or may be operated by configured grant Type 1 or Type 2. Dynamic scheduling indication for PUSCH transmission may be performed through DCI format 0_0 or 0_1.

PUSCH transmission in the configured grant Type 1 may be semi-statically configured through reception of "configuredGrantConfig" including "rrc-ConfiguredUplinkGrant" in Table 27 using higher layer signaling without receiving a UL grant in DCI. PUSCH transmission in the configured grant Type 2 may be semi-continuously scheduled by a UL grant in DCI after reception of "configuredGrantConfig" that does not include "rrc-ConfiguredUplinkGrant" in Table 27 through higher layer signaling. In the case where PUSCH transmission is operated by a configured grant, parameters applied to PUSCH transmission are applied through the higher layer signaling "configuredGrantConfig" in Table 27, excluding "dataScramblingIdentityPUSCH", "txConfig", "codebookSubset", "maxRank", and "scaling of UCI-On-PUSCH", which are provided through the higher layer signaling "pusch-Config" in Table 28. If the UE is provided with "transformPrecoder" in "configuredGrantConfig", which is the higher layer signaling in Table 27, the UE applies "tp-pi2BPSK" in "pusch-Config" of Table 28 to PUSCH transmission operated by a configured grant.

TABLE 27

```
ConfiguredGrantConfig ::=               SEQUENCE {
    frequencyHopping                    ENUMERATED {intraSlot, interSlot}
OPTIONAL,   -- Need S,
    cg-DMRS-Configuration               DMRS-UplinkConfig,
    mcs-Table                           ENUMERATED {qam256, qam64LowSE}
OPTIONAL,   -- Need S
    mcs-TableTransformPrecoder          ENUMERATED {qam256, qam64LowSE}
OPTIONAL,   -- Need S
    uci-OnPUSCH                         SetupRelease { CG-UCI-OnPUSCH }
OPTIONAL,   -- Need M
    resourceAllocation                  ENUMERATED { resourceAllocationType0,
resourceAllocationType1, dynamicSwitch },
    rbg-Size                            ENUMERATED {config2}
OPTIONAL,   -- Need S
    powerControlLoopToUse               ENUMERATED {n0, n1},
    p0-PUSCH-Alpha                      P0-PUSCH-AlphaSetId,
    transformPrecoder                   ENUMERATED {enabled, disabled}
OPTIONAL,   -- Need S
    nrofHARQ-Processes                  INTEGER(1..16),
    repK                                ENUMERATED {n1, n2, n4, n8},
    repK-RV                             ENUMERATED {s1-0231, s2-0303, s3-0000}
```

TABLE 27-continued

```
OPTIONAL,  -- Need R
    periodicity                    ENUMERATED {
                                     sym2, sym7, sym1x14, sym2x14, sym4x14, sym5x14,
sym8x14, sym10x14, sym16x14, sym20x14,
                                     sym32x14, sym40x14, sym64x14, sym80x14,
sym128x14, sym160x14, sym256x14, sym320x14, sym512x14,
                                     sym640x14, sym1024x14, sym1280x14, sym2560x14,
sym5120x14,
                                     sym6, sym1x12, sym2x12, sym4x12, sym5x12,
sym8x12, sym10x12, sym16x12, sym20x12, sym32x12,
                                     sym40x12, sym64x12, sym80x12, sym128x12,
sym160x12, sym256x12, sym320x12, sym512x12, sym640x12,
                                     sym1280x12, sym2560x12
    },
    configuredGrantTimer           INTEGER (1..64)
OPTIONAL,  -- Need R
    rrc-ConfiguredUplinkGrant      SEQUENCE {
        timeDomainOffset           INTEGER (0..5119),
        timeDomainAllocation       INTEGER (0..15),
        frequencyDomainAllocation   BIT STRING (SIZE(18)),
        antennaPort                INTEGER (0..31),
        dmrs-SeqInitialization     INTEGER (0..1)
OPTIONAL,  -- Need R
        precodingAndNumberOfLayers     INTEGER (0..63),
        srs-ResourceIndicator      INTEGER (0..15)
OPTIONAL,  -- Need R
        mcsAndTBS                  INTEGER (0..31),
        frequencyHoppingOffset       INTEGER (1..
maxNrofPhysicalResourceBlocks-1)           OPTIONAL,  -- Need R
        pathlossReferenceIndex       INTEGER (0..maxNrofPUSCH-
PathlossReferenceRSs-1),
        ...
    }                                                                OPTIONAL,
-- Need R
    ...
}
```

Next, a PUSCH transmission method will be described. A DMRS antenna port for PUSCH transmission is the same as an antenna port for SRS transmission. PUSCH transmission may be performed by a codebook-based transmission method or a non-codebook-based transmission method depending on whether a value "txConfig" in "pusch-Config" of Table 28, which is higher layer signaling, is "codebook" or "nonCodebook".

As described above, PUSCH transmission may be dynamically scheduled through DCI format 0_0 or 0_1, and may be semi-statically configured by a configured grant. If the UE receives a notification of scheduling for PUSCH transmission through DCI format 0_0, the UE performs beam configuration for PUSCH transmission using "pucch-spatialRelationInfoID" corresponding to a UE-specific PUCCH resource corresponding to the minimum ID within the uplink BWP activated in the serving cell, and in this case, PUSCH transmission is based on a single antenna port. The UE does not expect scheduling for PUSCH transmission through DCI format 0_0 within the BWP in which the PUCCH resource including "pucch-spatialRelationInfo" is not configured. If the UE does not receive a configuration of "txConfig" in "pusch-Config" of Table 28, the UE does not expect scheduling through DCI format 0_1.

TABLE 28

```
PUSCH-Config ::=                   SEQUENCE {
    dataScramblingIdentityPUSCH            INTEGER (0..1023)
OPTIONAL,  -- Need S
    txConfig                       ENUMERATED {codebook, nonCodebook}
OPTIONAL,  -- Need S
    dmrs-UplinkForPUSCH-MappingTypeA    SetupRelease { DMRS-
UplinkConfig }                     OPTIONAL,  -- Need M
    dmrs-UplinkForPUSCH-MappingTypeB    SetupRelease { DMRS-
UplinkConfig }                     OPTIONAL,  -- Need M
    pusch-PowerControl             PUSCH-PowerControl
OPTIONAL,  -- Need M
    frequencyHopping               ENUMERATED {intraSlot, interSlot}
OPTIONAL,  -- Need S
    frequencyHoppingOffsetLists            SEQUENCE (SIZE (1..4)) OF INTEGER
(1.. maxNrofPhysicalResourceBlocks-1)
                                                           OPTIONAL,
-- Need M
    resourceAllocation             ENUMERATED { resourceAllocationType0,
resourceAllocationType1, dynamicSwitch},
    pusch-TimeDomainAllocationList     SetupRelease { PUSCH-
TimeDomainResourceAllocationList }         OPTIONAL,  -- Need M
    pusch-AggregationFactor        ENUMERATED { n2, n4, n8 }
```

TABLE 28-continued

```
OPTIONAL,   -- Need S
    mcs-Table                        ENUMERATED {qam256, qam64LowSE}
OPTIONAL,   -- Need S
    mcs-TableTransformPrecoder              ENUMERATED {qam256, qam64LowSE}
OPTIONAL,   -- Need S
    transformPrecoder                ENUMERATED {enabled, disabled}
OPTIONAL,   -- Need S
    codebookSubset                   ENUMERATED
{fullyAndPartialAndNonCoherent, partialAndNonCoherent,nonCoherent}
                                                        OPTIONAL, --
Cond codebookBased
    maxRank                          INTEGER (1..4)
OPTIONAL, -- Cond codebookBased
    rbg-Size                         ENUMERATED { config2}
OPTIONAL,  -- Need S
    uci-OnPUSCH                            SetupRelease { UCI-OnPUSCH}
OPTIONAL, -- Need M
    tp-pi2BPSK                       ENUMERATED {enabled}
OPTIONAL, -- Need S
    ...
}
```

Next, codebook-based PUSCH transmission will be described. Codebook-based PUSCH transmission may be dynamically scheduled through DCI format 0_0 or 0_1, and may be operated semi-statically by a configured grant. If a codebook-based PUSCH is dynamically scheduled by DCI format 0_1 or is semi-statically configured by a configured grant, the UE determines a precoder for PUSCH transmission, based on an SRS resource indicator (SRI), a transmission precoding matrix indicator (TPMI), and a transmission rank (the number of PUSCH transmission layers).

In this case, the SRI may be given through a field SRS resource indicator in DCI or may be configured through "srs-ResourceIndicator", which is higher layer signaling. At least one SRS resource may be configured for the UE during the codebook-based PUSCH transmission, and up to two SRS resources may be configured. If the UE is provided with the SRI through DCI, the SRS resource indicated by the SRI indicates an SRS resource corresponding to the SRI, among the SRS resources transmitted prior to the PDCCH including the SRI. In addition, the TPMI and the transmission rank may be given through fields precoding information and number of layers in DCI, or may be configured through higher layer signaling "precodingAndNumberOfLayers". The TPMI is used to indicate a precoder applied to PUSCH transmission. If one SRS resource is configured for the UE, the TPMI is used to indicate the precoder to be applied in the configured one SRS resource. If a plurality of SRS resources is configured for the UE, the TPMI is used to indicate a precoder to be applied in the SRS resource indicated through the SRI.

A precoder to be used for PUSCH transmission is selected from an uplink codebook having the same number of antenna ports as the value "nrofSRS-Ports" in the higher layer signaling "SRS-Config". In the codebook-based PUSCH transmission, the UE determines a codebook subset, based on the TPMI and "codebookSubset" in the higher layer signaling "pusch-Config". "CodebookSubset" in the higher layer signaling "pusch-Config" may be configured as one of "fullyAndPartialAndNonCoherent", "partialAndNonCoherent", or "noncoherent", based on the UE capability reported by the UE to the base station. If the UE reports "partialAndNonCoherent" as UE capability, the UE does not expect that the value of the higher layer signaling "codebookSubset" will be configured as "fullyAndPartialAndNonCoherent". In addition, if the UE reports "noncoherent" as UE capability, the UE does not expect that the value of the higher layer signaling "codebookSubset" will be configured as "fullyAndPartialAndNonCoherent" or "partialAndNonCoherent". If "nrofSRS-Ports" in the higher layer signaling "SRS-ResourceSet" indicates two SRS antenna ports, the UE does not expect that the value of the higher layer signaling "codebookSubset" will be configured as "partialAndNonCoherent".

One SRS resource set in which the value of usage in the higher layer signaling "SRS-ResourceSet" is configured as "codebook" may be configured for the UE, and one SRS resource may be indicated through SRI in the corresponding SRS resource set. If several SRS resources are configured in the SRS resource in which the value of usage in the higher layer signaling "SRS-ResourceSet" is configured as "codebook", the UE expects that "nrofSRS-Ports" in the higher layer signaling "SRS-Resource" has is the same value for all SRS resources.

The UE transmits, to the base station, one or more SRS resources included in the SRS resource set in which the value of usage is configured as "codebook" according to higher layer signaling, and the base station selects one of the SRS resources transmitted by the UE and instructs the UE to perform PUSCH transmission using transmission beam information of the corresponding SRS resource. In this case, in the codebook-based PUSCH transmission, the SRI is used as information for selecting an index of one SRS resource and is included in DCI. Additionally, the base station includes information indicating the TPMI and rank to be used by the UE for PUSCH transmission in DCI. The UE performs PUSCH transmission by using the SRS resource indicated by the SRI and applying the precoder indicated by the rank and TPMI indicated based on the transmission beam of the SRS resource.

Next, non-codebook-based PUSCH transmission will be described. Non-codebook-based PUSCH transmission may be dynamically scheduled through DCI format 0_0 or 0_1 and may be semi-statically operated by a configured grant. If at least one SRS resource is configured in the SRS resource set in which the value of usage in the higher layer signaling "SRS-ResourceSet" is configured as "nonCodebook", the UE may receive a notification of scheduling for non-codebook-based PUSCH transmission through DCI format 0_1.

For the SRS resource set in which the value of usage in the higher layer signaling "SRS-ResourceSet" is configured as "nonCodebook", the UE may receive a configured of one connected NZP CSI-RS resource (non-zero power CSI-RS). The UE may perform a calculation for the precoder for SRS transmission by measuring the NZP CSI-RS resource connected to the SRS resource set. If the difference between the last reception symbol of the aperiodic NZP CSI-RS resource connected to the SRS resource set and the first symbol of aperiodic SRS transmission in the UE is less than 42 symbols, the UE does not expect that the information on the precoder for SRS transmission will be updated.

If the value "resourceType" in the higher layer signaling "SRS-ResourceSet" is configured as "aperiodic", the connected NZP CSI-RS is indicated by a SRS request, which is a field in DCI format 0_1 or 1_1. In this case, if the connected NZP CSI-RS resource is an aperiodic NZP CSI-RS resource, it indicates that a connected NZP CSI-RS exists in the case where the value of the field "SRS request" in DCI format 0_1 or 1_1 is not "00". The corresponding DCI must not indicate cross carrier or cross BWP scheduling. In addition, if the value of the SRS request indicates the existence of an NZP CSI-RS, the corresponding NZP CSI-RS is located in the slot in which a PDCCH including the SRS request field is transmitted. In this case, the TCI states configured in the scheduled subcarrier are not configured as QCL-TypeD.

If a periodic or semi-persistent SRS resource set is configured, a connected NZP CSI-RS may be indicated through "associatedCSI-RS" in the higher layer signaling "SRS-ResourceSet". For non-codebook-based transmission, the UE does not expect that both "spatialRelationInfo", which is higher layer signaling for the SRS resource, and "associatedCSI-RS" in the higher layer signaling "SRS-ResourceSet" will be configured.

If a plurality of SRS resources are configured for the UE, the UE may determine a precoder and a transmission rank to be applied to PUSCH transmission, based on the SRI indicated by the base station. In this case, the SRI may be indicated through a field "SRS resource indicator" in DCI or may be configured through "srs-ResourceIndicator", which is higher layer signaling. Like the above-described codebook-based PUSCH transmission, if the UE is provided with an SRI through DCI, an SRS resource indicated by the SRI indicates the SRS resource corresponding to the SRI, among the SRS resources transmitted prior to a PDCCH including the SRI. The UE may use one or more SRS resources for SRS transmission, and the maximum number of SRS resources and the maximum number of SRS resources that can be simultaneously transmitted in the same symbol in one SRS resource set are determined by the UE capability reported by the UE to the base station. The SRS resources simultaneously transmitted by the UE occupy the same RB. The UE configures one SRS port for each SRS resource. Only one SRS resource set in which the value of usage in the higher layer signaling "SRS-ResourceSet" is configured as "nonCodebook" may be configured, and up to four SRS resources may be configured for non-codebook-based PUSCH transmission.

The base station transmits one NZP-CSI-RS connected to the SRS resource set to the UE, and the UE calculates a precoder to be used for transmission of one or more SRS resources in the corresponding SRS resource set, based on a result measured upon receiving the NZP-CSI-RS. The UE applies the calculated precoder when transmitting one or more SRS resources in the SRS resource set in which the usage is configured as "nonCodebook" to the base station, and the base station selects one or more of the received one or more SRS resources. In the non-codebook-based PUSCH transmission, the SRI indicates an index capable of representing one SRS resource or a combination of a plurality of SRS resources, and the SRI is included in the DCI. The number of SRS resources indicated by the SRI transmitted by the base station may be the number of transmission layers of the PUSCH, and the UE transmits the PUSCH by applying a precoder applied to SRS resource transmission to each layer.

PUSCH: Preparation Procedure Time

Next, a PUSCH preparation procedure time will be described. In the case where the base station schedules the UE to transmit a PUSCH using DCI format 0_0, 0_1, or 0_2, the UE may require a PUSCH preparation procedure time for transmitting a PUSCH by applying the transmission method indicated through DCI (a transmission precoding method of SRS resources, the number of transmission layers, and a spatial domain transmission filter). In NR, a PUSCH preparation procedure time is defined in consideration of this. The PUSCH preparation procedure time of the UE may follow Equation 4 below.

$$T_{proc,2} = \max((N_2 + d_{2,1} + d_2)(2048 + 144)\kappa 2^{-\mu} T_c + T_{ext} + T_{switch}, d_{2,2}) \quad \text{Equation 4}$$

Respective variables in $T_{proc,2}$ described in Equation 4 may have the following definitions.

$N_2$: The number of symbols determined according to UE processing capability 1 or 2 according to the UE capability and numerology μ. This may have the values shown in Table 29 in the case where UE processing capability 1 is reported according to the capability report of the UE, and may have the values shown in Table 30 in the case where UE processing capability 2 is reported and where UE processing capability 2 is configured to be available through higher layer signaling.

TABLE 29

| μ | PUSCH preparation time $N_2$ [symbols] |
|---|---|
| 0 | 10 |
| 1 | 12 |
| 2 | 23 |
| 3 | 36 |

TABLE 30

| μ | PUSCH preparation time $N_2$ [symbols] |
|---|---|
| 0 | 5 |
| 1 | 5.5 |
| 2 | 11 for frequency range 1 | d2,1: The number of symbols configured as "0" if all resource elements of the first OFDM symbol of PUSCH transmission are configured as only DM-RSs, otherwise configured as "1".

κ: 64

μ: $μ_{DL}$ or $μ_{UL}$, which increases $T_{proc,2}$. $μ_{DL}$ indicates a numerology of a downlink in which a PDCCH including DCI for scheduling a PUSCH is transmitted, and $μ_{UL}$ indicates a numerology of an uplink in which a PUSCH is transmitted.

$T_c$: This has $1/(\Delta f_{max} \cdot N_f)$, $\Delta f_{max} = 480 \cdot 10^3$ Hz, $N_f = 4096$ $d_{2,2}$: This follows a BWP switching time if the DCI scheduling a PUSCH indicates BWP switching, otherwise this has "0".

d₂: If OFDM symbols of a PUCCH, a PUSCH having a high priority index, and a PUCCH having a low priority index overlap in time, the value d₂ of the PUSCH having a high priority index is used. Otherwise, d₂ is "0".

T_ext: If the UE uses a shared spectrum channel access method, the UE may calculate T_ext and apply the same to the PUSCH preparation procedure time. Otherwise, T_ext is assumed to be "0".

T_switch: If an uplink switching interval is triggered, T_switch is assumed to be a switching interval time. Otherwise, it is assumed to be "0".

Considering the influence of the timing advance between time domain resource mapping information of a PUSCH scheduled through DCI and the uplink-downlink, if the first symbol of a PUSCH starts earlier than the first uplink symbol in which CP starts after $T_{proc,2}$ from the last symbol of a PDCCH including DCI scheduling the PUSCH, the base station and the UE determine that the PUSCH preparation procedure time is not sufficient. Otherwise, the base station and the UE determine that the PUSCH preparation procedure time is sufficient. The UE may transmit a PUSCH only if the PUSCH preparation procedure time is sufficient, and ignore DCI scheduling a PUSCH if the PUSCH preparation procedure time is not sufficient.

PUSCH: In Relation to Repetitive Transmission

Hereinafter, repetitive transmission of an uplink data channel in a 5G system will be described in detail. A 5G system supports two types of repetitive transmission methods of an uplink data channel, i.e., repetitive PUSCH transmission type A and repetitive PUSCH transmission type B. One of repetitive PUSCH transmission type A or B may be configured for the UE through higher layer signaling.

Repetitive PUSCH Transmission Type A

As described above, the symbol length and the position of a start symbol of an uplink data channel may be determined by a time domain resource assignment method in one slot, and the base station may notify the UE of the number of repetitive transmissions through higher layer signaling (e.g., RRC signaling) or L1 signaling (e.g. DCI).

The UE may repetitively transmit an uplink data channel having the same length and start symbol as the configured uplink data channel, based on the number of repetitive transmissions received from the base station in continuous slots. If at least one symbol among the slot configured as downlink for the UE by the base station or among the symbols of the uplink data channel configured for the UE is configured as downlink, the UE omits uplink data channel transmission, but counts the number of repetitive transmissions of the uplink data channel.

Repetitive PUSCH transmission type B

As described above, the symbol length and the position of a start symbol of an uplink data channel may be determined by a time domain resource assignment method in one slot, and the base station may notify the UE of the number of repetitive transmissions "numberofrepetitions" through higher layer signaling (e.g., RRC signaling) or L1 signaling (e.g. DCI).

Based on the start symbol and length of the configured uplink data channel, the nominal repetition of the uplink data channel is determined as follows. The slot where the $n^{th}$ nominal repetition starts is given by $$K_s + \left\lfloor \frac{S + n \cdot L}{N_{symb}^{slot}} \right\rfloor,$$

and the symbol starting from that slot is given by mod(S+ n·L, $N_{symb}^{slot}$). The slot where the $n^{th}$ nominal repetition ends is given by $$K_s + \left\lfloor \frac{S + (n+1)L - 1}{N_{symb}^{slot}} \right\rfloor,$$

and the symbol ending at that slot is given by mod(S+(n+ 1)·L−1, $N_{symb}^{slot}$). Here, n=0, . . . , numberofrepetitions-1, S represents the start symbol of the configured uplink data channel, and L represents the symbol length of the configured uplink data channel. $K_s$ represents a slot in which PUSCH transmission starts, and $N_{symb}^{slot}$ represents the number of symbols per slot.

The UE determines invalid symbols for repetitive PUSCH transmission type B. The symbol configured as downlink by "tdd-UL-DL-ConfigurationCommon" or "tdd-UL-DL-ConfigurationDedicated" is determined as an invalid symbol for repetitive PUSCH transmission type B. Additionally, invalid symbols may be configured in higher layer parameters (e.g. InvalidSymbolPattern). A higher layer parameter (e.g. InvalidSymbolPattern) may provide a symbol-level bitmap over one or two slots, thereby configuring invalid symbols. In the bitmap, "1" represents an invalid symbol. Additionally, a period and pattern of the bitmap may be configured through a higher layer parameter (e.g., periodicityAndPattern). If a higher layer parameter (e.g. InvalidSymbolPattern) is configured and if a parameter "InvalidSymbolPatternIndicator-ForDCIFormat0_1" or "InvalidSymbolPatternIndicator-ForDCIFormat0_2" indicates "1", the UE applies an invalid symbol pattern, and if the parameter indicates "0", the UE does not apply the invalid symbol pattern. If a higher layer parameter (e.g.

InvalidSymbolPattern) is configured and if a parameter "InvalidSymbolPatternIndicator-ForDCIFormat0_1" or "InvalidSymbolPatternIndicator-ForDCIFormat0_2" is not configured, the UE applies an invalid symbol pattern.

After the invalid symbol is determined, for each nominal repetition, the UE may consider symbols, other than the invalid symbol, as valid symbols. If one or more valid symbols are included in each nominal repetition, the nominal repetition may include one or more actual repetitions. Each of the actual repetitions includes a set of consecutive valid symbols that may be used for repetitive PUSCH transmission type B in one slot.

Figure 17:
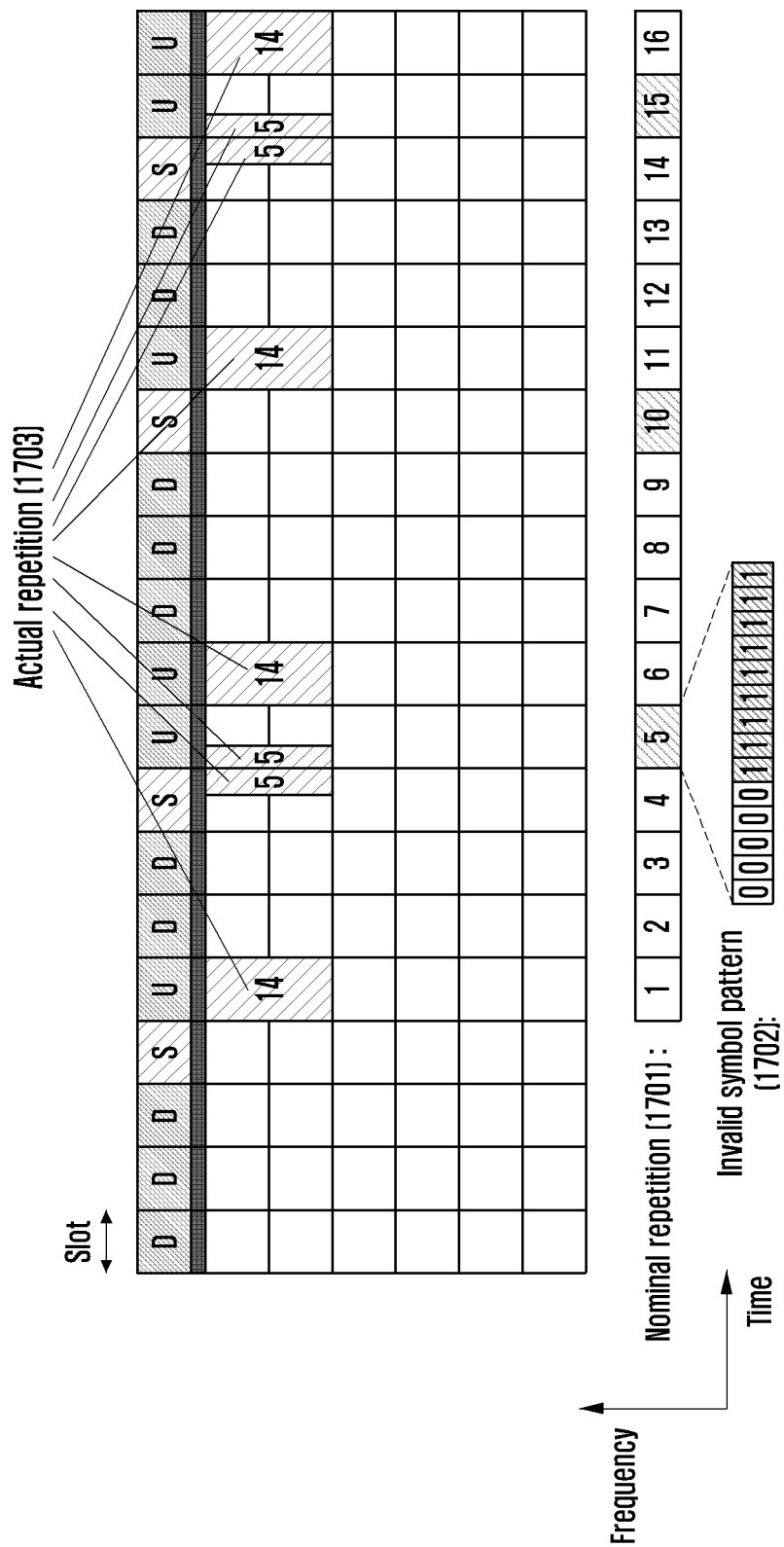
FIG. 17 is a diagram illustrating an example of repetitive PUSCH transmission type B in a wireless communication system according to an embodiment of the disclosure.

FIG. 17 is a diagram illustrating an example of repetitive PUSCH transmission type B in a wireless communication system according to an embodiment of the disclosure.

Referring to FIG. 17, for the UE, a start symbol S of an uplink data channel may be configured as "0", the length L of the uplink data channel may be configured as "14", and the number of repetitive transmissions may be configured as "16". In this case, nominal repetition is shown in 16 consecutive slots (1701). Thereafter, the UE may determine that the symbol configured as a downlink symbol in each nominal repetition 1701 is an invalid symbol. In addition, the UE determines the symbols configured as "1" in the invalid symbol pattern 1702 to be invalid symbols. In each nominal repetition, if the valid symbols, other than the invalid symbols, are comprised of one or more consecutive symbols in one slot, the actual repetition is configured and transmitted (1703).

In addition, for repetitive PUSCH transmission, in NR Release 16, the following methods may be further defined for UL grant-based PUSCH transmission and configured grant-based PUSCH transmission beyond a slot boundary.

Method 1 (mini-slot level repetition): Two or more repetitive PUSCH transmissions are scheduled within one slot or beyond the boundary of consecutive slots through one UL grant. In addition, for Method 1, the time domain resource assignment information in DCI indicates the first repetitive transmission resource. In addition, time domain resource information of the remaining repetitive transmissions may be determined according to the time domain resource information of the first repetitive transmission and the uplink or downlink direction determined for each symbol of each slot. Each repetitive transmission occupies consecutive symbols.

Method 2 (multi-segment transmission): Two or more repetitive PUSCH transmissions are scheduled in consecutive slots through one UL grant. In this case, one transmission is designated for each slot, and different starting points or different repetition lengths may be provided between the respective transmissions. In addition, in Method 2, the time domain resource assignment information in DCI indicates the starting points and repetition lengths of all repetitive transmissions. In addition, in the case of performing repetitive transmission within a single slot by Method 2, if multiple bundles of consecutive uplink symbols exist in the corresponding slot, each repetitive transmission is performed for each bundle of uplink symbols. If a single bundle of consecutive uplink symbols exists in the slot, one repetitive PUSCH transmission is performed according to the method of NR Release 15.

Method 3: Two or more repetitive PUSCH transmissions are scheduled in consecutive slots through two or more UL grants. In this case, one transmission is designated for each slot, and the $n^{th}$ UL grant may be received before PUSCH transmission scheduled by the (n−1)th UL grant is finished.

Method 4: One or more repetitive PUSCH transmissions in a single slot, or two or more repetitive PUSCH transmissions across the boundaries of consecutive slots may be supported by one UL grant or one configured grant. The number of repetitions indicated by the base station to the UE is only a nominal value, and the number of repetitive PUSCH transmissions actually performed by the UE may be greater than the nominal number of repetitions. The time domain resource assignment information in DCI or in the configured grant indicates the resource of the first repetitive transmission indicated by the base station. The time domain resource information of the remaining repetitive transmissions may be determined with reference to at least the resource information of the first repetitive transmission and the uplink or downlink directions of the symbols. If the time domain resource information of the repetitive transmission indicated by the base station covers the slot boundary or includes an uplink/downlink switching point, the repetitive transmission may be divided into a plurality of repetitive transmissions. In this case, one repetitive transmission may be included for each uplink period in one slot.

PUSCH: Frequency Hopping Process

Hereinafter, frequency hopping of an uplink data channel (physical uplink shared channel; PUSCH) in a 5G system will be described in detail.

5G supports two frequency hopping methods of an uplink data channel for each repetitive PUSCH transmission type. Intra-slot frequency hopping and inter-slot frequency hopping are supported for repetitive PUSCH transmission type A, and inter-repetition frequency hopping and inter-slot frequency hopping are supported for repetitive PUSCH transmission type B.

The intra-slot frequency hopping method supported for repetitive PUSCH transmission type A is a method in which the UE changes the allocated resource in the frequency domain by a configured frequency offset in two hops within one slot, and transmits the same. A start RB of each hop in the intra-slot frequency hopping may be expressed through Equation 5.

$$RB_{start} = \begin{cases} RB_{start} & i = 0 \\ (RB_{start} + RB_{offset}) \bmod N_{BWP}^{size} & i = 1 \end{cases} \quad \text{Equation 5}$$

In Equation 5, i=0 and i=1 represent the first hop and the second hop, respectively, and $RB_{start}$ represents a start RB in the UL BWP and is calculated by a frequency resource allocation method. $RB_{offset}$ represents a frequency offset between two hops through a higher layer parameter. The number of symbols of the first hop may be represented by $\lfloor N_{symb}^{PUSCH,s}/2 \rfloor$, and the number of symbols of the second hop may be represented by $N_{symb}^{PUSCH,s} - \lfloor N_{symb}^{PUSCH,s}/2 \rfloor$. $N_{symb}^{PUSCH,s}$ is the length of PUSCH transmission in one slot, and is indicated by the number of OFDM symbols.

Next, the inter-slot frequency hopping method supported for repetitive PUSCH transmission types A and B is a method in which the UE changes the allocated resource of the frequency domain by a set frequency offset for each slot and transmits the same. A start RB during $n_s^\mu$ slots in the inter-slot frequency hopping may be expressed through Equation 6.

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{Equation 6}$$

In Equation 6, $n_s^\mu$ represents a current slot number in multi-slot PUSCH transmission, and $RB_{start}$ represents a start RB in the UL BWP and is calculated by a frequency resource allocation method. $RB_{offset}$ represents a frequency offset between two hops through a higher layer parameter.

Next, the inter-repetition frequency hopping method supported for repetitive PUSCH transmission type B is to shift the allocated resource in the frequency domain for one or more actual repetitions of each nominal repetition by a configured frequency offset and transmit the same. $RB_{start}(n)$, which is the index of a start RB in the frequency domain for one or more actual repetitions within the $n^{th}$ nominal repetition, may follow Equation 7 below.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad \text{Equation 7}$$

In Equation 7, "n" represents an index of nominal repetition, and $RB_{offset}$ represents an RB offset between two hops through a higher layer parameter.

UE Capability Report Related

In LTE and NR, the UE may perform a procedure of reporting capability supported by the UE to a serving base station while being connected to the same. This will be referred to as "UE capability report" in the following description.

The base station may transmit a UE capability enquiry message requesting capability reporting to the UE in a connected state. The message may include a request for UE capability for each RAT (radio access technology) type by the base station. The request for each RAT type may include information on a supported frequency band combination. In addition, the UE capability enquiry message may request UE capability for a plurality of RAT types through a single RRC message container transmitted by the base station, and the base station may include a plurality of UE capability enquiries in a message including the UE capability request for respective RAT types and transmit the same to the UE. That is, a UE capability enquiry may be repeated multiple times in a single message, and the UE may configure a UE capability information message corresponding thereto and report the same multiple times. In the next-generation mobile communication system, a request for UE capability may be performed for MR-DC (multi-RAT dual connectivity), as well as NR, LTE, and EN-DC (E-UTRA-NR dual connectivity). In addition, the UE capability enquiry message is generally transmitted in the initial stage after the UE is connected to the base station, but the base station is able to request the UE capability under any condition as necessary.

In the above step, the UE receiving the request for reporting UE capability from the base station configures UE capability according to the RAT type and the band information requested by the base station. A method of configuring the UE capability by the UE in an NR system will be summarized below.

1. If the UE receives a list of LTE and/or NR bands through a UE capability request from the base station, the UE configures a band combination (BC) for EN-DC and NR standalone (SA). That is, the UE configures a list of BC candidates for EN-DC and NR SA, based on the bands requested by the base station using "FreqBandList". In addition, the bands have priority in the order as described in "FreqBandList".
2. If the base station requests a UE capability report by configuring "eutra-nr-only" flag or "eutra" flag, the UE completely removes the NR SA BCs from the configured list of BC candidates. This operation may be performed only when an LTE base station (eNB) requests "eutra" capability.
3. Thereafter, the UE removes fallback BCs from the list of BC candidates configured in the above step. The fallback BC indicates a BC that may be obtained by removing a band corresponding to at least one SCell from a certain BC, and may be omitted because the BC before removing a band corresponding to at least one SCell is capable of covering the fallback BC. This step is also applied to MRDC, i.e. LTE bands. The remaining BCs after this step constitute a final "candidate BC list".
4. The UE selects the BCs to be reported, which conform to the requested RAT type, from the final "candidate BC list". In this step, the UE configures "supportedBandCombinationList" in a predetermined order. In other words, the UE configures the BCs and UE capability to be reported according to a preconfigured order of the RAT types (nr→eutra-nr→eutra). In addition, the UE configures "featureSetCombination" for the configured "supportedBandCombinationList" and configures a list of "candidate feature set combinations" from the candidate BC list from which the list of fallback BCs (including capabilities in the equal or lower level) is removed. The "candidate feature set combination" may include the feature set combinations for BCs both of NR and EUTRA-NR, and may be obtained from the feature set combinations of the "UE-NR-Capabilities" and "UE-MRDC-Capabilities" containers.
5. In addition, if the requested RAT type is "eutra-nr" and has influences, "featureSetCombinations" is included in both containers of "UE-MRDC-Capabilities" and "UE-NR-Capabilities". However, the feature set of NR is included only in "UE-NR-Capabilities".

After the UE capability is configured, the UE transmits a UE capability information message including the UE capability to the base station. Then, the base station performs appropriate scheduling and transmission/reception management for the UE, based on the UE capability received from the UE.

CA/DC Related

Figure 18:
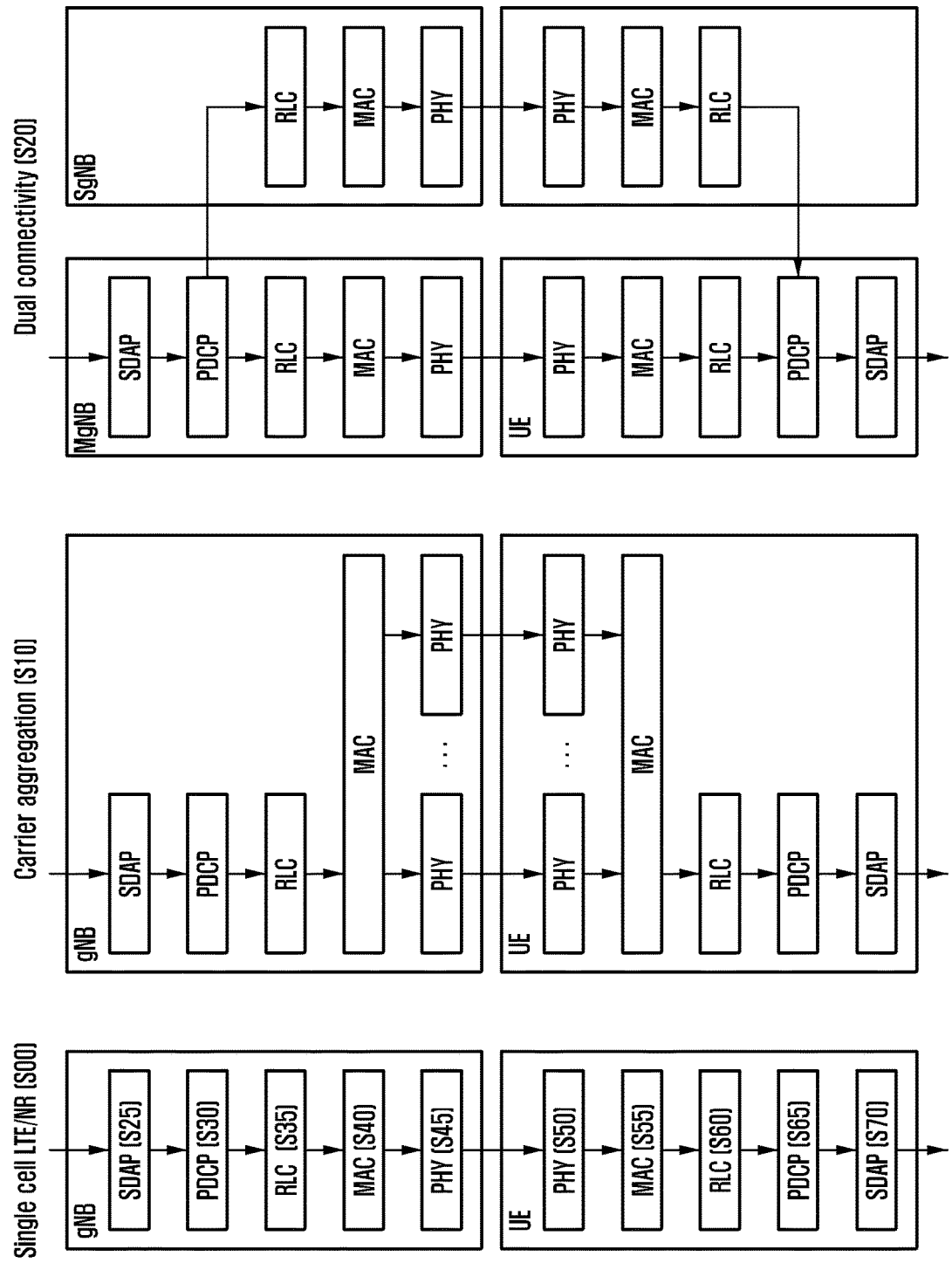
FIG. 18 is a diagram illustrating a radio protocol structure of a base station and a user equipment in a single cell, carrier aggregation, and dual connectivity situation in a wireless communication system according to an embodiment of the disclosure.

FIG. 18 is a diagram illustrating a radio protocol structure of a base station and a UE in a single cell, carrier aggregation, and dual connectivity situation according to an embodiment of the disclosure.

Referring to FIG. 18, the radio protocol of the next-generation mobile communication system is comprised of NR SDAP (service data adaption protocol) S25 or S70, NR PDCP (packet data convergence protocol) S30 or S65, NR RLC (radio link control) S35 or S60, and NR MAC (medium access control) S40 or S55 in a UE and an NR base station, respectively.

The primary functions of the NR SDAP S25 or S70 may include some of the following functions.

Transfer of user plane data
Mapping between QoS flow and DRB for both DL and UL
Marking QoS flow ID in both DL and UL packets
Mapping reflective QoS flow to DRB for UL SDAP PDUs With regard to the SDAP layer entity, the UE may receive a configuration indicating whether or not to use a header of the SDAP layer entity or whether or not to use functions of the SDAP layer entity for each PDCP layer entity, for each bearer, or for each logical channel through an RRC message. In the case where the SDAP header is configured, a one-bit NAS reflective QoS configuration indicator and a one-bit AS reflective QoS configuration indicator of the SDAP header may instruct the UE to update or reconfigure mapping information between the QoS flow and the data bearers in the uplink and downlink. The SDAP header may include QoS flow ID information indicating QoS. The QoS information may be used as data processing priority, scheduling information, or the like in order to support effective services.

The primary functions of the NR PDCP S30 or S65 may include some of the following functions.

Header compression and decompression (ROHC only)
Transfer of user data
In-sequence delivery of upper layer PDUs
Out-of-sequence delivery of upper layer PDUs
Sequence reordering (PDCP PDU reordering for reception)
Duplicate detection of lower layer SDUs
Retransmission of PDCP SDUs
Ciphering and deciphering
Timer-based SDU discard in uplink The reordering function of the NR PDCP layer entity denotes a function of reordering PDCP PDUs received from a lower layer, based on a PDCP sequence number (SN), which may include a function of transmitting data to a higher layer in the reordered order. Alternatively, the reordering function of the NR PDCP layer entity may include a function of directly transmitting data without consideration of an order, include a function of reordering the sequence and recording lost PDCP PDUs, include a function of sending a status report of the lost PDCP PDUs to a transmitting end, and include a function of making a request for retransmission of the lost PDCP PDUs.

The primary functions of the NR RLC S35 or S60 may include some of the following functions.

Data transfer function (transfer of upper layer PDUs)
In-sequence delivery of upper layer PDUs
Out-of-sequence delivery of upper layer PDUs
ARQ function (error correction through ARQ)
Concatenation, segmentation, and reassembly of RLC SDUs
Re-segmentation of RLC data PDUs
Reordering of RLC data PDUs
Duplicate detection
Protocol error detection
RLC SDU discard
RLC re-establishment The in-sequence delivery function of the NR RLC layer entity denotes a function of transferring RLC SDUs received from a lower layer to a higher layer in sequence. The in-sequence delivery function of the NR RLC layer entity may include a function of, if one original RLC SDU is divided into a plurality of RLC SDUs and received, reassembling and transmitting the same, include a function of reordering the received RLC PDUs, based on an RLC SN (sequence number) or a PDCP SN (sequence number), include a function of reordering the sequence and recording lost RLC PDUs, include a function of sending a status report of the lost RLC PDUs to a transmitting end, and include a function of making a request for retransmission of the lost RLC PDUs. The in-sequence delivery function of the NR RLC layer entity may include a function of, if there is a lost RLC SDU, transmitting only the RLC SDUs prior to the lost RLC SDU to a higher layer in sequence, or include a function of, if a predetermined timer expires even though there is a lost RLC SDU, transmitting all RLC SDUs received before the timer starts to a higher layer in sequence. Alternatively, the in-sequence delivery function of the NR RLC layer entity may include a function of, if a predetermined timer expires even though there is a lost RLC SDU, transmitting all RLC SDUs received until the present to a higher layer in sequence. In addition, the RLC PDUs may be processed in the order of reception (in the order of arrival regardless of a serial number or a sequence number thereof), and transmitted to the PDCP layer entity in an out-of-sequence delivery manner. In the case of segments, the segments, which are stored in the buffer or will be received later, may be received and reconfigured into one complete RLC PDU, and the RLC PDU may be processed and transmitted to the PDCP layer entity. The NR RLC layer may not include a concatenation function, which may be performed in the NR MAC layer or replaced with a multiplexing function of the NR MAC layer.

The out-of-sequence delivery of the NR RLC layer entity denotes a function of directly transmitting RLC SDUs received from a lower layer to a higher layer regardless of sequence, which may include a function of, if one original RLC SDU is divided into a plurality of RLC SDUs and is received, reassembling and transmitting the same, and include a function of storing and ordering RLC SNs or PDCP SNs of the received RLC PDUs, thereby recording the lost RLC PDUs.

The NR MAC S40 or S55 may be connected to a plurality of NR RLC layer entities configured in a single UE, and the primary functions of the NR MAC may include some of the following functions.

Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MBMS service identification
Transport format selection
Padding The NR PHY layer entity S45 or S50 may perform operations of channel-coding and modulating higher layer data into OFDM symbols and transmitting the same through a radio channel, or operations of demodulating and channel-decoding the OFDM symbols received through a radio channel and transmitting the same to a higher layer.

The detailed structures of the radio protocol may be changed in various ways depending on a carrier (or cell) operating scheme. For example, in the case where the base station transmits data to the UE, based on a single carrier (or cell), the base station and the UE use a single protocol structure for the respective layers as shown in S00. On the other hand, in the case where the base station transmits data to the UE, based on carrier aggregation (CA) using multiple carriers in a single TRP, the base station and the UE use a protocol structure in which a single structure is provided until the RLC layer and in which the PHY layer is multiplexed through the MAC layer as shown in S10. As another example, in the case where the base station transmits data to the UE, based on dual connectivity (DC) using multiple carriers in multiple TRPs, the base station and the UE use a protocol structure in which a single structure is provided until the RLC layer and in which the PHY layer is multiplexed through the MAC layer as shown in S20.

Referring to the above descriptions of PDCCH and beam configuration, repetitive PDCCH transmission is not currently supported in Rel-15 and Rel-16 NR, so it is difficult to attain the required reliability in scenarios requiring high reliability, such as URLLC. The disclosure provides a repetitive PDCCH transmission method through multiple transmission and reception points (TRPs) to improve PDCCH reception reliability of the UE. A method thereof will be described in detail in the following embodiments.

Hereinafter, embodiments of the disclosure will be described in detail with reference to the accompanying drawings. The disclosure is applicable to FDD and TDD systems. Hereinafter, higher signaling (or higher layer signaling) in the disclosure is a signal transmission method in which signals are transmitted from a base station to a UE using a downlink data channel of a physical layer or from a UE to a base station using an uplink data channel of a physical layer, and may be referred to as "RRC signaling", "PDCP signaling", or "MAC (medium access control) control element (MAC CE)".

Hereinafter, in the disclosure, the UE may determine whether or not to apply cooperative communication using various methods such as the case where the PDCCH(s) for allocating a PDSCH to which cooperative communication is applied has a specific format, the case where the PDCCH(s)

for allocating a PDSCH to which the cooperative communication is applied includes a specific indicator indicating whether or not cooperative communication is applied, the case where the PDCCH(s) for allocating a PDSCH to which cooperative communication is applied is scrambled by a specific RNTI, the case where cooperative communication is assumed to be applied in a specific section indicated by a higher layer, or the like. Hereinafter, the case where the UE receives a PDSCH to which cooperative communication is applied based on conditions similar to the above will be referred to as an "NC-JT case" for convenience of description.

Hereinafter, in the disclosure, determining the priority between A and B may be variously construed such as selecting one having a higher priority according to a predetermined priority rule and performing an operation corresponding thereto or omitting or dropping an operation on one having a lower priority.

Although the examples will be described through a plurality of embodiments in the disclosure, these are not independent and one or more embodiments may be applied simultaneously or in combination.

NC-JT Related

According to an embodiment of the disclosure, non-coherent joint transmission (NC-JT) may be used for the UE to receive PDSCHs from multiple TRPs.

Unlike the existing communication systems, a 5G wireless communication system may support both a service having a very short transmission delay and a service requiring a high connection density, as well as a service requiring a high transmission rate. In a wireless communication network including a plurality of cells, transmission and reception points (TRPs), or beams, cooperative communication (coordinated transmission) between cells, TRPs, and/or beams may satisfy various service requirements by increasing the strength of a signal received by the UE or efficiently controlling interference between cells, TRPs, and/or beams.

Joint transmission (JT) is a representative transmission technology for the above-mentioned cooperative communication, which may increase the strength or throughput of a signal received by the UE by transmitting signals to one UE through a number of different cells, TRPs. and/or beams. The characteristics of the channel between the cells, TRPs, or beams and the UE may be significantly different, and in particular, non-coherent joint transmission (NC-JT) supporting non-coherent precoding between the cells, TRPs, and/or beams may require individual precoding, MCS, resource allocation, TCI indication, etc. depending on the channel characteristics for each link between the cells, TRPs, and/or beams.

The above-described NC-JT transmission may be applied to at least one of a downlink data channel (PDSCH: physical downlink shared channel), a downlink control channel (PDCCH: physical downlink control channel), an uplink data channel (PUSCH: physical uplink shared channel), and an uplink control channel (PUCCH: physical uplink control channel). Transmission information such as precoding, MCS, resource allocation, TCI, and the like is indicated by DL DCI when transmitting a PDSCH, and the transmission information must be independently indicated for each cell, TRP, and/or beam for NC-JT transmission. This is a major factor that increases a payload required for DL DCI transmission, which may adversely affect reception performance of a PDCCH transmitting DCI. Therefore, it is necessary to carefully design a tradeoff between the amount of DCI information and the control information reception performance to support the PDSCH JT.

Figure 19:
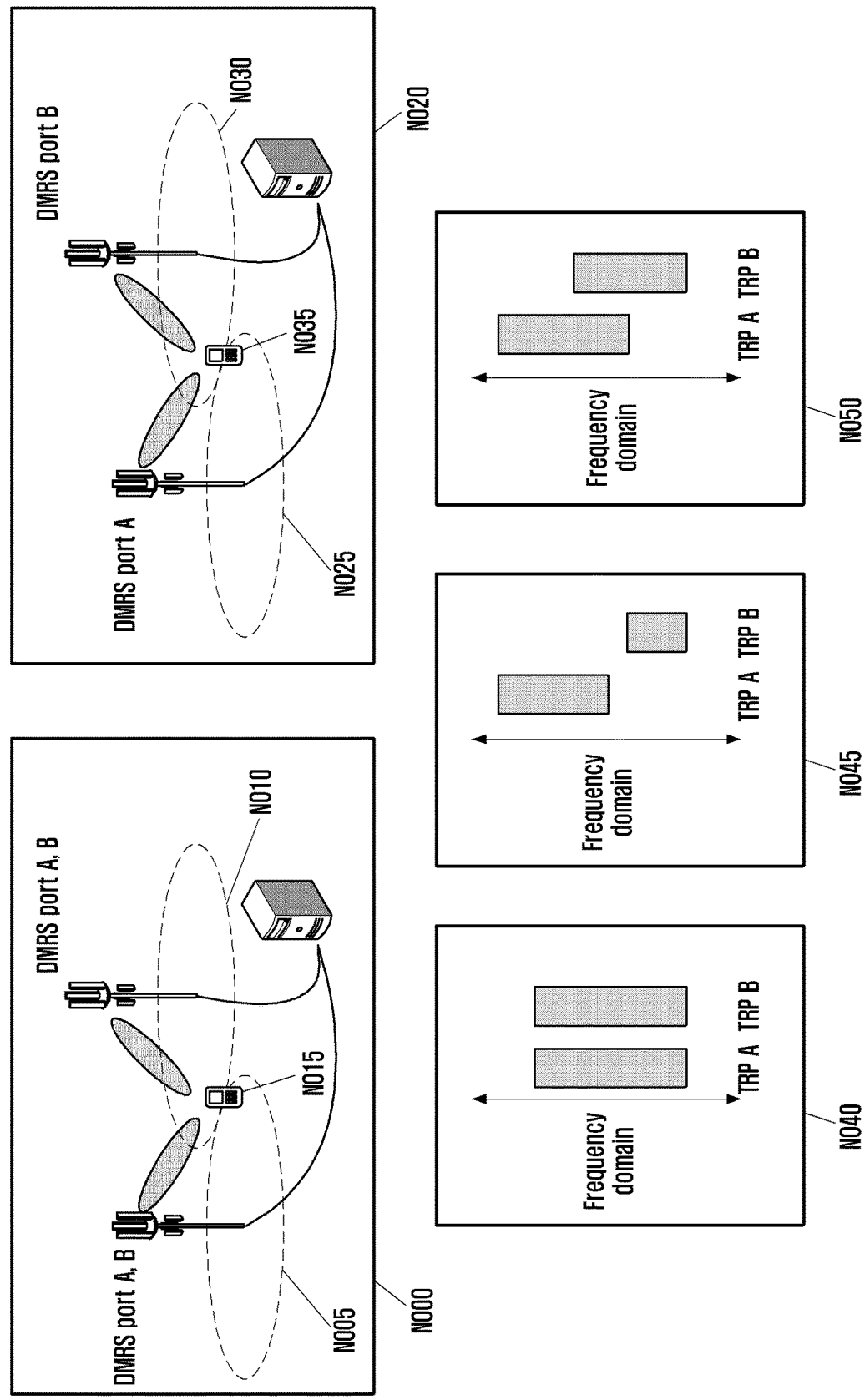
FIG. 19 is a diagram illustrating an example of antenna port configuration and resource allocation for cooperative communication in a wireless communication system according to an embodiment of the disclosure.

FIG. 19 is a diagram illustrating an example of antenna port configuration and resource allocation for transmitting a PDSCH using cooperative communication in a wireless communication system according to an embodiment of the disclosure.

Referring to FIG. 19, examples of PDSCH transmission are described according to techniques of joint transmission (JT), and examples of allocating radio resources for each TRP are shown.

Referring to FIG. 19, an example N000 of coherent joint transmission (C-JT) supporting coherent precoding between cells, TRPs and/or beams is shown.

In the case of C-JT, TRP A N005 and TRP B N010 may transmit a single piece of data (PDSCH) to a UE N015, and multiple TRPs may perform joint precoding. This may indicate that a DMRS are transmitted through the same DMRS ports so that TRP A N005 and TRP B N010 transmit the same PDSCH. For example, TRP A N005 and TRP B N010 may transmit the DRMS to the UE through DMRS port A and DMRS port B. In this case, the UE may receive one piece of DCI information for receiving one PDSCH demodulated based on the DMRS transmitted through DMRS port A and DMRS port B.

FIG. 19 shows an example N020 of non-coherent joint transmission (NC-JT) supporting non-coherent precoding between cells, TRPs, and/or beams for PDSCH transmission.

In the case of NC-JT, each cell, TRP, and/or beam (N025, N030) may transmit a PDSCH to the UE N035, and individual precoding may be applied to each PDSCH. The respective cells, TRPs, and/or beams may transmit different PDSCHs or different PDSCH layers to the UE, thereby improving throughput, compared to single-cell, TRP, and/or beam transmission. In addition, it is possible to improve reliability, compared to single-cell, TRP, and/or beam transmission, by repeatedly transmitting the same PDSCH to the UE by the respective cells, TRPs, and/or beams. For convenience of description, the cell, the TRP, and/or the beam is hereinafter collectively referred to as a "TRP".

Various radio resource allocation cases may be considered, such as the case where the frequency and time resources used by a plurality of TRPs for PDSCH transmission are all the same (N040), the case where the frequency and time resources used by a plurality of TRPs do not overlap at all (N045), and the case where the frequency and time resources used by the plurality of TRPs partially overlap (N050).

For support of NC-JT, in order to allocate a plurality of PDSCHs to one UE at the same time, DCI of various types, structures, and relationships may be considered.

Figure 20:
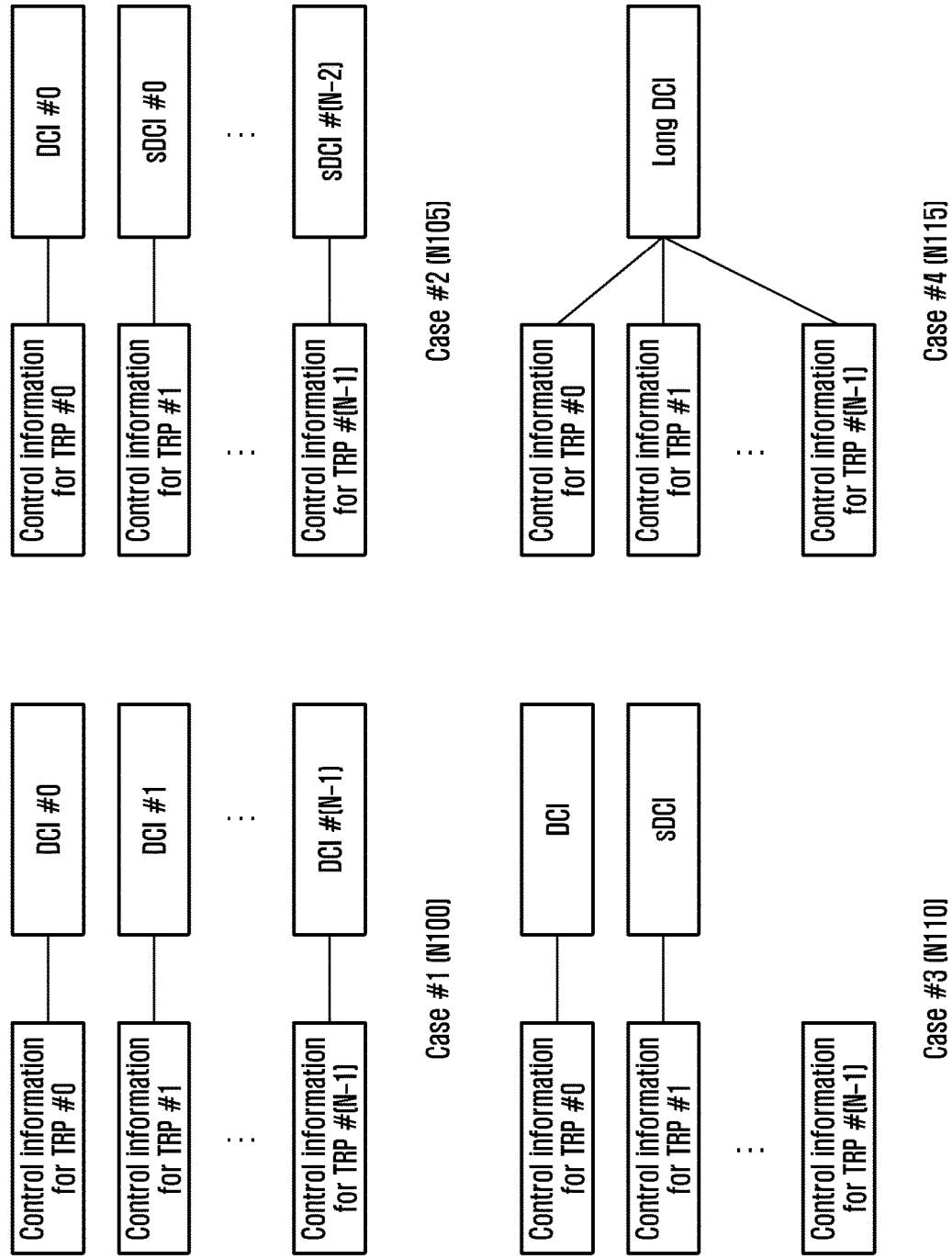
FIG. 20 is a diagram illustrating an example of a configuration of downlink control information (DCI) for cooperative communication in a wireless communication system according to an embodiment of the disclosure.

FIG. 20 is a diagram illustrating an example of a configuration of downlink control information (DCI) for NC-JT in which respective TRPs transmit different PDSCHs or different PDSCH layers to a UE in a wireless communication system according to an embodiment of the disclosure.

Referring to FIG. 20, Case #1 N100 is an example in which (N−1) different PDSCHs are transmitted from (N−1) additional TRPs {TRP #1 to TRP #(N−1)} in addition to a serving TRP (TRP #0) used in single PDSCH transmission and in which control information on the PDSCHs transmitted from the (N−1) additional TRPs is transmitted independently of control information on the PDSCH transmitted from the serving TRP. That is, the UE may obtain control information on the PDSCHs transmitted from different TRPs {TRP #0 to TRP #(N−1)} through independent DCI {DCI #0 to DC1 #(N−1)}. The formats of the independent DCI may be the same or different from each other, and the payloads of the DCI may also be the same or different from each other. In Case #1 described above, although control or allocation freedom of respective PDSCHs may be completely guaranteed, transmission of DCI from different TRPs may cause a difference in coverage between DCI, thereby degrading the reception performance.

Case #2 N105 shows an example in which (N−1) different PDSCHs are transmitted from (N−1) additional TRPs {TRP #1 to TRP #(N−1)} in addition to a serving TRP (TRP #0) used in single PDSCH transmission, in which control information (DCI) on the PDSCHs of the (N−1) additional TRPs is transmitted, respectively, and in which the DCI thereof is dependent on control information on the PDSCH transmitted from the serving TRP.

For example, although DCI #0, which is control information on the PDSCH transmitted from the serving TRP (TRP #0), may include all information elements of DCI format 1_0, DCI format 1_1, and DCI format 1_2, shortened DCI (hereinafter, "sDCI") {sDCI #0 to sDCI #(N−2)}, which is control information on the PDSCHs transmitted from the cooperative TRPs {TRP #1 to TRP #(N−1)}, may include some of the information elements of DCI format 1_0, DCI format 1_1, and DCI format 1_2. Accordingly, sDCI transmitting control information on the PDSCHs transmitted from the cooperative TRPs has a smaller payload than normal DCI (nDCI) transmitting control information related to the PDSCH transmitted from the serving TRP, so sDCI may include reserved bits, compared to nDCI.

In Case #2 described above, although control or allocation freedom of respective PDSCHs may be restricted depending on the content of information elements included in sDCI, the reception performance of sDCI is superior to that of nDCI, thereby reducing the probability of occurrence of a coverage difference between respective DCI.

Case #3 N110 shows an example in which (N−1) different PDSCHs are transmitted from (N−1) additional TRPs {TRP #1 to TRP #(N−1)} in addition to a serving TRP (TRP #0) used in single PDSCH transmission, in which a single piece of control information on the PDSCHs of the (N−1) additional TRPs is transmitted, respectively, and in which the DCI thereof is dependent on control information on the PDSCH transmitted from the serving TRP.

For example, DCI #0, which is control information on the PDSCH transmitted from the serving TRP (TRP #0), may include all information elements of DCI format 1_0, DCI format 1_1, and DCI format 1_2, and in the case of control information on the PDSCHs transmitted from the cooperative TRPs {TRP #1 to TRP #(N−1)}, some of the information elements of DCI format 1_0, DCI format 1_1, and DCI format 1_2 may be collected in one piece of "secondary" DCI (sDCI) and transmitted. For example, sDCI may include at least one piece of information among HARQ-related information, such as frequency domain resource assignment, time domain resource assignment, and MCS of the cooperative TRPs. In addition, information, which is not included in sDCI, such as a bandwidth part (BWP) indicator, a carrier indicator, or the like, may follow DCI (DCI #0, normal DCI, nDCI) of the serving TRP.

In Case #3 N110, although control or allocation freedom of respective PDSCHs may be restricted depending on the content of information elements included in sDCI, it is possible to control the reception performance of sDCI, and the DCI blind decoding complexity of the UE may be reduced, compared to Case #1 N100 or Case #2 N105.

Case #4 N115 shows an example in which (N−1) different PDSCHs are transmitted from (N−1) additional TRPs {TRP #1 to TRP #(N−1)} in addition to a serving TRP (TRP #0) used in single PDSCH transmission and in which control information on the PDSCHs transmitted from the (N−1) additional TRPs are transmitted in the same DCI (long DCI) as control information on the PDSCH transmitted from the serving TRP. That is, the UE may obtain control information on the PDSCHs transmitted from different TRPs {TRP #0 to TRP #(N−1)} through a single piece of DCI. In the case of Case #4 N115, although the DCI blind decoding complexity of the UE may not increase, control or allocation freedom of PDSCHs may be lowered such that the number of cooperative TRPs may be restricted according to restriction of a long DCI payload and the like.

In the following description and embodiments, sDCI may refer to various auxiliary DCIs, such as shortened DCI, secondary DCI, or normal DCI (DCI formats 1_0 to 1_1 described above) including PDSCH control information transmitted from the cooperative TRPs, and a description thereof may be applied to various auxiliary DCIs in a similar manner if specific restrictions are not specified.

In the following description and embodiments, Case #1 N100, Case #2 N105, and Case #3 N110 described above in which one or more pieces of DCI (PDCCHs) are used to support NC-JT will be differentiated as multiple PDCCH-based NC-JT, and Case #4 N115 described above in which a single piece of DCI (PDCCH) is used to support NC-JT will be differentiated as single-PDCCH-based NC-JT. In the multiple PDCCH-based PDSCH transmission, the CORESET in which DCI of the serving TRP (TRP #0) is scheduled may be differentiated from the CORESET in which DCI of the cooperative TRPs {TRP #1 to TRP #(N−1)} is scheduled. As a method of differentiating the CORESETs, a method of differentiating the CORESETs through a higher layer indicator for each CORESET, a method of differentiating the CORESETs through beam configuration for each CORESET, and the like may be provided. In addition, in the single-PDCCH-based NC-JT, a single piece of DCI may schedule a single PDSCH having a plurality of layers, instead of scheduling a plurality of PDSCHs1), and the plurality of layers described above may be transmitted from a plurality of TRPs. A connection relationship between a layer and a TRP transmitting the layer may be indicated through a transmission configuration indicator (TCI) for a layer.

"Cooperative TRP" in the embodiments of the disclosure may be replaced with various terms such as "cooperative panel" or "cooperative beam" when applied in practice.

In the embodiments of the disclosure, although "the case to which NC-JT is applied" may be variously construed depending on the situation, such as "the case where the UE simultaneously receives one or more PDSCHs in one BWP", "the case where the UE simultaneously receives PDSCHs, based on two or more TCIs (transmission configuration indicators) in one BWP", "the case where the PDSCH received by the UE is associated with one or more DMRS port groups", and the like, one expression is used for convenience.

In the disclosure, the wireless protocol structure for NC-JT may be used in various ways according to the TRP deployment scenario. For example, if there is no or small backhaul delay between the cooperative TRPs, a method using the structure based on MAC layer multiplexing (a CA-like method), similarly to S10 in FIG. 18, is possible. On the other hand, if the backhaul delay between the cooperative TRPs is too large to ignore (e.g., the case where information exchange of CSI, scheduling, HARQ-ACK, etc. between the cooperative TRPs requires a time of 2 ms or more), a method of securing a characteristic resistant to delay using an independent structure for each TRP from the RLC layer (a DC-like method), similarly to S20 in FIG. 18, is possible.

The UE supporting C-JT/NC-JT may receive C-JT/NC-JT-related parameters or setting values and the like from the higher layer configuration and set RRC parameters of the UE, based on the same. The UE may utilize UE capability parameters, for example, "tci-StatePDSCH", for the higher layer configuration. The UE capability parameter, for example, "tci-StatePDSCH", may define the TCI states for the purpose of PDSCH transmission, and the number of TCI states may be configured as 4, 8, 16, 32, 64, and 128 in FR1 and as 64 and 128 in FR2, and up to 8 states that may be indicated by 3 bits of TCI field in DCI through a MAC CE message may be configured, among the configured numbers. The maximum value "128" indicates the value indicated by "maxNumberConfiguredTCIstatesPerCC" in the parameters "tci-StatePDSCH" included in the UE capability signaling. As described above, a series of configuration procedures from the higher layer configuration to the MAC CE configuration may be applied to beamforming indication or beamforming switching command for at least one PDSCH in one TRP.

Multi-DCI-Based Multi-TRP

As an embodiment of the disclosure, a multi-DCI-based multi-TRP transmission method will be described. In the multi-DCI-based multi-TRP transmission method, a downlink control channel for NC-JT transmission may be configured based on multiple PDCCHs. NC-JT based on multiple PDCCHs may have CORESETs or search spaces divided for each TRP when transmitting DCI for scheduling PDSCHs of the respective TRPs. The CORESET or search space for each TRP may be configured as at least one of the following cases.

Higher layer index configuration for each CORESET: CORESET configuration information configured by a higher layer may include an index value, and the TRP transmitting a PDCCH in the corresponding CORESET may be differentiated by the index value configured for each CORESET. That is, a set of CORESETs having the same higher layer index value may be considered that the same TRP transmits a PDCCH or that a PDCCH scheduling the PDSCH of the same TRP is transmitted. The index value for each CORESET described above may be named as "CORESETPoolIndex", and a PDCCH may be regarded as being transmitted from the same TRP for CORESETs in which the same value of "CORESETPoolIndex" is configured. In the case of CORESET in which the value "CORESETPoolIndex" is not configured, it may be considered that a default value of "CORESETPoolIndex" is configured, and the default value may be "0".

In the disclosure, if the number of types of "CORESETPoolIndex" provided in each of the plurality of CORESETs included in the higher layer signaling "PDCCH-Config" exceeds one, that is, if the respective CORESETs have different "CORESETPoolIndex" values, the UE may consider that the base station may use a multi-DCI-based multi-TRP transmission method.

Alternatively, in the disclosure, if the number of types of "CORESETPoolIndex" provided in each of the plurality of CORESETs included in the higher layer signaling "PDCCH-Config" is one, that is, if all the CORESETs have the same "CORESETPoolIndex" of 0 or 1, the UE may consider that the base station performs transmission using a single TRP, instead of using the multi-DCI-based multi-TRP transmission method.

Multi-PDCCH-Config configuration: a plurality of PDCCH-Configs may be configured in one BWP, and each PDCCH-Config may include PDCCH configuration for each TRP. That is, a list of CORESETs for each TRP and/or a list of search spaces for each TRP may be configured in one PDCCH-Config, and one or more CORESETs and one or more search spaces included in one PDCCH-Config may be regarded as corresponding to a specific TRP.

CORESET beam/beam group configuration: A TRP corresponding to the corresponding CORESET may be differentiated through a beam or a beam group configured for each CORESET. For example, if the same TCI state is configured in a plurality of CORESETs, the CORESETs may be regarded as being transmitted through the same TRP, or the PDCCH scheduling a PDSCH of the same TRP may be regarded as being transmitted from the corresponding CORESET.

Search space beam/beam group configuration: A beam or beam group may configured for each search space, and TRPs may be differentiated for the respective search spaces through the same. For example, if the same beam/beam group or TCI state is configured in a plurality of search spaces, it may be considered that the same TRP transmits a PDCCH in the corresponding search space or that the PDCCH scheduling a PDSCH of the same TRP is transmitted in the corresponding search space.

By differentiating CORESETs or search spaces for respective TRPs as described above, PDSCHs and HARQ-ACK information may be classified for each TRP, and thus it is possible to independently produce HARQ-ACK codebooks and to independently use PUCCH resources for each TRP.

The above configuration may be independent for each cell or each BWP. For example, while two different "CORESETPoolIndex" values may be configured in the PCell, the "CORESETPoolIndex" value may not be configured in a specific SCell. In this case, it may be considered that NC-JT transmission is configured in the PCell, whereas NC-JT transmission is not configured in the SCell in which the "CORESETPoolIndex" value is not configured.

A PDSCH TCI state activation/deactivation MAC-CE applicable to the multi-DCI-based multi-TRP transmission method may follow FIG. 16. If "CORESETPoolIndex" is not configured in each of all CORESETs in the higher layer signaling "PDCCH-Config" for the UE, the UE may ignore the CORESET Pool ID field 16-55 in the corresponding MAC-CE 16-50. If the UE is able to support the multi-DCI-based multi-TRP transmission method, that is, if the UE has different "CORESETPoolIndex" values for the respective CORESETs in the higher layer signaling "PDCCH-Config", the UE may activate the TCI state in DCI included in the PDCCHs transmitted from the CORESETs having the same "CORESETPoolIndex" value as the CORESET Pool ID field 16-55 value in the corresponding MAC-CE 16-50. For example, if the value of the CORESET Pool ID field 16-55 in the corresponding MAC-CE 16-50 is "0", the TCI state in DCI included in the PDCCHs transmitted from the CORESETs having a "CORESETPoolIndex" value of "0" may follow activation information of the corresponding MAC-CE.

If the UE is configured to use the multi-DCI-based multi-TRP transmission method from the base station, that is, if the number of types of CORESETPoolIndex of each of the plurality of CORESETs included in the higher layer signaling "PDCCH-Config" exceeds one, or if the respective CORESETs have different "CORESETPoolIndex" values, the UE may recognize the following restrictions for PDSCHs scheduled from the PDCCHs in the respective CORESETs having two different "CORESETPoolIndex" values.

1) If PDSCHs indicated by the PDCCHs in the respective CORESETs having two different "CORESETPoolIndex" values entirely or partially overlap, the UE may apply the TCI states indicated by the respective PDCCHs to different CDM groups. That is, two or more TCI states may not be applied to one CDM group.

2) If PDSCHs indicated by the PDCCHs in the respective CORESETs having two different "CORESETPoolIndex" values entirely or partially overlap, the UE may expect that the actual number of front loaded DMRS symbols, the actual number of additional DMRS symbols, the actual positions of the DMRS symbols, the DMRS types of the PDSCHs will not be different from each other.

3) The UE may expect that the bandwidth parts indicated from the PDCCHs in the respective CORESETs having two different "CORESETPoolIndex" values will be the same and that the subcarrier spacings thereof will also be the same.

4) The UE may expect that the respective PDCCHs will completely include information on the PDSCHs scheduled from the PDCCHs in the respective CORESETs having two different "CORESETPoolIndex" values.

Single-DCI-Based Multi-TRP

As an embodiment of the disclosure, a single-DCI-based multi-TRP transmission method will be described. The single-DCI-based multi-TRP transmission method may configure a downlink control channel for NC-JT transmission, based on a single PDCCH.

In the single-DCI-based multi-TRP transmission method, PDSCHs transmitted by a plurality of TRPs may be scheduled with one piece of DCI. The number of TCI states may be used as a method of indicating the number of TRPs transmitting the corresponding PDSCH. That is, if the number of TCI states indicated in DCI scheduling the PDSCH is two, it may be regarded as single-PDCCH-based NC-JT transmission, and if the number of TCI states is one, it may be regarded as single-TRP transmission. The TCI states indicated in DCI may correspond to one or two TCI states among the TCI states activated by a MAC-CE. In the case where the TCI states of DCI correspond to two TCI states activated by a MAC-CE, a correspondence relationship between the TCI codepoint indicated in the DCI and the TCI states activated by the MAC-CE may be established, which may be the case there may be two TCI states activated by the MAC-CE, which correspond to the TCI codepoint.

As another example, if at least one codepoint among all the codepoints of a TCI state field in DCI indicates two TCI states, the UE may consider that the base station may perform transmission based on the single-DCI-based multi-TRP method. In this case, at least one codepoint indicating two TCI states in the TCI state field may be activated through an enhanced PDSCH TCI state activation/deactivation MAC-CE.

FIG. 21 is a diagram illustrating an enhanced PDSCH TCI state activation/deactivation MAC-CE structure according to an embodiment of the disclosure.

Definitions of respective fields in the MAC CE and available values for the respective fields are as follows.

- Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;
- BWP ID: This field indicates a DL BWP for which the MAC CE applies as the codepoint of the DCI bandwidth part indicator field as specified in TS 38.212 [9]. The length of the BWP ID field is 2 bits;
- $C_i$: This field indicates whether the octet containing TCI state $ID_{i,2}$ is present. If this field is set to "1", the octet containing TCI state $ID_{i,2}$ is present. If this field is set to "0", the octet containing TCI state $ID_{i,2}$ is not present;
- TCI state $ID_{i,j}$: This field indicates the TCI state identified by TCI-StateId as specified in TS 38.331 [5], where i is the index of the codepoint of the DCI Transmission configuration indication field as specified in TS 38.212 [9] and TCI state $ID_{i,j}$ denotes the j-th TCI state indicated for the i-th codepoint in the DCI Transmission Configuration Indication field. The TCI codepoint to which the TCI States are mapped is determined by its ordinal position among all the TCI codepoints with sets of TCI state $ID_{i,j}$ fields, i.e. the first TCI codepoint with TCI state $ID_{0,1}$ and TCI state $ID_{0,2}$ shall be mapped to the codepoint value 0, the second TCI codepoint with TCI state $ID_{1,1}$ and TCI state $ID_{1,2}$ shall be mapped to the codepoint value 1 and so on. The TCI state $ID_{i,2}$ is optional based on the indication of the Ci field. The maximum number of activated TCI codepoint is 8 and the maximum number of TCI states mapped to a TCI codepoint is 2.
- R: Reserved bit, set to "0".

Referring to FIG. 21, if the value of a field $C_0$ 21-05 is "1", a corresponding MAC-CE may include a field "TCI state $ID_{0,2}$" 21-15 in addition to a field "TCI state $ID_{0,1}$" 21-10. This may indicate that "TCI state $ID_{0,1}$" and "TCI state $ID_{0,2}$" are activated for the $0^{th}$ codepoint of the TCI state field included in DCI, and if the base station indicates the corresponding codepoint to the UE, the UE may receive an indication of two TCI states. If the value of a field $C_0$ 21-05 is "0", the corresponding MAC-CE may not include the field "TCI state $ID_{0,2}$" 21-15, which indicates that one TCI state corresponding to "TCI state $ID_{0,1}$" is activated for the 0th codepoint of the TCI state field included in DCI.

The configuration may be independent for each cell or each BWP. For example, there may be a maximum of two activated TCI states corresponding to one TCI codepoint in the PCell, whereas there may be a maximum of one activated TCI states corresponding to one TCI codepoint in a specific SCell. In this case, it may be considered that NC-JT transmission is configured in the PCell, whereas NC-JT transmission is not configured in the SCell described above.

Referring to the descriptions related to the PDCCH transmission/reception configuration and the transmission beam configuration above, since repetitive PDCCH transmission is not currently supported in Rel-15/16 NR, there may be difficulty in attaining the required reliability in a scenario requiring high reliability, such as URLLC. Meanwhile, the standardization of a method of improving the reception reliability of a PDCCH through the repetitive transmission of PDCCHs is in progress in Rel-17 FeMIMO. As a repetitive transmission method of a PDCCH, there may be a non-SFN method of repeatedly transmitting control resource sets connected to respective search spaces explicitly connected by higher layer signaling by separating the time or frequency resources through different TRPs, and a method of repeatedly transmitting the same in an SFN method by configuring a plurality of TCI states in one control resource set.

In the non-SFN method of the above methods, different control resource sets may be connected to a plurality of search spaces explicitly connected by higher layer signaling, or the same control resource set may be connected to all the search spaces. The method in which different control resource sets are connected may be regarded as a multi-TRP-based repetitive PDCCH transmission method in which the respective control resource sets are transmitted from different TRPs. In addition, the method in which the same control resource set is connected to all the search spaces may be regarded as a single-TRP-based repetitive PDCCH transmission method in which the control resource sets are transmitted from the same TRP. Meanwhile, even in the case where different control resource sets are connected to a plurality of search spaces explicitly connected by higher layer signaling and where the respective control resource sets have different "CORESETPoolIndex" values, repetitive PDCCH transmission may be performed based on a plurality of corresponding control resource sets.

However, since all PDCCHs repeated during the repetitive PDCCH transmission must have the same bits, there may be a problem in which time and frequency resource allocation information, the antenna port fields, the TCI state fields, etc. indicated through all PDCCHs are the same because the values of all fields in the DCI transmitted from all the repeated PDCCHs are the same. The method of using a plurality of control resource sets having different "CORESETPoolIndex" values used in the multi-DCI-based multi-TRP transmission method has some restrictions on time and frequency resource allocation information, the antenna port field, and the TCI state field in the DCI while respective PDCCHs are able to schedule independent PDSCHs for an increase in the transmission capacity of PDSCHs based on the multi-TRP. For example, the time and frequency resource allocation information may entirely overlap, may partially overlap, or may not overlap in the time/frequency resources depending on the reported UE capability. As another example, the TCI state field may apply a PDSCH TCI state activation/deactivation MAC-CE to the respective control resource set having differently configured "CORESETPoolIndex" values as described above, and the TCI state indicated by each PDCCH may be applied to the PDSCH scheduled by the corresponding PDCCH. As another example, the antenna port field may indicate DMRS ports in which the respective PDCCHs belong to different CDM groups, and the TCI state indicated through the TCI state field may be applied to each CDM group to which the DMRS port indicated by each PDCCH belongs. That is, two or more TCI states are unable to be applied to one CDM group. The disclosure will describe, in detail, how to interpret respective DCI fields, and the conditions for switching between whether or not to schedule a single PDSCH transmitted from a single TRP according to values of the DCI fields and whether or not schedule PDSCHs transmitted from a plurality of TRPs based on NC-JT for the case in which the control resource sets having different "CORESETPoolIndex" values are connected to the search spaces explicitly connected based on higher layer signaling, respectively, in repetitive PDCCH transmission.

In the following description of the disclosure, cells, transmission points, panels, beams, and/or transmission directions, which are differentiated through a higher layer/L1 parameter such as the TCI state, spatial relation information, or the like, or an indicator such as a cell ID, a TRP ID, a panel ID, or the like will be collectively referred to as "a transmission reception point (TRP)" for convenience. Accordingly, TRP may be appropriately replaced with one of the above terms in actual application.

Hereinafter, the UE may determine whether or not to apply cooperative communication using various methods such as the case where the PDCCH(s) for allocating a PDSCH to which cooperative communication is applied has a specific format, the case where the PDCCH(s) for allocating a PDSCH to which the cooperative communication is applied includes a specific indicator indicating whether or not cooperative communication is applied, the case where the PDCCH(s) for allocating a PDSCH to which cooperative communication is applied is scrambled by a specific RNTI, the case where cooperative communication is assumed to be applied in a specific section indicated by a higher layer, or the like. Hereinafter, the case where the UE receives a PDSCH to which cooperative communication is applied based on conditions similar to the above will be referred to as an "NC-if case" for convenience of description.

Hereinafter, embodiments of the disclosure will be described in detail with reference to the accompanying drawings. Hereinafter, the base station, as an entity performing resource allocation of a terminal, may be at least one of gNode B, gNB, eNode B, Node B, a base station (BS), a radio access unit, a base station controller, or a node on the network. The terminal may include a user equipment (UE), a mobile station (MS), a cellular phone, a smartphone, a computer, or a multimedia system capable of executing a communication function. Although an embodiment of the disclosure will be described based on a 5G system by way of example, the embodiment of the disclosure may also be applied to other communication systems having a similar technical background or channel type. For example, LTE or LTE-A mobile communication and mobile communication technology developed subsequent to 5G may be included therein. Accordingly, the embodiment of the disclosure may be applied to other communication systems through some modifications without significantly departing from the scope of the disclosure as judged by those of ordinary skill in the art. A description of the disclosure may be applied to FDD and TDD systems.

In addition, in describing the disclosure, if it is determined that a detailed description of a related function or configuration may unnecessarily obscure the subject matter of the disclosure, the detailed description thereof will be omitted. In addition, the terms to be described later are defined in consideration of the functions in the disclosure, which may vary depending on intentions or customs of users and operators. Accordingly, the definitions thereof must be made based on the content throughout this specification.

Hereinafter, in describing the disclosure, higher layer signaling may be at least one of the following signaling methods or a combination thereof.
- Master information block (MIB)
- System information block (SIB) or SIB X (X=1, 2, . . . )
- Radio resource control (RRC)
- Medium access control (MAC) control element (CE)

In addition, L1 signaling may be at least one of the signaling methods using the following physical layer channels or signaling, or a combination thereof.
- Physical downlink control channel (PDCCH)
- Downlink control information (DCI)
- UE-specific DCI
- Group common DCI
- Common DCI
- Scheduling DCI (e.g., DCI used for the purpose of scheduling downlink or uplink data)
- Non-scheduling DCI (e.g., DCI not for the purpose of scheduling downlink or uplink data)
- Physical uplink control channel (PUCCH)
- Uplink control information (UCI)

Hereinafter, in the disclosure, determining the priority between A and B may be variously construed such as selecting one having a higher priority according to a predetermined priority rule and performing an operation corresponding thereto or omitting or dropping an operation on one having a lower priority.

Although the examples will be described through a plurality of embodiments in the disclosure, these are not independent and one or more embodiments may be applied simultaneously or in combination.

First Embodiment: Multi-TRP-Based Repetitive PDCCH Transmission Method

As an embodiment of the disclosure, a repetitive PDCCH transmission method in consideration of multiple TRPs will be described. There may be various repetitive PDCCH transmission methods in consideration of multiple TRPs depending on how to apply respective TCI states, which are to be applied when transmitting PDCCHs in respective TRPs, to the above-described various parameters used in PDCCH transmission. For example, various parameters used in PDCCH transmission to which different TCI states are applied may include CCE, PDCCH candidate groups, control resource sets, search spaces, and the like. During repetitive PDCCH transmission in consideration of multiple TRPs, soft combining, selection, and the like may be considered as a reception method of the UE.

There may be five methods of repetitive PDCCH transmission through multiple TRPs as follows, and the base station may configure, for the UE, at least one of the five methods through higher layer signaling, indicate the same through L1 signaling, or configure or indicate the same through a combination of the higher layer signaling and L1 signaling.

[Method 1-1] Repetitive Transmission Method of a Plurality of PDCCHs Having the Same Payload Method 1-1 is a method of repeatedly transmitting a plurality of pieces of control information having the same DCI format and payload. Each piece of the above-described control information may indicate information for scheduling repetitively transmitted PDSCHs, for example, {PDSCH #1, PDSCH #2, . . . , PDSCH #Y} repetitively transmitted over a plurality of slots. The fact that the payloads of respective control information repetitively transmitted are the same may be expressed that PDSCH scheduling information of the respective control information, for example, the number of PDSCH repetitive transmissions, time domain PDSCH resource allocation information, that is, the slot offset (K_0) between control information and PDSCH #1 and the number of PDSCH symbols and the like, frequency domain PDSCH resource allocation information, DMRS port allocation information, PDSCH-to-HARQ-ACK timing, PUCCH resource indicators, and the like, is the same. The UE may improve the reception reliability of control information by soft combining repetitive transmission control information having the same payload.

For the soft combining described above, the UE needs to know in advance the location of the resources of control information to be repetitively transmitted, the number of repetitive transmissions, and the like. To this end, the base station may indicate in advance the resource configuration of the time domain, frequency domain, and spatial domain of the repetitive transmission control information described above. If control information is repetitively transmitted in the time domain, the control information may be repetitively transmitted over different CORESETs, may be repetitively transmitted over different search space sets in one CORESET, or may be repetitively transmitted over different PDCCH monitoring occasions in one CORESET or one search space set. The unit (CORESET unit, search space set unit, or PDCCH monitoring occasion unit) of the resource repetitively transmitted in the time domain, and the location (PDCCH candidate index, etc.) of the repetitive transmission resource may be indicated through a higher layer configuration of the base station and the like. In this case, the number of repetitive PDCCH transmissions and/or a list and transmission patterns of TRPs participating in repetitive transmission may be explicitly indicated, and higher layer indication, MAC-CE/L1 signaling, or the like may be used as the explicit indication method. The list of TRPs may be indicated in the form of TCI states or QCL assumption described above.

If control information is repetitively transmitted in the frequency domain, the control information may be repetitively transmitted over different CORESETs, may be repetitively transmitted over different PDCCH candidates in one CORESET, or may be repetitively transmitted by each CCE. The unit of the resource repetitively transmitted in the frequency domain and the location of the repetitively transmitted resource may be indicated through a higher layer configuration of the base station and the like. In addition, the number of repetitive transmissions and/or a list and transmission patterns of TRPs participating in repetitive transmission may be explicitly indicated, and higher layer indication, MAC-CE/L1 signaling, or the like may be used as the explicit indication method. The list of TRPs may be indicated in the form of TCI states or QCL assumption described above.

If control information is repetitively transmitted in the spatial domain, the control information may be repetitively transmitted over different CORESETs or may be repetitively transmission by configuring two or more TCI states in one CORESET.

As an embodiment of the disclosure, a method in which the base station repetitively transmits PDCCHs will be described. DCI including scheduling information on PUSCHs or PDSCHs may be transmitted from the base station to the UE through PDCCHs in the wireless communication system.

Figure 22:
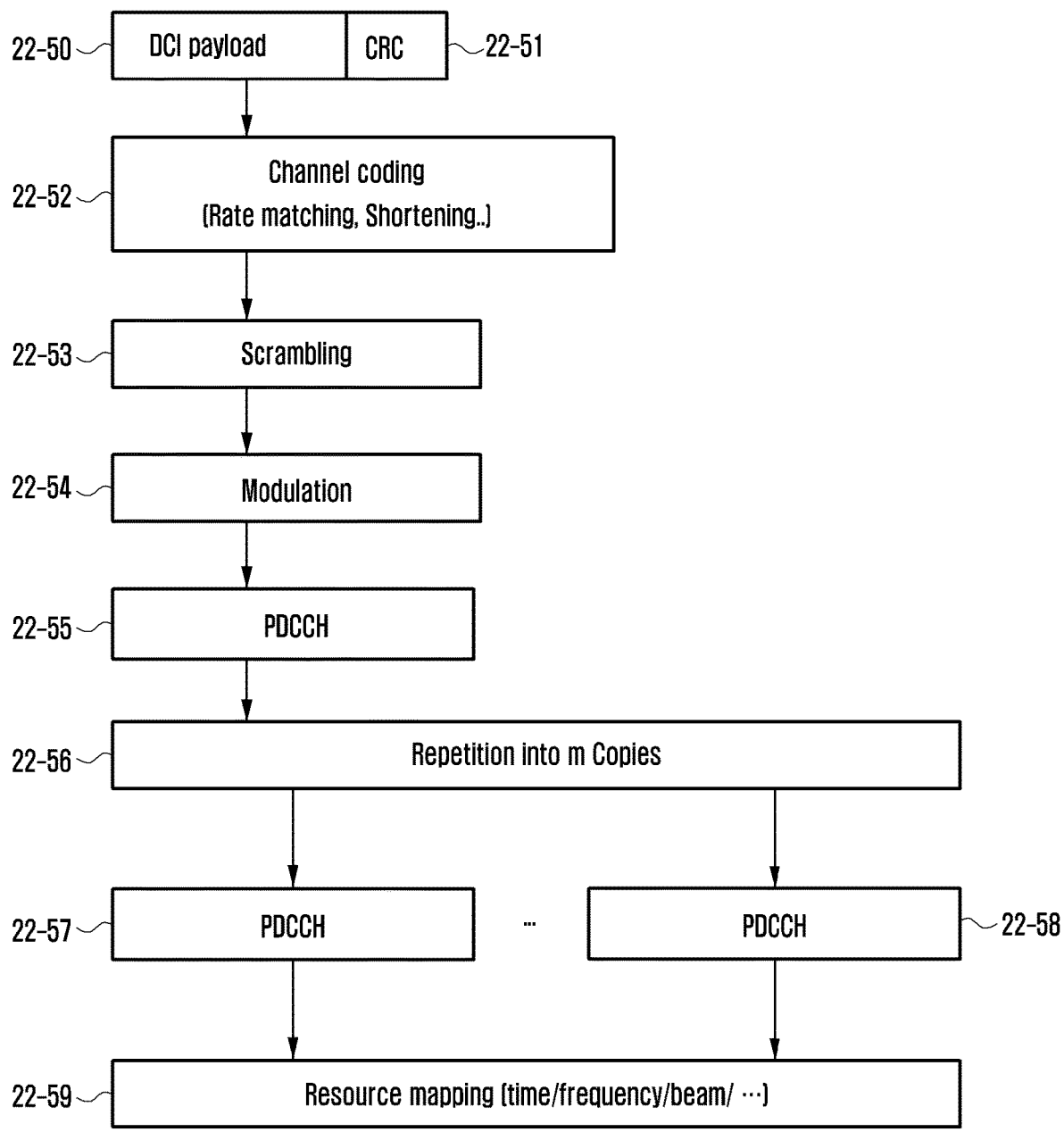
FIG. 22 is a diagram illustrating a process of producing a PDCCH that is repetitively transmitted through two TRPs according to an embodiment of the disclosure.

FIG. 22 is a diagram illustrating a process of producing a PDCCH that is repetitively transmitted through two TRPs according to an embodiment of the disclosure.

The base station may produce DCI (22-50), CRC may be attached to a DCI payload (22-51), and, through the process of channel coding (22-52), scrambling (22-53), and modulation (22-54), a PDCCH may be produced (22-55). Thereafter, the base station may copy the produced PDCCH a plurality of times (22-56, 22-57, and 22-58) and transmit the same using a specific resource (e.g., time, frequency, transmission beam, etc.) (22-59). That is, all the coded bits for the PDCCHs repetitively transmitted in the respective TRPs may be the same. In order for the same coded bit described above, the information values for each DCI field in the PDCCH may also be configured to be the same. For example, all fields (TDRA, FDRA, TCI, antenna ports, . . . ) included in DCI information may be configured to have the same value. Although the same value may be generally interpreted as one indication, it may be interpreted as a plurality of indications if a plurality of (e.g., two) values is included by a special configuration or if it corresponds thereto as described above. A detailed description thereof will be described below.

For example, referring to FIG. 22, if the base station repetitively transmits a PDCCH twice (e.g., m=2), the base station may repetitively transmit the PDCCH based on the same or different beams in terms of the spatial domain by mapping PDCCHs to TRP A and TRP B one by one. In this case, the base station may perform repetitive PDCCH transmission, based on CORESETs respectively connected to two search spaces explicitly connected to each other by higher layer signaling, perform repetitive PDCCH transmission, based on a single TRP, in the case where IDs of the CORESETs connected to the search spaces are the same or where the TCI states of the CORESETs are the same, and perform repetitive PDCCH transmission, based on multiple TRPs, in the case where IDs of the CORESETs connected to the search spaces are different from each other or where the TCI states of the CORESETs are different from each other. In the case where the base station repetitively transmits the PDCCH four times, the base station may map two PDCCHs to TRP A and TRP B, respectively, and two PDCCHs of each TRP may be transmitted separately in the time domain. The repetitive transmission of the PDCCHs separated in the time domain may be repeated in time units of slots, sub-slots, or mini-slots.

However, the method described above is merely an example, and the disclosure is not limited thereto. The UE and the base station in the disclosure may consider the following method for the PDCCH repetition operation described above.

PDCCH repetition in terms of a time/frequency/spatial domain in the same CORESET and in the same slot.
PDCCH repetition in terms of a time/frequency/spatial domain between different slots in the same CORESET.
PDCCH repetition in terms of a time/frequency/spatial domain between different CORESETs in the same slot.
PDCCH repetition in terms of a time/frequency/spatial domain between different CORESETs and between different slots.

In addition, if "CORESETPoolIndex" is configured, "CORESETPoolIndex" may be respectively considered in addition to the CORESET described above. In addition, the number of PDCCH repetitions may increase independently, and the methods described above may be simultaneously considered in combination according thereto.

The base station may preconfigure information about the domain through which the PDCCH is repetitively transmitted for the UE through an RRC message. For example, in the case of repetitive PDCCH transmission in terms of the time domain, the base station may preconfigure, for the UE, information about any one of the slot-based, sub-slot-based, or mini-slot-based time unit by which repetition is conducted. In the case of repetitive PDCCH transmission in terms of the frequency domain, the base station may preconfigure, for the UE, information about any one of the CORESET, the bandwidth part (BWP), or the component carrier (CC) by which repetition is conducted. In the case of repetitive PDCCH transmission in terms of the spatial domain, the base station may preconfigure, for the UE, information related to beams for repetitive PDCCH transmission through configuration for each QCL type. Alternatively, the base station may combine the information listed above and transmit the same to the UE through an RRC message. Accordingly, the base station may repetitively transmit PDCCHs according to information preconfigured through an RRC message, and the UE may repetitively receive PDCCHs according to the information preconfigured through the RRC message.

Figure 23:
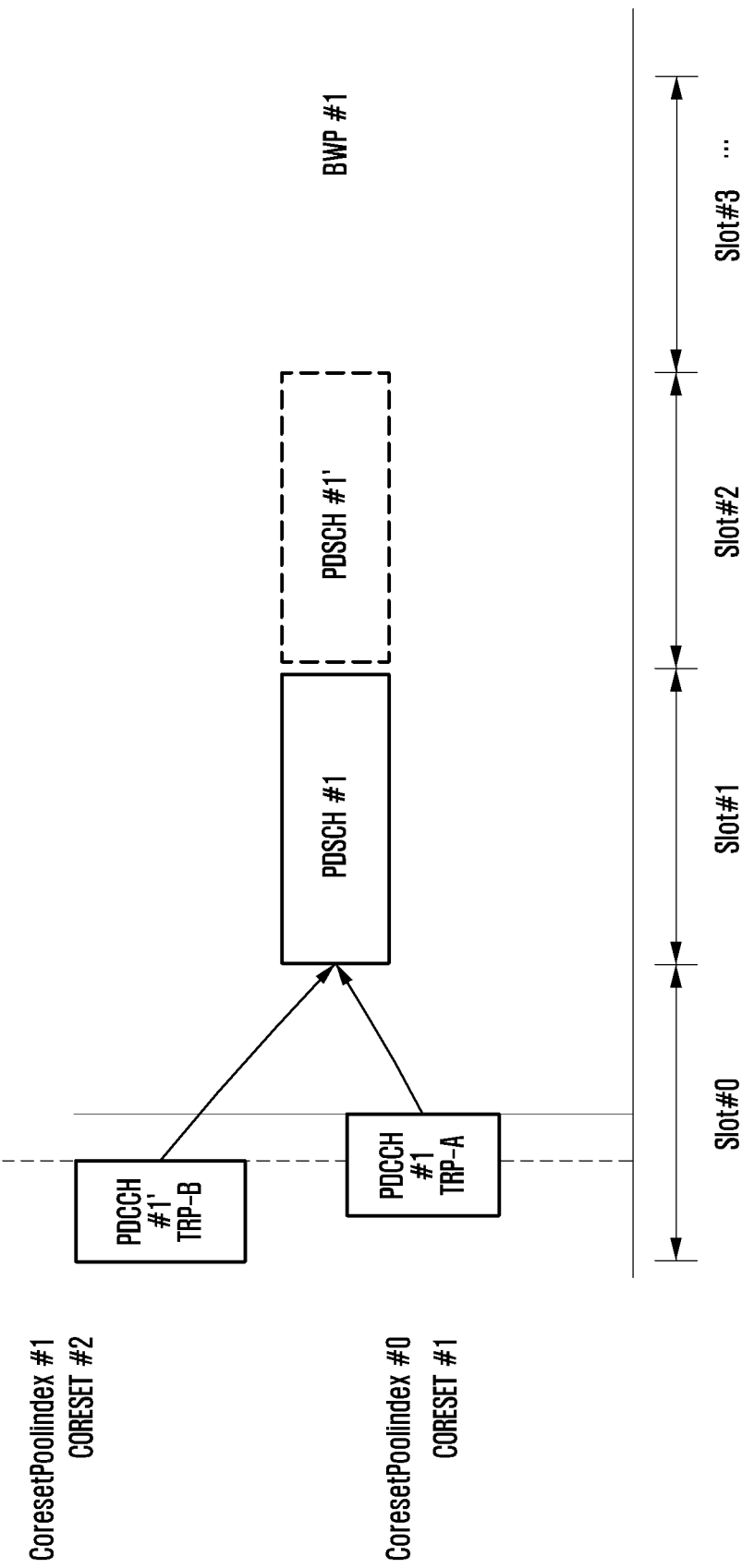
FIG. 23 is a diagram illustrating a method for a base station to repeatedly transmit PDCCHs according to an embodiment of the disclosure.

FIG. 23 is a diagram illustrating a method for a base station to repeatedly transmit PDCCHs according to an embodiment of the disclosure.

Referring to FIG. 23, respective PDCCHs (e.g., PDCCH #1 and PDCCH #1') repetitively transmitted from a plurality of TRPs (e.g., TRP-A and TRP-B) may include at least partially or entirely the same DCI. If the same DCI is included, the repetitively transmitted PDCCHs may schedule the same PDSCH resource. Here, scheduling of the same PDSCH resource (e.g., it may indicate only PDSCH #1 in the case of singe-PDSCH transmission and indicate PDSCH #1 to PDSCH #1' in the case of repetitive PDSCH transmission) may indicate that at least the respective bit values included in the DCI fields are the same. If information for PDSCH resource scheduling among the same DCI-related information is the same, the UE may determine that the PDSCHs of the same location at least in time and frequency resources are to be received. As a method of configuring PDCCHs repetitively transmitted from a plurality of TRPs, the base station may configure different "CORESETPoolIndex" values (e.g., CORESETPoolIndexes #0 and CORESETPoolIndexes #1) for the UE.

[Method 1-2] Method of Repetitively Transmitting a Plurality of Pieces of Control Information in which DCI Formats and/or Payloads May be Different Method 1-2 is for repetitively transmitting a plurality of pieces of control information in which DCI formats and/or payloads may be different. The control information may schedule the repetitively transmitted PDSCHs, and the number of repetitive PDSCH transmissions indicated by the control information may be different between the control information. For example, PDCCH #1 may indicate information for scheduling {PDSCH #1, PDSCH #2, . . . , PDSCH #Y}, PDCCH #2 may indicate information for scheduling {PDSCH #2, . . . , PDSCH #Y}, and PDCCH #X may indicate information for scheduling {PDSCH Y}. the repetitive control information transmission method as described above has an advantage of reducing the total delay required for repetitive control information and PDSCH transmission, compared to Method 1-1. However, in this method, since the payloads of the respective control information repetitively transmitted may be different, soft combining of the repetitively transmitted control information is impossible, which may lower the reliability, compared to Method 1-1.

In Method 1-2 above, the UE may not need to know in advance the resource location of control information to be repetitively transmitted, the number of repetitive transmissions, and the like, and the UE may independently decode and process each piece of control information repetitively transmitted. If the UE decodes a plurality pieces of repetitive transmission control information for scheduling the same PDSCH, the UE may process only the first repetitive transmission control information and ignore the second repetitive transmission control information and subsequent repetitive transmission control information thereto. Alternatively, the resource location of the control information to be repetitively transmitted and the number of repetitive transmissions may be indicated in advance, and the indication method may be the same as the Method 1 described above.

[Method 1-3] Method of Repetitively Transmitting Each of a Plurality of Pieces of Control Information in which DCI Formats and/or Payloads May be Different Method 1-3 is for repetitively transmitting each of the plurality of pieces of control information in which DCI formats and/or payloads may be different. In this case, the respective pieces of repetitively transmitted control information have the same DCI format and payload. The Method 1-2 is not able to perform soft combining of a plurality of pieces of control information, thereby providing lower reliability than Method 1-1, and in Method 1-1, the total delay required for repetitive control information and PDSCH transmission may increase. Method 1-3, using the advantages of Method 1-1 and Method 1-2, may transmit control information with reliability higher than that in Method 1-2 while reducing the total delay required for repetitive control information and PDSCH transmission, compared to Method 1-1.

In Method 1-3, soft combining in Method 1-1 and individual decoding in Method 1-2 may be used to decode and soft-combine the repetitively transmitted control information. For example, the first transmitted control information among a plurality of pieces of repetitively transmitted control information in which DCI formats and/or payloads may be different may be decoded according to Method 1-2 above, and repetitive transmission for the decoded control information may be soft-combined according to Method 1-1 above.

Meanwhile, the base station may select and configure one of Method 1-1, Method 1-2, or Method 1-3 above for repetitive control information transmission. The base station may explicitly indicate the repetitive control information transmission method for the UE through higher layer signaling. Alternatively, the repetitive control information transmission method may be indicated in combination with other configuration information. For example, a higher layer configuration indicating the repetitive PDSCH transmission method may be combined with the repetitive control information transmission indication.

If a PDSCH is indicated to be repetitively transmitted by an FDM scheme, control information may be interpreted to be repetitively transmitted only by Method 1-1 because there is no delay reduction effect due to Method 1-2 in the repetitive PDSCH transmission by the FDM scheme. For similar reason, if a PDSCH is indicated to be repetitively transmitted by an intra-slot TDM scheme, control information may be interpreted to be repetitively transmitted by Method 1-1. On the other hand, if a PDSCH is indicated to be repetitively transmitted by an inter-slot TDM scheme, Method 1-1, Method 1-2, or Method 1-3 above for repetitive control information transmission may be selected through higher layer signaling or L1 signaling.

Meanwhile, the base station may explicitly indicate a repetitive control information transmission unit to the UE through a configuration such a higher layer and the like.

Alternatively, the repetitive control information transmission unit may be indicated in combination with other configuration information. For example, a higher layer configuration indicating the repetitive PDSCH transmission method may be combined with the repetitive control information transmission unit. If a PDSCH is indicated to be repetitively transmitted by the FDM scheme, control information may be interpreted to be repetitively transmitted by FDM or SDM because there is no delay reduction effect due to repetitive PDSCH transmission in the FDM scheme if the control information is repetitively transmitted by the inter-slot TDM scheme or the like. For similar reason, if a PDSCH is indicated to be repetitively transmitted by the intra-slot TDM scheme, control information may be interpreted to be repetitively transmitted by the intra-slot TDM, FDM, or SDM. On the other hand, if a PDSCH is indicated to be repetitively transmitted by the inter-slot TDM scheme, the inter-slot TDM, intra-slot TDM, FDM, or SDM may be selected through the higher layer signaling or the like so as to repetitively transmit the control information.

[Method 1-4] PDCCH Transmission Method of Applying Respective TCI States to Different CCEs in the Same PDCCH Candidates Methods 1-4 may apply different TCI states indicating transmission from multiple TRPs to different CCEs in the PDCCH candidates in order to improve reception performance of a PDCCH without repetitive PDCCH transmission and transmit the same. Although this method is not intended for repetitive transmission of PDCCHs, since different TCI states of the respective TRPs are applied to different CCEs in the PDCCH candidates to perform transmission, it is possible to obtain spatial diversity in the PDCCH candidates. The different CCEs to which different TCI states are applied may be separated in time or frequency dimension, and the UE may need to know in advance the location of resources to which the different TCI states are applied. The UE may receive different CCEs to which different TCI states are applied in the same PDCCH candidate and decode the same independently or at once.

[Method 1-5] PDCCH Transmission Method of Applying a Plurality of TCI States to all CCEs in the Same PDCCH Candidate (SFN Method)

Method 1-5 may apply a plurality of TCI states to all CCEs in the PDCCH candidate and perform transmission by the SFN method in order to improve reception performance of a PDCCH without repetitive PDCCH transmission. Although this method is not intended for repetitive transmission of PDCCHs, it is possible to obtain spatial diversity through SFN transmission at the same CCE location within the PDCCH candidate. The UE may receive CCEs of the same location to which different TCI states are applied in the same PDCCH candidate and decode the same independently or at once using some or all of the plurality of TCI states.

Second Embodiment: UE Capability Report Related to Soft Combining During Repetitive PDCCH Transmission The UE may report UE capability related to soft combining during repetitive PDCCH transmission to the base station, and several methods may be provided for this. Specific methods may be as follows.

[UE capability reporting method 1] The UE may report only on whether soft combining is possible or impossible in repetitive PDCCH transmission as UE capability to the base station.

For example, if the UE reports information stating that soft combining is possible in repetitive PDCCH transmission as UE capability to the base station, the base station may most flexibly determine the possibility of soft combining of the UE (e.g., may determine that the UE is able to perform soft combining at the LLR level) and may notify the UE of the repetitive PDCCH transmission-related configuration as flexibly as possible during configuration related to PDCCH transmission. As an example related to PDCCH repetition configuration, assuming that the UE is able to perform soft combining between control resource sets or search spaces having different configurations, soft combining between PDCCH candidates in the same aggregation level, or soft combining between PDCCH candidates in different aggregation levels, the base station may notify the UE of the corresponding configuration.

As another example, if the UE reports information stating that soft combining is possible in repetitive PDCCH transmission to the base station through the UE capability, the base station may most conservatively determine the level of soft combining of the UE (e.g., may determine that UE is able to perform soft combining at the OFDM symbol level) and notify the UE of the repetitive PDCCH transmission-related configuration as restrictedly as possible during configuration related to PDCCH transmission. As an example related to the PDCCH repetition configuration, assuming that the UE is able to perform soft combining between a plurality of control resource sets having the same configuration or soft combining between PDCCH candidates in the same aggregation level, the base station may notify the UE of the corresponding configuration.

[UE capability reporting method 2] In order to express in more detail the operation of soft combining possible in the UE as UE capability, compared to UE capability reporting method 1 described above, the UE may report the possibility of soft combining in repetitive PDCCH transmission by levels as UE capability to the base station. That is, the UE may identify the signal level to which soft combining is able to be applied in repetitive PDCCH transmission, among the signal levels produced in the reception operation process of the UE, and the UE may report such information as UE capability to the base station. For example, the UE may inform that soft combining is possible at the OFDM symbol level, that soft combining is possible at the modulation symbol level, and that soft combining is possible at the LLR level, as a signal level to which soft combining may be applied. According to each signal level reported by the UE, the base station may send a notification of an appropriate configuration according to the reported UE capability such that the UE may perform soft combining.

[UE capability reporting method 3] The UE may transmit, to the base station, the restrictions necessary for soft combining by the UE during the repetitive PDCCH transmission as UE capability. For example, the UE may report to the base station that respective control resource sets including two repeated PDCCHs must have the same configuration. As another example, the UE may report to the base station that two repeated PDCCH candidates must have at least the same aggregation level.

[UE capability reporting method 4] If the UE receives repetitively transmitted PDCCHs from the base station, the UE may report a method supporting the repetitive PDCCH transmission as UE capability. For example, the UE may report to the base station that Method 1-5 (SFN transmission method) is supported. As another example, the UE may report to the base station that the intra-slot TDM method, the inter-slot TDM method, or the FDM method among Method 1-1 (the method of repeatedly transmitting a plurality of PDCCHs having the same payload) are supported. In particular, in the case of TDM, the UE may report a maximum value of the time interval between two repeated PDCCHs to the base station. For example, if the UE reports the maximum value of the time interval between two repeated PDCCHs as 4 OFDM symbols, the base station may have to adjust the time interval between two repeated PDCCHs to 4 OFDM symbols or less, based on the information, when performing TDM-based repetitive PDCCH transmission to the UE.

The above-described UE capability reporting methods may be configured as a combination of two or more thereof in actual application. For example, the UE may report that two repeated PDCCH candidates must have at least the same aggregation level by UE capability reporting method 3 while reporting that soft combining is possible at the LLR level by UE capability reporting method 2, support the repetitive PDCCH transmission through TDM by UE capability reporting method 4, and report that the maximum value of the time interval between two repeated PDCCHs is 4 OFDM symbols. In addition, although various applications based on a combination of UE capability reporting methods are possible, a detailed description thereof will be omitted.

Third Embodiment: Configuration Method in Relation to Repetitive PDCCH Transmission and Explicit Connectivity As an embodiment of the disclosure, a method of configuring repetitive PDCCH transmission to enable soft combining during the repetitive PDCCH transmission will be described. In the case of performing repetitive PDCCH transmission to the UE based on Method 1-1 (the method of repetitively transmitting a plurality of PDCCHs having the same payload) among various repetitive PDCCH transmission methods, in order to reduce the number of blind decodings in consideration of whether or not the UE is able to perform soft combining, the base station may configure information indicating that there is an explicit connection (linkage or association) between the repeated PDCCH candidates through higher layer signaling, indicate the same through L1 signaling, or configure or indicate the same through a combination of the higher layer signaling and the L1 signaling. More specifically, various connection methods may be provided as follows.

There may be various methods for repetitive PDCCH transmission and explicit connectivity-related configuration through higher layer signaling as follows.

[PDCCH Repetition Configuration Method 1] the Case where Configuration Information Exists in the Higher Layer Signaling "PDCCH-Config"

For repetitive PDCCH transmission and explicit connectivity-related configuration, the base station may configure "PDCCH-repetition-config" in the higher layer signaling "PDCCH-config" for the UE, and "PDCCH-repetition-config" may include the following information.

A repetitive PDCCH transmission scheme—one of TDM, FDM, and SFN
    Control resource set-search space combination(s) to be used in repetitive PDCCH transmission
    Control resource set index(es)—OPTIONAL
    Search space index(es)—OPTIONAL
    Aggregation level(s) for explicit connectivity—OPTIONAL
    PDCCH candidate index(es) for explicit connectivity—OPTIONAL Frequency resources for explicit connectivity—OPTIONAL Based on the above information, the base station may configure repetitive PDCCH transmission through higher layer signaling for the UE. For example, if the repetitive PDCCH transmission scheme is configured as SFN, if the control resource set index, as a control resource set-search space combination to be used in repetitive PDCCH transmission, is configured as "1", and if the search space index is not configured, the UE may expect that the PDCCH will be repetitively transmitted through Method 1-5 (SFN transmission method) in the control resource set having index 1. In this case, one or more different TCI states may be configured through higher layer signaling, indicated through L1 signaling or MAC-CE signaling, or configured or indicated through a combination of the higher layer signaling and the L1 signaling or the MAC-CE signaling for the configured control resource set. In addition, if the repetitive PDCCH transmission scheme is configured as SFN, the UE may not expect that a search space index will be configured in the control resource set-search space combination to be used in repetitive PDCCH transmission. As another example, if the repetitive PDCCH transmission scheme is configured as TDM or FDM, and if a total of two control resource set-search space combinations to be used in repetitive PDCCH transmission are configured such that control resource set index 1 and search space index 1 are configured for a first combination and such that control resource set index 2 and search space index 2 are configured for a second combination, the UE may expect that repetitive PDCCH transmission will be performed by the TDM or FDM scheme through Method 1-1 using the two control resource sets-search space combinations. In this case, a plurality of TCI states that are the same or different from each other may be configured through higher layer signaling, indicated through L1 signaling or MAC-CE signaling, or configured or indicated through a combination of the higher layer signaling and the L1 signaling or the MAC-CE signaling for the respective control resource sets. In addition, if the repetitive PDCCH transmission scheme is configured as TDM or FDM, the UE may expect that up to two control resource set-search space combinations to be used in repetitive PDCCH transmission will be configured and that all control resource set and search space indexes will be configured in the respective combinations.

In addition, the values of the five pieces of information may be updated based on a MAC-CE without RRC reconfiguration. If the base station does not configure "PDCCH-repetition-config" for the UE, the UE may expect single-PDCCH transmission, instead of repetitive PDCCH transmission. All of the above-described aggregation level, PDCCH candidate index, and frequency resources for explicit connectivity may not be configured, or at least one thereof may be configured according to an explicit connection method to be described later.

[PDCCH Repetition Configuration Method 2] the Case where Configuration Information Exists in the Higher Layer Signaling for a Search Space The base station may add higher layer signaling for repetitive PDCCH transmission to the higher layer signaling "searchSpace" for a search space, and notify the UE of the same. For example, a parameter "repetition", which is additional higher layer signaling, may be configured as "on" or "off" in the higher layer signaling "searchSpace" such that a corresponding search space is used for repetitive transmission. There may be one or two search spaces in which "repetition" is configured as "on" in each bandwidth part.

For example, if "searchSpaceId" is configured as "1", if "controlResourceSetId" is configured as "1", and if "repetition" is configured as "on" in the higher layer signaling "searchSpace" for search space index 1, the UE may expect that repetitive PDCCH transmission will be performed according to Method 1-5 (SFN transmission method) in control resource set 1 connected to search space 1. As another example, if "searchSpaceId" is configured as "1", if "controlResourceSetId" is configured as "1", and if "repetition" is configured as "on" in the higher layer signaling "searchSpace" for search space index 1, and if "searchSpaceId" is configured as "2", if "controlResourceSetId" is configured as "2", and if "repetition" is configured as "on" in the higher layer signaling "searchSpace" for search space index 2, the UE may recognize that repetitive PDCCH transmission is to be performed by TDM or FDM using Method 1-1 between a combination of control resource set 1+search space 1 and a combination of control resource set 2+search space 2. TDM or FDM may be selected according to the time and frequency configuration through higher layer signaling of control resource sets 1 and 2 and search spaces 1 and 2. In addition, the aggregation level or PDCCH candidate indexes for explicit connectivity specified in the above PDCCH repetition configuration method 1 may be configured in the higher layer signaling for a search space in which "repetition" is configured as "on", and neither may be configured, either one may be configured, or both may be configured according to an explicit connection method to be described later.

Fourth Embodiment: The Case where Different "CORESETPoolIndex" Values are Configured for CORESETs Respectively Connected to Explicitly Connected Search Spaces During Repetitive PDCCH Transmission According to an embodiment of the disclosure, the UE may consider the case where repetitive PDCCH transmission is received from the base station in a non-SFN manner, that is, the case where different "CORESETPoolIndex" values are configured in the control resource sets respectively connected to the explicitly connected search spaces. As described above, since the repetitively transmitted PDCCHs must have the same value for the same DCI field (e.g., a time/frequency resource assignment field, an antenna port field, a TCI state field, an HARQ process ID field, an NDI field, etc.), there may be a problem in which time and frequency resource allocation information, the antenna port fields, the TCI state fields, the HARQ process ID fields, the NDI fields, etc. indicated through all the PDCCHs are the same. In the following detailed embodiment will describe a method of steadily scheduling a single PDSCH, steadily scheduling a plurality of PDSCHs based on NC-JT, or switching between scheduling of a single PDSCH and scheduling of a plurality of PDSCHs based on NC-JT, based on higher layer signaling, L1 signaling, or a combination of higher layer signaling and L1 signaling in the case where different "CORESETPoolIndex" values are configured in control resource sets respectively connected to explicitly connected search spaces in repetitive PDCCH transmission.

4-1$^{st}$ Embodiment: Single-PDSCH Scheduling Method for Repetitive PDCCH Transmission Based on CORESETs Having Different "CORESETPoolIndex" Values According to an embodiment of the disclosure, if the UE receives, from the base station, configuration information of search spaces to which control resource sets in which different "CORESETPoolIndex" values are configured are explicitly connected, and receives repetitively transmitted PDCCHs based on the same, the UE may understand that a single PDSCH is to be scheduled from the base station. In this case, the UE may respectively apply PDSCH TCI state activation/deactivation MAC-CEs to the control resource sets in which different "CORESETPoolIndex" values are configured, even if each field of DCI has the same value due to repetitive PDCCH transmission, the TCI state field may indicate different TCI states according to the control resource sets corresponding to different "CORESETPoolIndex" values for the same codepoint. For example, in the case where the UE receives a PDSCH TCI state activation/ deactivation MAC-CE, in which the CORESET Pool ID field is configured as "0", for activating first and second TCI states for TCI state codepoints 1 and 2, respectively, and applies the same to a first control resource set in which "CORESETPoolIndex" is configured as "0", where the UE receives a PDSCH TCI state activation/deactivation MAC-CE, in which the CORESET Pool ID field is configured as "1", for activating first and third TCI states for TCI state codepoints 1 and 2, respectively, and applies the same to a second control resource set in which "CORESETPoolIndex" is configured as "1", and where repetitive PDCCH transmission is performed based on the two control resource sets, if a DCI payload indicating TCI state codepoint 1 is produced, both PDCCHs may indicate the first TCI state, but if a DCI payload indicating TCI state codepoint 2 is produce, the PDCCHs transmitted in the first and second control resource sets indicate the second and third TCI states, respectively, so even if the same codepoint is indicated, the actual TCI state may be different.

As described above, in the case where the CORESETs in which different "CORESETPoolIndex" values are configured are connected to search spaces explicitly connected to each other and where repetitive PDCCH transmission is perform based on the same, even if the TCI state fields in the repeated PDCCHs have the same value, the actual codepoint may indicate different TCI states, which may be solved by the following methods 1-1 to 1-6.

[Method 1-1] The UE may assume that a MAC CE message indicated by the base station refers to the same QCL relationship or beamforming information. That is, since the same TCI is configured in the MAC CE message activation step, the UE may determine that the TCI information in DCI in the repetitively transmitted PDCCHs configured by different "CORESETPoolIndex" values has the same TCI field value and that the actual TCI information corresponding to the TCI value or the TCI information corresponding to a value indicated by the TCI codepoint is the same.

[Method 1-2] The UE may apply a TCI activation MAC CE message for the PDSCHs in common, regardless of the two "CORESETPoolIndex" values. More specifically, in the case where different "CORESETPoolIndex" values are configured for control resource sets respectively connected to search spaces explicitly connected to each other and where repetitive PDCCH transmission is performed using the control resource sets, if the UE receives a PDSCH TCI state activation/deactivation MAC-CE, the UE may apply the corresponding MAC-CE to the control resource sets of all "CORESETPoolIndex" values, regardless of the CORESET Pool ID value of the MAC-CE. That is, even if the PDSCH TCI state activation/deactivation activation MAC-CE, which is considered to be differently applied to the UE depending on "CORESETPoolIndex" values, has any "CORESETPoolIndex" value for the CORESET Pool ID field, the same PDSCH TCI state activation/deactivation MAC-CE may be activated for all the CORESETs having different "CORESETPoolIndex" values. For example, in the case where the "CORESETPoolIndex" value may have "0" or "1", where first to third control resource sets in which the "CORESETPoolIndex" value is configured as "0" exist, and where fourth to fifth control resource sets in which the "CORESETPoolIndex" value is configured as "1" exist, if the UE receives a PDSCH TCI state activation/deactivation MAC-CE and if the CORESET Pool ID field in the MAC-CE has a value of "0", the MAC-CE may be applied to all of the first to fifth control resource sets. In this case, the PDCCHs repetitively transmitted through a plurality of control resource sets configured with different "CORESETPoolIndexes" values have the same bit value for TCI state indication, and the same MAC-CE is applied to all the control resource sets having different "CORESETPoolIndex" values, so the same codepoint in the TCI states of the PDCCHs repetitively transmitted from the plurality of control resource sets configured with different "CORESETPoolIndex" values may have the same value.

[Method 1-3] The UE may decode the repetitively transmitted PDCCHs and follow the TCI field of the PDCCH that is successfully decoded first and QCL information corresponding thereto. For example, if the PDCCH transmitted in the control resource set in which the "CORESETPoolIndex" value is configured as "0", among the repetitively transmitted PDCCHs, is successfully decoded earlier than the PDCCH transmitted in the control resource set in which the "CORESETPoolIndex" value is configured as "1", the UE may interpret the TCI state field, based on the PDSCH TCI state activation/deactivation MAC-CE information applied to the control resource set in which the "CORESETPoolIndex" value is configured as "0". If the UE reports to the base station that the UE is capable of soft combining as described above, and if only soft combining is performed during repetitive PDCCH transmission, that is, if there is no sequence in decoding success, the UE may interpret the TCI state field, based on the PDSCH TCI state activation/ deactivation MAC-CE information applied to the control resource set having the lowest "CORESETPoolIndex" value or the lowest control resource set ID value.

[Method 1-4] The UE may follow the TCI state field of the PDCCH transmitted in the monitoring occasion that is configured first, among the monitoring occasions in at least one slot in which repetitively transmitted PDCCH is configured to be transmitted, and QCL information corresponding to. If the repeated PDCCHs are transmitted in the same monitoring occasion, that is, if the UE receives repetitively transmitted PDCCHs by a frequency division scheme, the UE may interpret the TCI state field, based on the PDSCH TCI state activation/deactivation MAC-CE information applied to the control resource set having the lowest "CORESETPoolIndex" value or the lowest control resource set ID value.

[Method 1-5] The UE may follow the TCI field of the PDCCH in the CORESET having the (lowest) CORESET ID value that is configured first, among at least one or more CORESETs in which repetitively transmitted PDCCHs are configured, and QCL information corresponding thereto.

[Method 1-6] The UE may the TCI field of the PDCCH in the CORESET having the (lowest) "CORESETPoolIndex" value that is configured first, among at least one or more "CORESETPoolIndex" values in which repetitively transmitted PDCCHs are configured, and QCL information corresponding thereto.

The various embodiments described above may be operated independently, and two or more thereof may be associated dependently to be considered together with each other.

As described in the embodiment, in the case where the UE receives, from the base station, configuration information of the search space to which control resource sets having different "CORESETPoolIndex" values are explicitly connected and receives repetitively transmitted PDCCHs, based on the same, and where the repeated PDCCHs schedule a single PDSCH, since each of the time/frequency resource assignment field (TDRA and FDRA), antenna port field, HARQ process ID field, and NDI field in DCI has the same values, the embodiment may be used to schedule a single PDSCH, based on the same, without separate re-interpretation and post-processing.

The various embodiments described above may be applied to both the DAI field and the PUCCH resource indicator field in a similar manner during the repetitive PDCCH transmission. For example, the UE receiving respective PDCCHs in which different "CORESETPoolIndex" values are configured may apply the DAI field value of the PDCCH transmitted from the first PDCCH candidate resource among the two monitoring occasions. As another example, the UE receiving respective PDCCHs in which different "CORESETPoolIndex" values are configured may apply the PUCCH resource indicator field value of the PDCCH included in the first (lowest) CORESET ID or the first (lowest) search space ID, among the two monitoring occasions.

4-2$^{nd}$ Embodiment: Method of Scheduling a Plurality of PDSCHs Based on NC-JT in Repetitive PDCCH Transmission Based on CORESETs Having Differently Configured CORESETPoolIndex Values According to an embodiment of the disclosure, if the UE receives, from the base station, configuration information of search spaces to which control resource sets in which different "CORESETPoolIndex" values are configured are explicitly connected, and receives repetitively transmitted PDCCHs based on the same, the UE may understand that scheduling of a plurality of PDSCHs based on NC-JT is received from the base station. Here, receiving scheduling of a plurality of PDSCHs based on NC-JT may indicate receiving scheduling in which a plurality of PDSCHs that entirely overlap, partially overlap, or do not overlap on time/frequency resources, based on the respective PDCCHs, is transmitted. In other words, receiving scheduling of a plurality of PDSCHs based on NC-JT may indicate receiving scheduling of each PDSCH for each PDCCH. In this case, the UE may respectively apply PDSCH TCI state activation/deactivation MAC-CEs to the control resource sets in which different "CORESETPoolIndex" values are configured as described above, even if each field of DCI has the same value due to repetitive PDCCH transmission, the TCI state field may indicate different TCI states according to the control resource sets corresponding to different "CORESETPoolIndex" values for the same codepoint. Therefore, although the UE receives an indication of a codepoint for the same TCI state field, since it may indicate that the respective PDCCHs indicate different TCI states from each other, the UE may apply each TCI state to the PDSCH scheduled by each PDCCH. However, since TDRA/FDRA are the same as described above, they overlap entirely on time/frequency resources, regardless of UE capability reporting.

Figure 24:
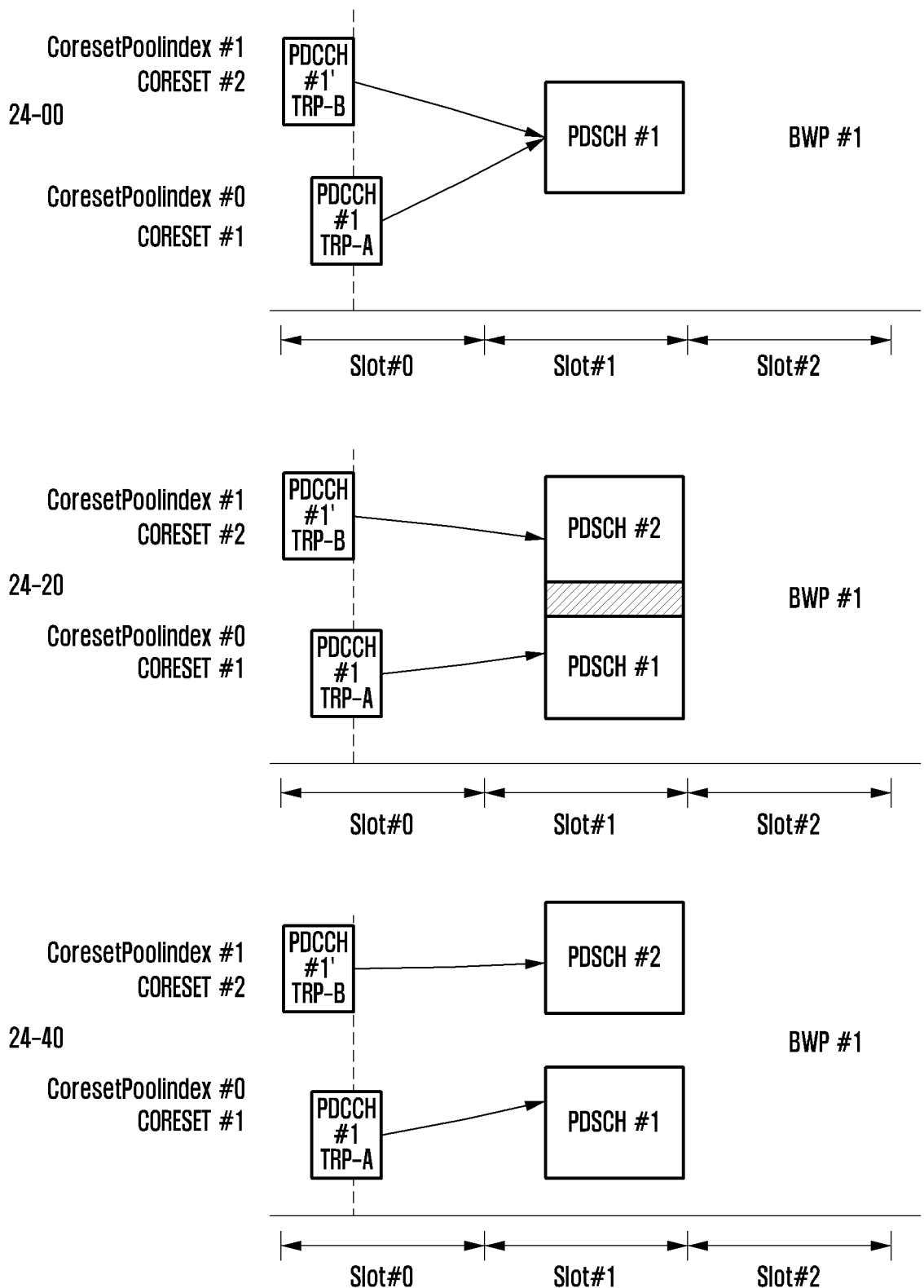
FIG. 24 is a diagram illustrating a method for allocating time and frequency resources of a plurality of PDSCHs, based on NC-if, scheduled from control resource sets in which different "CORESETPoolIndex" values are configured according to an embodiment of the disclosure.

FIG. 24 is a diagram illustrating a method for allocating time and frequency resources of a plurality of PDSCHs, based on NC-JT, scheduled from control resource sets in which different "CORESETPoolIndex" values are configured according to an embodiment of the disclosure.

Referring to FIG. 24, the base station may transmit, to the UE, a first PDCCH (PDCCH #1) in a first TRP (TRP-A) configured as CORESETPoolIndex #0, and a second PDCCH (PDCCH #1') in a second TRP (TRP-B) configured as CORESETPoolIndex #1. As described above, if DCI field values of at least some or all of the first PDCCH and the second PDCCH are configured to have the same value, it may cause some ambiguous interpretation or an undefined interpretation. For example, if at least some or all field values among the TDRA, FDRA, antenna port, HARQ process ID, and NDI fields of DCI are the same, the UE may perform different operations depending on whether or not the respective PDSCHs scheduled by repetitively transmitted PDCCHs overlap. That is, although the values indicated in the TDRA, FDRA, antenna port, HARQ process ID, and NDI fields in at least DCI formats 1_0, 1_1, and 1_2 corresponding to respective TRPs configured in different "CORESETPoolIndex" values received by the UE are the same, these values are ambiguous to interpret.

In the case where a plurality of control resource sets in which different "CORESETPoolIndex" values are configured are respectively connected to explicitly connected search spaces and where a plurality of PDSCHs are scheduled based on NC-JT by repetitively transmitted PDCCHs according thereto, an operation for interpreting and determining the TDRA and FDRA fields in order to determine whether or not the respective PDSCHs overlap in the time/frequency resources will be described as follows.

[Method 2-1] For the TDRA and FDRA fields in the PDCCHs repetitively transmitted in control resource sets in which different "CORESETPoolIndex" values are configured, the base station may perform repetitive PDCCH transmission-based PDSCH scheduling only for the UE that supports the simultaneous reception of the entirely overlapping PDSCHs or the UE that reports the UE capability. That is, the UE reporting partially overlapping or non-overlapping through the UE capability report is unable to receive a configuration of the PDCCHs repetitively transmitted in the control resource sets in which different "CORESETPoolIndex" values are configured. That is, the UE reporting partially overlapping or non-overlapping through the UE capability report may expect to not receive a configuration related to repetitive transmission of the PDCCHs in which the control resource sets in which different "CORESETPoolIndex" values are configured are connected to the explicitly connected search spaces.

[Method 2-2] For the TDRA fields in the PDCCHs repetitively transmitted in CORESETs in which different "CORESETPoolIndex" values are configured, the base station may configure time and frequency resource offset-related information for PDSCH scheduling for the UE that supports the simultaneous reception of the entirely overlapping (24-00), partially overlapping (24-20), or non-overlapping (24-40) PDSCHs or the UE that reports the UE capability. In this case, the FDRA field may be indicated in a manner configured between the base station and the UE according to the existing interpretation and may be used to schedule the PDSCH. That is, if the frequency resource offset is not applied, all of the plurality of PDSCHs may be scheduled based on the same frequency resource allocation information.

For example, the base station may configure time and frequency resource offset-related information of the entirely overlapping (24-00), partially overlapping (24-20), or non-overlapping (24-40) PDSCH resources scheduled by the PDCCHs repetitively transmitted in the high layer (e.g., RRC) according to the UE capability (e.g., capable of simultaneously receiving the entirely overlapping (24-00), partially overlapping (24-20), or non-overlapping (24-40) PDSCHs). For example, in the case where control resource sets in which different "CORESETPoolIndex" values are configured are respectively connected to explicitly connected search spaces, time and frequency resource offset information may be configured through higher layer signaling, and in this case, time resource offset information applicable to the partially overlapping or non-overlapping case may be in units of OFDM symbols, mini-slots, slots, or milliseconds (msecs), and frequency resource offset information may be in units of REs and RBs. In addition, in the non-overlapping case, one of time resource non-overlapping, frequency resource non-overlapping, and time/frequency resource non-overlapping methods may be configured based on higher layer signaling to adjust the PDSCH position. The time resource non-overlapping method is to adjust the PDSCH position such that the time/frequency resource position of the PDSCH determined through TDRA/FDRA among the DCI fields indicated through the repeated PDCCHs does not overlap the time resource. For example, if two PDCCHs are repeatedly transmitted, if time resources are allocated to OFDM symbols 4 to 7, based on the TDRA field, and if frequency resources are allocated to PRBs 1 to 4, based on the FDRA field, the first PDSCH is transmitted to the UE based on the TDRA/FDRA field, and the second PDSCH is adjusted in its position such that the OFDM symbol position is shifted to the right by 4 in the PDSCH resource position based on the TDRA/FDRA field to not overlap in the time resource and is transmitted to the UE. In this case, if the shifted PDSCH crosses a slot boundary, the corresponding PDSCH may not be transmitted, or only the OFDM symbol crossing the slot boundary may not be transmitted. Similarly, the frequency resource non-overlapping method and the time/frequency resource non-overlapping method may be considered as methods of adjusting the PDSCH position such that a plurality of PDSCHs does not overlap both in frequency resources and in time/frequency resources. If the PDSCH shifted to the frequency resource also crosses a BWP boundary in application to frequency resources, the corresponding PDSCH may not be transmitted or only RBs crossing the BWP boundary may not be transmitted.

As another example, as shown in Table 31, the base station may configure time and/or frequency offset-related information corresponding to each TDRA entry for TDRA configuration in a higher layer (e.g., RRC) according to the UE capability (e.g., capable of simultaneously receiving the entirely overlapping, partially overlapping, or non-overlapping PDSCHs) and, based on this, indicate the time and frequency resource offset-related information of the entirely overlapping, partially overlapping, or non-overlapping PDSCHs through the TDRA field of DCI. For example, in the case where the TDRA entry is configured in the higher layer as shown in Table 32 or determined by the standards, if the UE identifies "0000" (corresponding to entry #1) in the TDRA field of DCI, the UE may determine that the RB offset value between the first PDSCH resource and the second PDSCH resource is configured as "2". As another example, in the case where the TDRA entry is configured in the higher layer or determined by the standards, if the UE identifies "0001" (corresponding to entry #2) in the TDRA field, the UE may determine that the symbol offset value between the first PDSCH resource and the second PDSCH resource is configured as "1" and that the RBoffset is configured as "4". As another example, in the case where the TDRA entry is configured in the higher layer or determined by the standards, if the UE identifies "1111" (corresponding to entry #16) in the TDRA field, the UE may determine that the symbol offset value between the first PDSCH resource and the second PDSCH resource is configured as "0". If the symbol offset and RBoffset values are not configured for each entry or configured as "0", it may be regarded as a TDRA entry to which the symbol offset and the RBoffset are not applied.

In particular, if the base station configures an offset for the UE supporting simultaneous reception of partially overlapping or non-overlapping PDSCHs through the TDRA offset information through the higher layer or the TDRA field value of DCI described above. The UE may determine that the second PDSCH time and/or frequency resource is configured by adding the offset to the first PDSCH time and/or frequency resource configuration. The offset may include at least one or more pieces of time offset and frequency offset information. That is, the first PDSCH, as a reference, may be transmitted at a resource position based on the TDRA/FDRA field without applying an offset, and the second PDSCH may be applied with an offset from the reference position. In the case where three or more PDSCHs are transmitted based on the repeated PDCCHs, if T and F are respectively applied to the second PDSCH according to the time and frequency resource offset, $(N-1)T$ and $(N-1)F$ may be applied to $N^{th}$ PDSCH (N>2).

TABLE 31

```
PDSCH-TimeDomainResourceAllocationList-r16 ::=
SEQUENCE   (SIZE(1..maxNrofDL-Allocations))   OF   PDSCH-
TimeDomainResourceAllocation-r16
   PDSCH-TimeDomainResourceAllocation-r16 ::= SEQUENCE {
      k0-r16                         INTEGER(0..32) OPTIONAL, -- Need S
      mappingType-r16                ENUMERATED {typeA, typeB},
      startSymbolAndLength-r16          INTEGER (0..127),
      repetitionNumber-r16           ENUMERATED {n2, n3, n4, n5, n6, n7, n8,
   n16} OPTIONAL, -- Cond Formats1-0and1-1
      symbolOffset                   INTEGER (0,...,M) OPTIONAL -- Cond PDCCH
   repetition
      RBOffset                       INTEGER (0,...,N) OPTIONAL -- Cond PDCCH
   repetition
}
```

TABLE 32

Time domain resource assignment field

| # of Entry | K0 | mappingType | SLIV | Rep. num | symbol offset | RBoffset |
|---|---|---|---|---|---|---|
| 1 | 0 | A | 0 | — | — | 2 |
| 2 | 0 | B | 2 | — | 1 | 4 |
| ... | ... | ... | ... | ... | ... | ... |
| 16 | 2 | B | 15 | — | 1 | — |

[Method 2-3] For the TDRA and FDRA fields in the PDCCH that are repetitively transmitted in CORESETs having differently configured "CORESETPoolIndex" values, the base station may independently configure a plurality of TDRA or FDRA fields as many as the number of different "CORESETPoolIndex" values. That is, the base station may independently configure information related to a plurality of TDRA or FDRA fields as many as the number of different "CORESETPoolIndex" values for the UE that supports the simultaneous reception of the entirely overlapping (24-00), partially overlapping (24-20), or non-overlapping (24-40) PDSCHs or the UE that reports the UE capability, and a plurality of TDRA or FDRA fields capable of indicating independent information may exist in the repeated PDCCHs.

1) A plurality of "resourceAllocation" configurations may exist in the higher layer signaling "PDSCH-Config" and may be applied to each of a plurality of FDRA fields.
2) A method in which a "resourceAllocation" configuration is configured in the higher layer signaling "PDSCH-Config" may be applied in common to a plurality of FDRA fields. In this case, if "resourceAllocation" in the higher layer signaling "PDSCH-Config" is configured as "dynamic", the 1-bit MSB in the first FDRA field indicates resource allocation type 0 or type 1 (e.g., if the bit value is 0, it indicates type 0, and if the bit value is 1, it indicates type 1), and the 1-bit MSBs from the second to last FDRA fields may be used in frequency resource allocation. Alternatively, n bits obtained by collecting the 1-bit MSBs of the second to last (e.g., $n^{th}$) FDRA fields may be used for other purposes (e.g., it may be used to supplement the number of bits in the NDI field by 1 bit for each PDSCH, or may be used to indicate the redundancy version (RV) by 1 bit for each PDSCH, for example, if the corresponding bit has a value of "0", it may indicate RV 0, and if the bit has a value of "1", it may indicate RV 3).

[Method 2-4] For the TDRA field in the PDCCHs that are repetitively transmitted in CORESETs having differently configured "CORESETPoolIndex" values, the base station may include a plurality of pieces of TDRA information in one entry that may be indicated by the TDRA field. For example, one piece of slot offset information and a plurality of pieces of SLIV information may be included in one entry that may be indicated by the TDRA field, a plurality of pieces of slot offset information and one piece of SLIV information may be included in one entry, or a plurality of pieces of slot offset information and a plurality of pieces of SLIV information may be included in one entry. In addition, similarly to the TDRA field, the FDRA field in the PDCCHs that are repetitively transmitted from CORESETs having differently configured "CORESETPoolIndex" values may be defined to select one of a plurality of entries configured through higher layer signaling. In this case, a plurality of pieces of FDRA information may be included in each entry.

In addition to the TDRA and FDRA fields in the DCI considered above, in the case where control resource sets received by the UE in which different "CORESETPoolIndexes" values are configured are respectively connected to the explicitly connected search spaces, if the values indicated by the antenna port fields in DCI format 1_0, 1_1, and 1_2 included in the repeated PDCCHs are the same, these values are ambiguous to interpret. Hereinafter, in the case where a plurality of control resource sets in which different "CORESETPoolIndex" values are configured are respectively connected to the explicitly connected search spaces, if a plurality of NC-JT-based PDSCHs is scheduled by repetitively transmitted PDCCHs according thereto, an operation for interpreting and determining the antenna port field in order to determine whether or not the respective PDSCHs overlap will be described as follows.

Table 33 below shows an antenna port indication table in the case of antenna port(s) (1000+DMRS port), dmrs-Type=1, and maxLength=1 in current Rel-15 to 16. Table 34 below shows an antenna port indication table in the case of antenna port(s) (1000+DMRS port), dmrs-Type=1, and maxLength=2 in current Rel-15 to 16. The UE may identify the DCI format and identify a value of the antenna port field, thereby determining a DMRS port and a CDM group according to the values of the DMRS indication table corresponding thereto.

TABLE 33

One Codeword: Codeword 0 enabled, Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 34

| | One Codeword:<br>Codeword 0 enabled, Codeword 1 disabled | | | Two Codewords:<br>Codeword 0 enabled, Codeword 1 enabled | | |
|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

[Method 3-1] If the antenna port field values in the PDCCHs repetitively transmitted in CORESETs having differently configured "CORESETPoolIndex" values are the same, the base station may schedule two CDM groups (e.g., antenna port {0,2} in the case of DMRS type 1) using the antenna port fields for scheduling a plurality of PDSCHs, and apply DMRS ports belonging to different CDM groups to transmission of the respective PDSCHs. In addition, the UE may apply each identified TCI (e.g., the same or different TCIs by each DCI) field to each CDM group, based on the value thereof. Specifically, the TCI state field among the DCI fields in the PDCCH included in the control resource set in which "CORESETPoolIndex" is configured as "0", among the repeated PDCCHs, may be applied to a first CDM group among a plurality of CDM groups to which DMRS ports indicated by the antenna ports may belong, and the TCI state field in the control resource set in which "CORESET-PoolIndex" is configured as "1" may be applied to a second CDM group.

For example, if the codepoint value of the antenna port field among the DCI fields in repetitively transmitted PDCCHs received by the UE indicates "9" (e.g., DMRS ports 0, 1, and 2), the UE may determine that DMRS port 0 and DMRS port 1 are transmitted from the first TRP of the base station and that DMRS port 2 is transmitted from the second TRP. That is, the UE may perform decoding using DMRS port 0 and DMRS port 1 to receive the first PDSCH (e.g., PDCCH #1) transmitted from the first TRP, and perform decoding using DMRS port 2 to receive the second PDSCH (e.g., PDCCH #1') transmitted from the second TRP.

[Method 3-2] If the antenna port field values in the PDCCHs repetitively transmitted in CORESETs having differently configured "CORESETPoolIndex" values are the same, the base station may reconfigure the corresponding antenna port indication table. Specifically, the base station and the UE may remove the DMRS port index corresponding to the codepoint of at least one Rel-15/16-based DMRS port configured to indicate two or more CDM groups in the antenna port field to divide the antenna port field into two parts such that each part indicates the DMRS port of each PDSCH. For example, entries 9 to 11 supporting two CDM groups may be removed from Table 33 indicating a plurality of codepoints configured in the antenna port(s) (1000+ DMRS port) determined as dmrs-Type=1 and maxLength=1 in Rel-15/16, and 4 bits of information indicating a total of 16 codepoints may be divided into two parts by 2 bits each to configure an antenna port indication table for indicating each part using some or all of entries in Table 35 below.

For example, the antenna port field may be maintained at 4 bits and divided into two parts to have 2 bits for each, so that the antenna port indication table for indicating each part may include entries 0 to 3 in Table 35. In this case, the same antenna port indication table may be used for both parts, transmission rank-1 may be allocated for each of the two PDSCHs, and the DMRS ports in the same CDM group may not be indicated.

As another example, the antenna port field may be maintained at 4 bits and divided into two parts using 2 bits for each, so that the first part, as an antenna port indication table, may include entries 0, 1, and 4 in Table 35 and so that the second part may include entries 2, 3, and 5 in Table 35. In this case, different antenna port indication tables may be used for the two parts, transmission rank-1 or 2 may be allocated for both PDSCHs, and it may be assumed that the first and second PDSCHs use CDM groups 0 and 1, respectively.

As another example, 5 bits may be allocated to the antenna port field, and the antenna port filed may be divided into two parts using 3 bits and 2 bits, respectively, so that the first part, may include entries 0 to 5 in Table 35, as an antenna port indication table, and so that the second part may include some of the entries 0 to 5 in Table 35 depending on the entry indicated for the first part through DCI. If entry 0 in Table 35 is indicated for the first part, the antenna port indication table for the second part may include entries 2, 3, and 5 related to the remaining CDM groups, excluding the CDM group indicated for the first part. In this case, different antenna port indication tables may be used for the two parts, rank-1 or 2 transmission may be allocated for each of the two PDSCHs, and it may be assumed that the first and second PDSCHs use different CDM groups.

As another example, 6 bits may be allocated to the antenna port field, and the antenna port filed may be divided into two parts using 3 bits for each, so that the antenna port indication table for indicating each part may include all entries in Table 35. In this case, the same antenna port indication table may be used for both parts. Transmission rank-1 or 2 may be allocated to two PDSCHs, respectively, and it may be assumed that the first and second PDSCHs use different CDM groups.

TABLE 35

One Codeword: Codeword 0 enabled, Codeword 1 disabled

| Value | Number of DMRS CDM group(s) without data | DMRS port(s) |
|---|---|---|
| 0 | 2 | 0 |
| 1 | 2 | 1 |
| 2 | 2 | 2 |
| 3 | 2 | 3 |
| 4 | 2 | 0, 1 |
| 5 | 2 | 2, 3 |

The above-described methods may be applied to Table 34 above in a similar manner. As an example, in Table 34 indicating a plurality of codepoints configured in antenna port(s) (1000+DMRS port) determined as dmrs-Type=1 and maxLength=2 in Rel-15/16, entries 9, 10, 11, and 30 supporting two CDM groups may be deleted in the case of one codeword, and entries 0 to 3 may be deleted in the case of two codewords. 5-bit information indicating a total of 32 codepoints may be divided into two parts, and an antenna port indication table for indicating each part may be configured using some or all of the entries in Table 36 below. Meanwhile, since each of the two divided parts schedules each PDSCH, the case of two codewords in Table 36 below may be omitted.

TABLE 36

One Codeword: Codeword 0 enabled, Codeword 1 disabled

| Value | Number of DMRS CDM group(s) without data | DMRS port(s) | Number of front-load symbols |
|---|---|---|---|
| 0 | 2 | 0 | 1 |
| 1 | 2 | 1 | 1 |
| 2 | 2 | 2 | 1 |
| 3 | 2 | 3 | 1 |
| 4 | 2 | 0, 1 | 1 |
| 5 | 2 | 2, 3 | 1 |
| 6 | 2 | 0 | 2 |
| 7 | 2 | 1 | 2 |
| 8 | 2 | 2 | 2 |
| 9 | 2 | 3 | 2 |
| 10 | 2 | 4 | 2 |
| 11 | 2 | 5 | 2 |
| 12 | 2 | 6 | 2 |
| 13 | 2 | 7 | 2 |
| 14 | 2 | 0, 1 | 2 |
| 15 | 2 | 2, 3 | 2 |
| 16 | 2 | 4, 5 | 2 |
| 17 | 2 | 6, 7 | 2 |
| 18 | 2 | 0, 4 | 2 |
| 19 | 2 | 2, 6 | 2 |
| 20 | 2 | 0, 1, 4 | 2 |
| 21 | 2 | 2, 3, 6 | 2 |
| 22 | 2 | 0, 1, 4, 5 | 2 |
| 23 | 2 | 2, 3, 6, 7 | 2 |

[Method 3-3] If the antenna port field values in the PDCCHs repetitively transmitted in CORESETs having differently configured "CORESETPoolIndex" values are the same, the base station may perform reconfiguration such that each entry in the antenna port indication table indicates a DMRS port pair. In this case, all pairs may indicate DMRS ports included in different CDM groups, and first and second DMRS port groups in the pair may be applied to first and second PDSCH transmissions, respectively. Table 37 shows an example of an antenna port indication table reconfigured for Method 3-3. For example, all entries in Table 37 may be used to indicate a 4-bit-based antenna port field. As another example, one entry (e.g., entry 8) among all the entries in Table 37 may be removed to indicate a 3-bit-based antenna port field.

TABLE 37

One Codeword: Codeword 0 enabled, Codeword 1 disabled

| Value | Number of DMRS CDM group(s) without data | DMRS port(s) |
|---|---|---|
| 0 | 2 | {0}, {2} |
| 1 | 2 | {0}, {3} |
| 2 | 2 | {1}, {2} |
| 3 | 2 | {1}, {3} |
| 4 | 2 | {0}, {2, 3} |
| 5 | 2 | {1}, {2, 3} |
| 6 | 2 | {0, 1}, {2} |
| 7 | 2 | {0, 1}, {3} |
| 8 | 2 | {0, 1}, {2, 3} |

In addition to the TDRA, FDRA, and antenna port fields in the DCI considered above, in the case where control resource sets received by the UE in which different "CORESETPoolIndexes" values are configured are respectively connected to the explicitly connected search spaces, if the values indicated by the HARQ process ID field in DCI format 1_0, 1_1, and 1_2 included in the repeated PDCCHs are the same, these values are ambiguous to interpret.

Hereinafter, in the case where a plurality of control resource sets in which different "CORESETPoolIndex" values are configured are respectively connected to the explicitly connected search spaces, if a plurality of NC-JT-based PDSCHs is scheduled by repetitively transmitted PDCCHs according thereto, an operation for interpreting and determining the HARQ process ID field in order to determine whether or not the respective PDSCHs overlap will be described as follows.

If the HARQ process ID field values in the PDCCHs repetitively transmitted in the CORESETs having differently configured "CORESETPoolIndex" values are the same, one of the plurality of PDSCHs may follow the HARQ process ID (e.g., n) indicated by the HARQ process ID field, and the remaining PDSCHs may determine HARQ process IDs by adding a specific value to the HARQ process ID indicated by the HARQ process ID field and then taking the remainder obtained by dividing the same by the maximum number of HARQ process IDs (e.g., mod(n+1, N), mod(x, y) indicate the remainder of dividing x by y, and N is the maximum number of HARQ process IDs and may be, for example, 16). In this case, various methods may be considered to determine the HARQ process IDs to be allocated to a plurality of PDSCHs.

[Method 4-1] If there is a plurality of TDRA fields or if respective entries of the TDRA field indicate a plurality of pieces of TDRA information, the HARQ process ID (e.g., n) indicated through the HARQ process ID field may be allocated to the PDSCH scheduled through the TDRA field indicated first or first TDRA information among the entries of the indicated TDRA field, and if the number of the remaining TDRA fields or the number of pieces of the remaining TDRA information among the entries of the indicated TDRA field is "m", HARQ process IDs of mod (n+1, N), mod(n+2, N), . . . , mod(n+m, N) may be respectively allocated to m PDSCHs scheduled through the m pieces of TDRA information. Here, mod(x, y) indicates the remainder of dividing x by y, and N is the maximum number of HARQ process IDs and may be, for example, 16.

[Method 4-2] If there is a plurality of TDRA fields or if respective entries of the TDRA field indicate a plurality of pieces of TDRA information, HARQ process IDs may be allocated based on the position of a start symbol of the PDSCH scheduled through each field or each piece of TDRA information in the entry. For example, if two TDRA fields are indicated or if the entry indicated by the TDRA field includes two pieces of TDRA information, and if two pieces of TDRA information indicate the same slot offset and if the position of a start symbol of the PDSCH of the first TDRA information is earlier, the HARQ process ID (e.g., n) indicated through the HARQ process ID field may be allocated to the PDSCH scheduled through the first TDRA information, and the HARQ process ID for the PDSCH scheduled through the second TDRA information may be determined by adding a specific value to the HARQ process ID indicated by the HARQ process ID field and then taking the remainder obtained by dividing the same by the maximum number of HARQ process IDs (e.g., mod(n+1, N), mod(x, y) indicate the remainder of dividing x by y, and N is the maximum number of HARQ process IDs and may be, for example, 16). If two pieces of TDRA information have different slot offsets, the HARQ process ID may be allocated from the TDRA information corresponding to the small slot offset in the above manner.

[Method 4-3] If there is a plurality of FDRA fields or if respective entries of the FDRA field indicate a plurality of pieces of FDRA information, HARQ process IDs may be allocated in the order of FDRA information indication in a similar manner as 1) above.

[Method 4-4] If there is a plurality of FDRA fields or if respective entries of the FDRA field indicate a plurality of pieces of FDRA information, HARQ process IDs may be allocated in the order of FDRA information indication in a similar manner as 2) above. The HARQ process ID is allocated based on the position of a start symbol in 2) above, whereas, in this method using FDRA, the HARQ process ID may be allocated based on the lower starting PRB position or the higher starting PRB position.

[Method 4-5] In the case where, based on Method 2-2, a time/frequency resource offset may be configured in each entry of the TDRA field through the TDRA field and where the time/frequency resource offset is applied to a plurality of PDSCHs by indicating corresponding entries, the HARQ process ID indicated through the HARQ process ID field may be allocated to the PDSCH to which the time/frequency resource offset is not applied, and the HARQ process ID for the PDSCH to which the time/frequency resource offset is applied may be determined by adding a specific value to the HARQ process ID indicated by the HARQ process ID field and then taking the remainder obtained by dividing the same by the maximum number of HARQ process IDs (e.g., mod(n+1, N), mod(x, y) indicates the remainder of dividing x by y, and N is the maximum number of HARQ process IDs and may be, for example, 16). In this case, if a time/frequency resource offset is applied to the respective PDSCHs described in Method 2-2 above, for example, HARQ process IDs of mod(n+1, N), mod(n+2, N), mod(n+m, N) may be respectively allocated to m PDSCHs to which m time/frequency resource offsets are applied. Here, mod(x, y) indicates the remainder of dividing x by y, and N is the maximum number of HARQ process IDs and may be, for example, 16.

With regard to the methods listed above, one of Method 2-1 to Method 2-4 may be applied to the TDRA/FDRA fields among the DCI fields included in the repeated PDCCHs, one of Method 3-1 to Method 3-3 may be applied to the antenna port field, and one of Method 4-1 to Method 4-5 may be applied to the HARQ process ID field. For example, in the case where respective CORESETs having differently configured "CORESETPoolIndex" values are respectively connected to explicitly connected search spaces and where a plurality of PDSCHs for NC-JT is scheduled through PDCCHs repeated from the respective CORESETs, when interpreting the repeated DCI fields, Method 2-2 may be applied to the TDRA/FDRA fields, Method 3-1 may be applied to the antenna port field, and Method 4-5 may be applied to the HARQ process ID field. In the case where Method 2-3 is not used, the bit size of the NDI field may be determined using one of the number of scheduled PDSCHs, the number of pieces of independent TDRA/FDRA information indicated by the TDRA/FDRA field, the number of "CORESETPoolIndex" values that are differently configured, or the maximum number of pieces of independent TDRA/FDRA information that may be indicated through the TDRA/FDRA field. For example, if the size of the NDI field is determined as the maximum number of pieces of independent TDRA information that may be indicated through the TDRA field, and if the maximum number of pieces of independent TDRA information that may be indicated by a single entry for the TDRA field is 8, the NDI field may be configured as 8 bits. In this case, if an entry having two pieces of independent TDRA information is indicated through the TDRA field, the remaining 6 bits may be used as additional bits for the MCS or RV field.

Example 4-3: Method of Switching Between Single-PDSCH Scheduling and NC-JT-Based Multi-PDSCH Scheduling in Repetitive PDCCH Transmission Based on CORESETs Having Differently Configured "CORESETPoolIndex" Values As an embodiment of the disclosure, the base station may configure, for a specific UE, an operation of switching between an operation of scheduling a single PDSCH and an operation of scheduling NC-JT-based PDSCHs in respective PDCCHs repetitively transmitted in a plurality of TRPs described above. The operation of switching the PDSCH scheduling may be performed statically, semi-statically, or dynamically in consideration of a configuration method and an applied time.

[Method 5-1] Static Switching Operation Using Higher Layer Signaling

The base station may configure, for the UE, parameter information related to switching between an operation of scheduling a single PDSCH and an operation of scheduling NC-JT-based PDSCHs in respective PDCCHs repetitively transmitted in a plurality of TRPs in a semi-statical manner through a higher layer configuration.

For example, the base station may inform the UE of whether or not NC-JT-based PDSCH scheduling is possible by enabling a configuration parameter (e.g., enableNCJT) that distinguishes between the single-PDSCH scheduling and the NC-JT-based PDSCH scheduling in RRC. That is, if the UE receives a message in which a parameter for configuring the NC-JT-based PDSCH scheduling is disabled in the higher layer, the UE may determine that a single PDSCH is to be scheduled in the PDCCHs repetitively transmitted in a plurality of TRPs, instead of considering the NC-JT-based PDSCH scheduling.

As another example, the base station may inform the UE of whether or not single-PDSCH-based PDSCH scheduling is possible by enabling a configuration parameter (e.g., single-PDSCH) that distinguishes between the single-PDSCH scheduling and the NC-JT-based PDSCH scheduling in RRC. That is, if the UE receives a message in which a parameter for configuring the single-PDSCH scheduling is disabled in the higher layer, the UE may determine that the NC-JT-based PDSCH scheduling is performed in the PDCCHs repetitively transmitted in a plurality of TRPs, instead of considering the single-PDSCH scheduling.

[Method 5-2] TCI State Field-Based Dynamic Switching Operation

In repetitive PDCCH transmission based on CORESETs having differently configured "CORESETPoolIndex" values and respectively connected to search spaces that are explicitly connected to each other, the UE may perform a method of dynamically switching between an operation of scheduling a single PDSCH and an operation of scheduling NC-JT-based PDSCHs, based on the TCI state field in DCI.

For example, respective codepoint values of the TCI fields in DCI of the PDCCHs repetitively transmitted in the respective TRPs may be the same or different from each other. Specifically, if the codepoint value of the TCI field in the DCI of the PDCCH received by the UE from a first TRP or a second TRP is "000", the UE may determine whether or not the values of first (e.g., corresponding to codepoint 000) TCI state IDs configured in CORESETPoolindex 0 and CORESETPoolindex 1 are the same, based on an higher layer or MAC-CE message (e.g., TCI states activation/deactivation for UE-specific PDSCH MAC CE). If the first (e.g., corresponding to codepoint 000) TCI state ID identified in CORESETPoolindex 0 is different from the first (e.g., corresponding to codepoint 000) TCI state ID identified in CORESETPoolindex 1, the UE may determine that NC-JT-based PDSCHs are to be scheduled. On the other hand, if the first (e.g., corresponding to codepoint 000) TCI state ID identified in CORESETPoolindex 0 is the same as the first (e.g., corresponding to codepoint 000) TCI state ID identified in CORESETPoolindex 1, the UE may determine that a single PDSCH is to be scheduled. That is, the UE checks may identify whether or not the TCI state ID values indicated by the TCI codepoint received from each PDCCH are the same to determine whether the PDSCH scheduled by the PDCCHs repetitively transmitted in a plurality of TRPs schedules a single PDSCH or NC-JT-based PDSCHs.

As another example, specifically, if the codepoint indicated by the TCI field in the DCI of the PDCCH received from the first TRP or the second TRP by the UE indicates different TCI states between different "CORESETPoolIndex" values, the UE may determine that NC-JT-based PDSCHs are scheduled, and if the codepoint indicates the same TCI state between different "CORESETPoolIndex" values, the UE may determine that a single PDSCH is scheduled.

In order to perform signaling for the UE about switching between an operation of scheduling a single PDSCH and an operation of scheduling NC-JT-based PDSCHs, based on the TCI state field as described above, the base station may perform management such that the TCI state for the same TCI codepoint in one piece of DCI is the same or different between respective "CORESETPoolIndex" values. To this end, the UE may need to receive a plurality of PDSCH TCI state activation/deactivation MAC-CEs shown in FIG. 16 between different "CORESETPoolIndex" values. In this case, as a method for reducing MAC-CE overhead, the base station may transmit the enhanced TCI states activation MAC-CE message (d: enhanced TCI states activation/deactivation for UE-specific PDSCH MAC CE) shown in FIG. 21, which is introduced for a single-DCI-based multi-TRP transmission method, to the UE, thereby obtaining the effect of transmitting a plurality of PDSCH TCI state activation/deactivation MAC-CEs.

For example, if the UE is configured to receive the repetitively transmitted PDCCHs, when receiving the enhanced TCI states activation MAC-CE message, the UE may identify a value of C_x corresponding to the codepoint of the $x^{th}$ TCI state. The UE may determine information related to the TCI state activated for CORSETPoolindex 0 or information related to the TCI state activated for CORSETPoolindex 1, based on the received MAC CE message. For example, if the value of c_0 in Oct 2 of the message is "0", the UE may determine that only one TCI state ID_0,1 is configured in CORESETPoolindex 0. Alternatively, if the value of c_0 in Oct 2 of the message is "1", the UE may determine that TCI state ID_0,1 corresponding to CORESETPoolindex 0 is configured and that TCI state ID_0,2 corresponding to CORESETPoolindex 1 is further configured.

That is, the base station may update the TCI states using an enhanced TCI states activation MAC-CE message (d: enhanced TCI states activation/deactivation for UE-specific PDSCH MAC CE) for a plurality of TRPs to support switching between an operation of scheduling a single PDSCH and an operation of scheduling NC-JT-based PDSCHs.

[Method 5-3] Antenna Port Field-Based Dynamic Switching Operation

In repetitive PDCCH transmission based on CORESETs having differently configured "CORESETPoolIndex" values and respectively connected to search spaces that are explicitly connected to each other, the UE may perform a method of dynamically switching between an operation of scheduling a single PDSCH and an operation of scheduling NC-JT-based PDSCHs, based on a value of the antenna port field in DCI.

For example, the UE may identify an antenna port field value in DCI of the PDCCHs repetitively transmitted from a plurality of TRPs and identify a DM-RS port codepoint corresponding to the antenna port field value in the DCI. If the CDM group of the DM-RS corresponding to the identified codepoint is a single CDM group, the UE may determine that a single PDSCH is to be scheduled from the PDCCH. Alternatively, if the CDM group of the DM-RS corresponding to the identified codepoint includes two or more CDM groups, the UE may determine that NC-JT-based PDSCHs are scheduled from the PDCCHs. Specifically, if the antenna port field values in DCI of the repetitively transmitted PDCCHs are entries 9 to 11 in Table 33, the UE may determine that NC-JT-based PDSCHs are scheduled, and if other entry values are indicated, the UE may determine that a single PDSCH is scheduled.

As another example, the antenna port indication table may be reconfigured for switching between single-PDSCH scheduling and NC-JT-based PDSCH scheduling. Specifically, in Table 33, entries 0 to 8 may be determined as single-PDSCH scheduling, and entries 9 to 15 may be determined as NC-JT-based PDSCH scheduling. Entries 12 to 15 are reserved codepoints and may be defined as combinations of DMRS ports including two CDM groups as shown in Table 38 below. Definitions for entries 12 to 15 shown in Table 38 are only examples, and defining other combinations may not be excluded.

TABLE 38

| value | Number of DMRS CDM group(s) without data | DMRS port(s) |
|---|---|---|
| 12 | 2 | 0, 3 |
| 13 | 2 | 1, 3 |
| 14 | 2 | 0, 2, 3 |
| 15 | 2 | 1, 2, 3 |

[Method 5-4] Dynamic Switching Operation Using TDRA or FDRA Field

In repetitive PDCCH transmission based on CORESETs having differently configured "CORESETPoolIndex" values and respectively connected to search spaces that are explicitly connected to each other, the UE may perform a method of dynamically switching between an operation of scheduling a single PDSCH and an operation of scheduling NC-JT-based PDSCHs, based on a TDRA or FDRA field value in DCI.

1) In the case of Method 2-2, if the UE indicates a TDRA entry in which a time/frequency resource offset is not configured, the UE may expect that a single PDSCH transmission is to be scheduled. If the UE indicates a TDRA entry in which at least one time/frequency resource offset is configured, the UE may expect that a plurality of PDSCHs are to be transmitted in the NC-JT scheme.

2) In the case of Method 2-4, if the UE indicates an entry including one piece of TDRA and FDRA information for both the TDRA and FDRA fields, the UE may expect that a single PDSCH transmission is to be scheduled. If the UE indicates an entry including a plurality of pieces of TDRA or FDRA information by at least one of the TDRA or FDRA fields, the UE may expect that a plurality of PDSCHs are to be transmitted in the NC-JT scheme.

Figure 25:
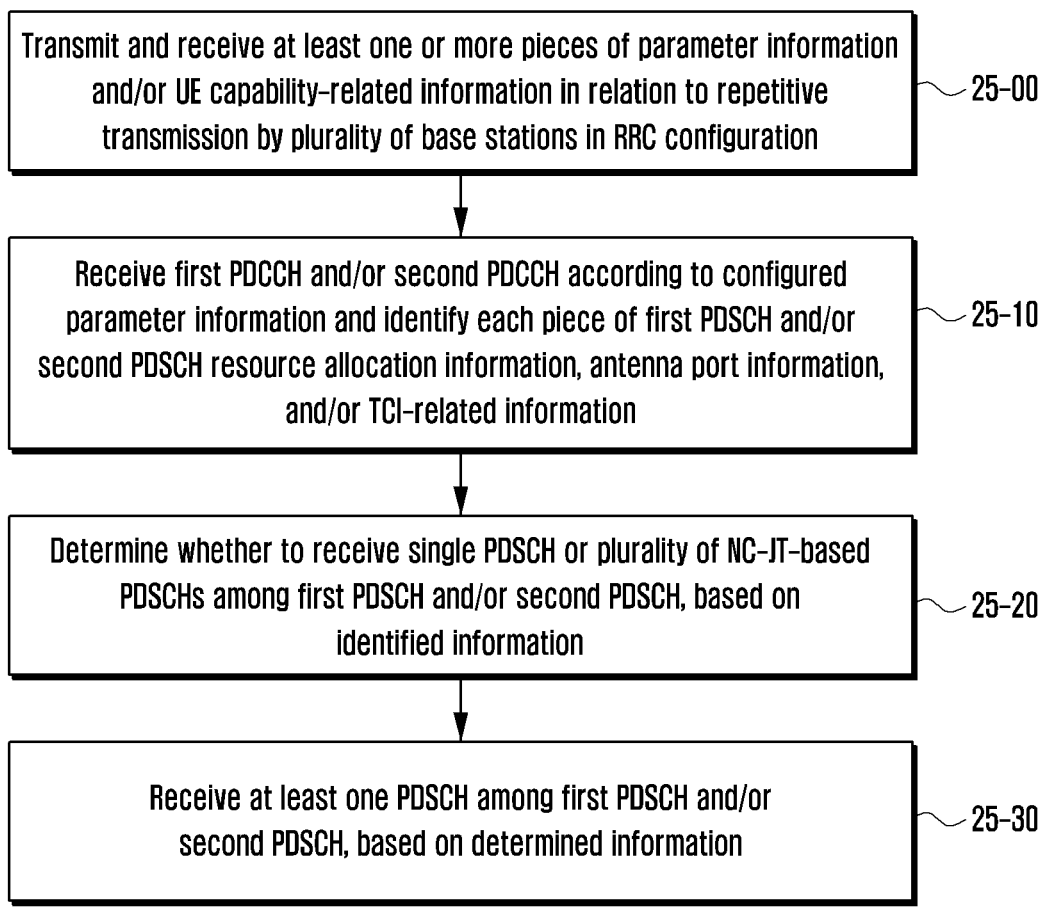
FIG. 25 is a flowchart illustrating an operation in which a user equipment receives control and/or data transmitted by a base station in a wireless communication system according to an embodiment of the disclosure.

FIG. 25 is a flowchart illustrating an operation in which a UE receives control and/or data transmitted by a base station in a wireless communication system according to an embodiment of the disclosure. Methods 1 to 5 described in FIGS. 21 to 24 will be briefly described.

Referring to FIG. 25, the base station and the UE may transmit/receive at least one or more pieces of parameter information and/or UE capability-related information in relation to repetitive transmission by a plurality of base stations in the RRC configuration (25-00). For example, information related to transmission by a plurality of base stations may include information related to CORESET or "CORESETPoolIndex" configuration, information related to PDSCH resource configuration, information related to TCI state configuration, information related to antenna port configuration, etc. described above. As another example, as parameter information related to repetitive PDCCH transmission, information on a plurality of search spaces explicitly connected by higher layer signaling and whether or not different "CORESETPoolIndex" values are configured or able to be configured in a plurality of CORESETs connected to the corresponding search spaces may be included, and information indicating whether or not activate transmission of a plurality of NC-JT-based PDSCHs that may be scheduled based on a plurality of CORESETs having differently configured "CORESETPoolIndex" values and respectively connected to a plurality of explicitly connected search spaces (e.g., enableNCJT) may be included. The UE may receive a first PDCCH and/or a second PDCCH according to the configured parameter information and identify first PDSCH and/or second PDSCH resource allocation information, antenna port information, and/or TCI-related information (25-10). The UE may determine whether or not to receive a single PDSCH from among the first PDSCH and/or the second PDSCH or to receive a plurality of NC-JT-based PDSCHs, based on the identified information (25-20). The UE may receive at least one of the first PDSCH and/or the second PDSCH, based on the determined information (25-30).

Figure 26:
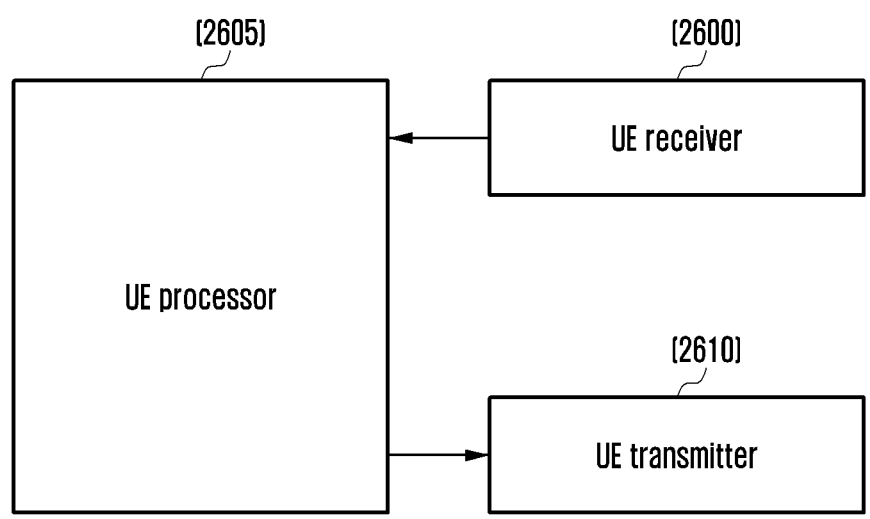
FIG. 26 is a diagram illustrating the structure of a user equipment in a wireless communication system according to an embodiment of the disclosure.

FIG. 26 is a diagram illustrating the structure of a UE in a wireless communication system according to an embodiment of the disclosure.

Referring to FIG. 26, the UE may include a transceiver referring to a UE receiver 2600 and a UE transmitter 2610, a memory (not shown), and a UE processor 2605 (or a UE controller). According to the above-described communication method of the UE, the UE transceiver 2600 and 2610, the memory, and the UE processor 2605 may operate. However, the elements of the UE are not limited to the above-described examples. For example, the UE may include more or fewer elements than the aforementioned elements. In addition, the transceiver, the memory, and the processor may be implemented in the form of one chip.

The transceiver may transmit/receive a signal to/from the base station. Here, the signal may include control information and data. To this end, the transceiver may include an RF transmitter for up-converting and amplifying a frequency of a transmitted signal, and an RF receiver for low-noise amplifying and down-converting a received signal. However, this is only one embodiment of the transceiver, and the elements of the transceiver are not limited to the RF transmitter and the RF receiver.

In addition, the transceiver may receive a signal through a wireless channel, output the same to the processor, and transmit a signal output from the processor through a wireless channel.

The memory may store programs and data necessary for the operation of the UE. In addition, the memory may store control information or data included in a signal transmitted and received by the UE. The memory may be configured as a storage medium such as read only memory (ROM), random access memory (RAM), hard disks, compact disc read only memory (CD-ROM), and digital versatile disc (DVD), or a combination thereof. In addition, a plurality of memories may be provided.

In addition, the processor may control a series of processes such that the UE operates according to the above-described embodiment. For example, the processor may control the elements of the UE so as to receive DCI comprised of two layers, thereby simultaneously receiving a plurality of PDSCHs. A plurality of processors may be provided, and the processor may execute a program stored in the memory to perform an element control operation of the UE.

Figure 27:
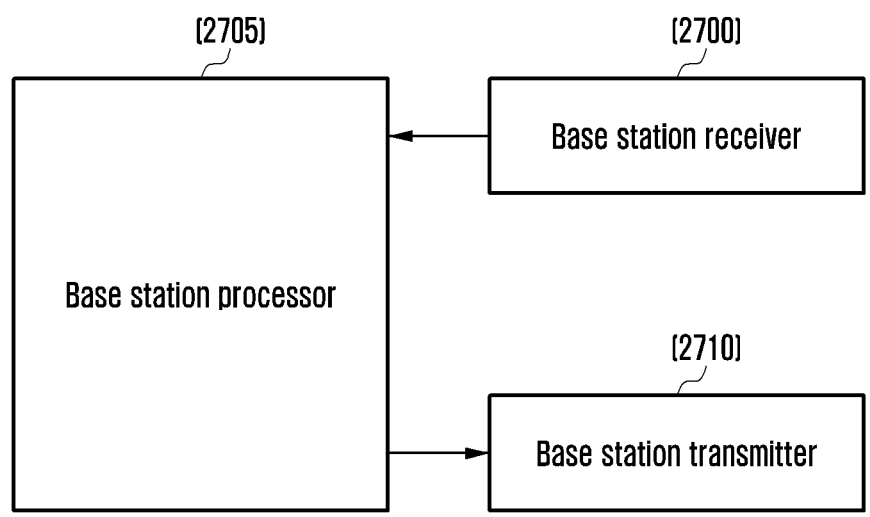
FIG. 27 is a diagram illustrating the structure of a base station in a wireless communication system according to an embodiment of the disclosure.

FIG. 27 is a diagram illustrating the structure of a base station in a wireless communication system according to an embodiment of the disclosure.

Referring to FIG. 27, the base station may include a transceiver referring to a base station receiver 2700 and a base station transmitter 2710, a memory (not shown), and a base station processor 2705 (or a base station controller). According to the above-described communication method of the base station, the base station transceiver 2700 and 2710, the memory, and the base station processor 2705 may operate. However, the elements of the base station are not limited to the above-described examples. For example, the base station may include more or fewer elements than the aforementioned elements. In addition, the transceiver, the memory, and the processor may be implemented in the form of one chip.

The transceiver may transmit/receive a signal to/from the base station. Here, the signal may include control information and data. To this end, the transceiver may include an RF transmitter for up-converting and amplifying a frequency of a transmitted signal, and an RF receiver for low-noise amplifying and down-converting a received signal. However, this is only one embodiment of the transceiver, and the elements of the transceiver are not limited to the RF transmitter and the RF receiver.

In addition, the transceiver may receive a signal through a wireless channel, output the same to the processor, and transmit a signal output from the processor through a wireless channel.

The memory may store programs and data necessary for the operation of the base station. In addition, the memory may store control information or data included in a signal transmitted and received by the base station. The memory may be configured as a storage medium such as ROM, RAM, hard disks, CD-ROM, and DVD, or a combination thereof. In addition, a plurality of memories may be provided.

The processor may control a series of processes such that the base station operates according to the above-described embodiment. For example, the processor may control the elements of the base station so as to configure and transmit two-layer DCI including allocation information for a plurality of PDSCHs. A plurality of processors may be provided, and the processor may execute a program stored in the memory to perform an element control operation of the base station.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, one embodiment of the disclosure may be partially combined with another embodiment to operate a base station and a terminal. As an example, embodiments 1 and 2 of the disclosure may be partially combined to operate a base station and a terminal. Further, although the above embodiments have been described by way of the FDD LTE system, other variants based on the technical idea of the embodiments may be implemented in other systems such as TDD LTE and 5G or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be implemented in combination without departing from the essential spirit and scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A terminal in a communication system, the terminal comprising:
    a transceiver; and
    a controller configured to:
        receive, from a base station, information activating a first set of transmission configuration indication (TCI) states corresponding to a first control resource set (CORESET) pool index and a second set of TCI states corresponding to a second CORESET pool index,
        receive, from the base station, first downlink control information (DCI) including a TCI field indicating a codepoint and second DCI including the TCI field indicating the codepoint,
        identify whether a first TCI state corresponding to the codepoint among the first set of TCI states and a second TCI state corresponding to the codepoint among the second set of TCI states are the same, and
        receive, from the base station, at least one physical downlink shared channel (PDSCH) based on the first DCI, the second DCI and the identification.

2. The terminal of claim 1, wherein, in case that the first TCI state and the second TCI state are the same, the first DCI and the second DCI schedules a single PDSCH.

3. The terminal of claim 1, wherein, in case that the first TCI state and the second TCI state are different, the first DCI schedules a first PDSCH and the second DCI schedules a second PDSCH, respectively.

4. The terminal of claim 1,
    wherein the first DCI is received via a physical downlink control channel (PDCCH) in a first CORESET associated with the first CORESET pool index, and
    wherein the second DCI is received via a PDCCH in a second CORESET associated with the second CORESET pool index.

5. The terminal of claim 1, wherein the information activating a first set of TCI states and a second set of TCI states is received via a medium access control (MAC) control element (CE).

6. A base station in a communication system, the base station comprising:
    a transceiver; and
    a controller configured to:
        transmit, to a terminal, information activating a first set of transmission configuration indication (TCI) states corresponding to a first control resource set (CORESET) pool index and a second set of TCI states corresponding to a second CORESET pool index,
        transmit, to the terminal, first downlink control information (DCI) including a TCI field indicating a codepoint and second DCI including the TCI field indicating the codepoint, and
        transmit, to the terminal, at least one physical downlink shared channel (PDSCH) according to the first DCI, the second DCI and whether a first TCI state corresponding to the codepoint among the first set of TCI states and a second TCI state corresponding to the codepoint among the second set of TCI states are the same.

7. The base station of claim 6, wherein, in case that the first TCI state and the second TCI state are the same, the first DCI and the second DCI schedules a single PDSCH.

8. The base station of claim 6, wherein, in case that the first TCI state and the second TCI state are different, the first DCI schedules a first PDSCH and the second DCI schedules a second PDSCH, respectively.

9. The base station of claim 6,
    wherein the first DCI is received via a physical downlink control channel (PDCCH) in a first CORESET associated with the first CORESET pool index, and
    wherein the second DCI is received via a PDCCH in a second CORESET associated with the second CORESET pool index.

10. The base station of claim 6, wherein the information activating a first set of TCI states and a second set of TCI states is transmitted via a medium access control (MAC) control element (CE).

11. A method performed by a terminal in a communication system, the method comprising:
    receiving, from a base station, information activating a first set of transmission configuration indication (TCI) states corresponding to a first control resource set (CORESET) pool index and a second set of TCI states corresponding to a second CORESET pool index;
    receiving, from the base station, first downlink control information (DCI) including a TCI field indicating a codepoint and second DCI including the TCI field indicating the codepoint;
    identifying whether a first TCI state corresponding to the codepoint among the first set of TCI states and a second TCI state corresponding to the codepoint among the second set of TCI states are the same; and
    receiving, from the base station, at least one physical downlink shared channel (PDSCH) based on the first DCI, the second DCI and the identification.

12. The method of claim 11, wherein, in case that the first TCI state and the second TCI state are the same, the first DCI and the second DCI schedules a single PDSCH.

13. The method of claim 11, wherein, in case that the first TCI state and the second TCI state are different, the first DCI schedules a first PDSCH and the second DCI schedules a second PDSCH, respectively.

14. The method of claim 11,
    wherein the first DCI is received via a physical downlink control channel (PDCCH) in a first CORESET associated with the first CORESET pool index, and
    wherein the second DCI is received via a PDCCH in a second CORESET associated with the second CORESET pool index.

15. The method of claim 11, wherein the information activating a first set of TCI states and a second set of TCI states is received via a medium access control (MAC) control element (CE).

16. A method performed by a base station in a communication system, the method comprising:
- transmitting, to a terminal, information activating a first set of transmission configuration indication (TCI) states corresponding to a first control resource set (CORESET) pool index and a second set of TCI states corresponding to a second CORESET pool index;
- transmitting, to the terminal, first downlink control information (DCI) including a TCI field indicating a codepoint and second DCI including the TCI field indicating the codepoint; and
- transmitting, to the terminal, at least one physical downlink shared channel (PDSCH) according to the first DCI, the second DCI and whether a first TCI state corresponding to the codepoint among the first set of TCI states and a second TCI state corresponding to the codepoint among the second set of TCI states are the same.

17. The method of claim 16, wherein, in case that the first TCI state and the second TCI state are the same, the first DCI and the second DCI schedules a single PDSCH.

18. The method of claim 16, wherein, in case that the first TCI state and the second TCI state are different, the first DCI schedules a first PDSCH and the second DCI schedules a second PDSCH, respectively.

19. The method of claim 16,
- wherein the first DCI is received via a physical downlink control channel (PDCCH) in a first CORESET associated with the first CORESET pool index, and
- wherein the second DCI is received via a PDCCH in a second CORESET associated with the second CORESET pool index.

20. The method of claim 16, wherein the information activating a first set of TCI states and a second set of TCI states is transmitted via a medium access control (MAC) control element (CE).

* * * * *